United States Patent
Kordari et al.

(10) Patent No.: US 8,930,163 B2
(45) Date of Patent: *Jan. 6, 2015

(54) METHOD FOR STEP DETECTION AND GAIT DIRECTION ESTIMATION

(71) Applicant: TRX Systems, Inc., Greenbelt, MD (US)

(72) Inventors: Kamiar Kordari, McLean, VA (US); Benjamin Funk, Hanover, MD (US); Jared Napora, Severn, MD (US); Ruchika Verma, Bethesda, MD (US); Carole Teolis, Glenn Dale, MD (US); Travis Young, Rockville, MD (US)

(73) Assignee: TRX Systems, Inc., Greenbelt, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/827,506

(22) Filed: Mar. 14, 2013

(65) Prior Publication Data
US 2013/0311134 A1 Nov. 21, 2013

Related U.S. Application Data

(63) Continuation of application No. 13/791,443, filed on Mar. 8, 2013.

(60) Provisional application No. 61/649,178, filed on May 18, 2012.

(51) Int. Cl.
| | | |
|---|---|---|
| G01C 22/00 | (2006.01) | |
| G01P 15/00 | (2006.01) | |
| G01C 21/00 | (2006.01) | |
| G06F 17/10 | (2006.01) | |

(52) U.S. Cl.
CPC .............. *G01C 22/006* (2013.01); *G06F 17/10* (2013.01)
USPC .................. 702/160; 702/92; 702/94; 702/95; 702/141; 702/152; 702/191; 701/500; 701/526; 701/541; 235/105

(58) Field of Classification Search
USPC ............... 702/92, 94, 95, 141, 152, 160, 182; 701/500, 526, 541; 235/105
See application file for complete search history.

(56) References Cited

U.S. PATENT DOCUMENTS

| | | |
|---|---|---|
| 7,463,997 B2 | 12/2008 | Pasolini et al. |
| 7,959,539 B2 | 6/2011 | Takeishi et al. |

(Continued)

OTHER PUBLICATIONS

Hu et al., Human Gait Estimation Using a Reduced Number of Accelerometers, Aug. 2010, Sice Annual Conference, pp. 1905-1909.*

(Continued)

*Primary Examiner* — Janet Suglo
*Assistant Examiner* — L. Anderson
(74) *Attorney, Agent, or Firm* — Baker & Hostetler LLP

(57) ABSTRACT

A method for detecting a human's steps and estimating the horizontal translation direction and scaling of the resulting motion relative to an inertial sensor is described. When a pedestrian takes a sequence of steps the displacement can be decomposed into a sequence of rotations and translations over each step. A translation is the change in the location of pedestrian's center of mass and a rotation is the change along z-axis of the pedestrian's orientation. A translation can be described by a vector and a rotation by an angle.

18 Claims, 12 Drawing Sheets

(56) References Cited

U.S. PATENT DOCUMENTS

| | | | |
|---|---|---|---|
| 2003/0144763 | A1 | 7/2003 | Mori et al. |
| 2007/0032748 | A1 | 2/2007 | McNeil et al. |
| 2008/0077326 | A1 | 3/2008 | Funk et al. |
| 2009/0012433 | A1 | 1/2009 | Fernstrom et al. |
| 2009/0259424 | A1 | 10/2009 | Dutta et al. |
| 2011/0071785 | A1 | 3/2011 | Heath |
| 2011/0237945 | A1 | 9/2011 | Foroughl et al. |
| 2011/0264393 | A1 | 10/2011 | An et al. |
| 2012/0068927 | A1 | 3/2012 | Poston et al. |
| 2012/0072166 | A1 | 3/2012 | Keal et al. |
| 2012/0123569 | A1 | 5/2012 | Prstojevich |
| 2012/0136573 | A1* | 5/2012 | Janardhanan et al. ........ 701/512 |
| 2013/0311133 | A1 | 11/2013 | Kordari et al. |

OTHER PUBLICATIONS

Chau, "A review of analytical techniques for gait data. part 1: fuzzy, statistical and fractal methods", Gait and Posture, 2001, 13, 49-66.

Chau, "A review of analytical techniques for gait data: part 2: neural network and wavelet methods", Gait and Posture, 2001, 13, 102-120.

Fang, et al., "Design of a wireless assisted pedestrian dead reckoning system—the NavMote experience", IEE Transactions on Instrumentation and Measurement, 2005, 2342-2358.

Godha, et al., "Integrated GPS/INS system for pedestrian navigation in a signal degraded environment", ION GNSS, Fort Worth, Texas, 2006, 1-14.

Judd, "A personal dead reckoning module", ION GPS, 1997, 1-5.

Ladetto, "On foot navigation: continuous step calibration using both complementary recursive predictions and adaptive Kalman filtering", ION GPS, 2000, 1-6.

Ladetto, et al., "Digital magnetic compann and gyroscope dismounted soldier position and navigation", NATO-RTO meetings, Istanbus, Turkey, 2002, 1-22.

Lee, et al., "Recognition of walking behaviors for pedestrian navigation", IEEE Conference on Control Applications, Mexico City, Mexico, 2001, 1-4.

Soehren, et al., "Prototype personal navigation system", IEE A&E Systems Magazine, Apr. 2008, 539-546.

Hu et al.; "Human Gait Estimation Using a Reduced Number of Accelerometers"; Aug. 2010; Sice Annual Conference; p. 1905-1909.

U.S. Appl. No. 61/649,178, filed May 18, 2012, Kordari et al.

* cited by examiner

METHOD FOR STEP DETECTION AND GAIT DIRECTION ESTIMATION

CROSS-REFERENCES TO RELATED APPLICATIONS

This application is continuation of U.S. patent application Ser. No. 13/791,443, filed Mar. 8, 2013, which claims benefit under 35 U.S.C. §119(e) of Provisional Patent Application No. 61/649,178, filed May 18, 2012, the contents of which is incorporated herein by reference in its entirety.

STATEMENTS AS TO THE RIGHTS TO INVENTIONS MADE UNDER FEDERALLY SPONSORED RESEARCH OR DEVELOPMENT

This invention is based upon work supported and/or sponsored by the Defense Advanced Research Project Agency (DARPA) Special Project Office under SBIR Contract Number W31P4Q-12-C-0043, entitled "Handheld Applications for Warfighters", administered by DCMA Baltimore, 217 East Redwood Street, Suite 1800, Baltimore, Md. 21202.

BRIEF DESCRIPTION

A method is described for detecting a human's steps and estimating the horizontal translation direction and scaling of the resulting motion relative to an inertial sensor, regardless of or in spite of a changing torso mounting location. When a pedestrian takes a sequence of steps, the displacement can be decomposed into a sequence of rotations and translations over each step. A translation is the change in the location of the pedestrian's center of mass and a rotation is the change along the z-axis of the pedestrian's orientation. A translation can be described by a vector and a rotation by an angle. The cumulative rotation over a path is computed using gyro information. The method can use only accelerometer signals and works robustly with a torso mounted location.

REFERENCE TO A "SEQUENCE LISTING," A TABLE, OR A COMPUTER PROGRAM LISTING APPENDIX SUBMITTED ON A COMPACT DISK

Not Applicable.

COMPUTER PROGRAM LISTING

A listing of source code is provided in Appendix A.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Torso-mounted inertial sensors are typically attached at the waist and centered in the front or in the back in order to be closest to the center of gravity where there is less extraneous motion. Other mounting locations, such as in a vest pocket are feasible but they change the character of the motion signatures. Moving a system designed for waist mounting to another location on the body can cause performance issues depending on the motion models.

Torso-mounted inertial tracking systems that use microelectromechanical system (MEMS) sensors are typically developed as a pedometer based systems (though this is not always the case if additional velocity sensors are available to provide corrections).

The simplest of the pedometer type systems detects each step and uses a fixed predefined step length to compute the distance traveled, assuming all motions are walking or running forward. See, Judd, T. *A Personal Dead Reckoning Module*. in *ION GPS*. 1997. Kansas City, Mo. This type of system provides adequate performance for runners and other athletes with an approximately fixed pace attempting to record some measure of their workout distance.

Step detection is a critical function in any pedometer system. FIG. 1 shows typical raw z-axis accelerometer data from a waist mounted sensor for a person going up a series of steps. A circle mark at the bottom of each of the accelerometer signals indicates a heel strike associated with each step, which is based on a local minima in the accelerometer data. While one might expect that the magnitude of the signal would be consistent when performing uniform motions, it is clear from this sample that there can be significant magnitude variation in the acceleration while going up steps. As illustrated in FIG. 2, that variation can be even more extreme over different motions. If the variation in magnitude is significant, it can cause issues with missed detections because, for example, in order to eliminate false detections, values less than a threshold may be ignored. This may cause a simple detector to miss soft steps.

For example, FIG. 2 shows typical three axis accelerometer data taken while walking in an office building. The x-axis data is illustrated by a dash-dot-dot line, which is largely obscured by the y-axis data, which is shown as a solid line. The z-axis data is illustrated by a dash-dash line. The data collected and illustrated in FIG. 2 was collected while a subject walked down 4 flights of stairs, down a hallway, and up 4 flights of stairs. A visual inspection of this accelerometer data suggests the ability to differentiate between walking down stairs, upstairs and forward based on signal characteristics, as indicated in FIG. 2.

More sophisticated pedometers include motion models to better estimate step length. In the context of pedestrian tracking, the motion models typically referred to in the literature describe motion type (walking, running, crawling . . . ) and step length and frequency. See, id.; Funk, B., et al., *Method and System for Locating and Monitoring First Responders*, U.S. Publication Number 2008/0077326 ("Funk").

For example, step length can be estimated based on a tracked subject's height, step frequency, and other factors. In general, for walking, the speed and step length increase when the step frequency increases, and for a given step frequency, step length remains fairly constant (with some distribution about a nominal value). Considering the human body's locomotion and physical restrictions, different methods have been proposed to approximate the step length. Linear models have been derived by fitting a linear combination of step frequency and measured acceleration magnitude to the captured data. Pedometer systems may also provide a mechanism for using GPS or other measures to adaptively update the step length estimates. See, Ladetto, Q., *On foot navigation: continuous step calibration using both complementary recursive prediction and adaptive Kalman filtering*, in *ION GPS*. 2000; Lee, S. and K. Mase, *Recognition of Walking Behaviors for Pedestrian Navigation*, in *IEEE Conference on Control Applications (CCA01)*. 2001: Mexico City, Mexico; Fang, L., et al., Design of a Wireless Assisted Pedestrian Dead Reckoning System—The NavMote Experience. IEEE Transactions on Instrumentation and Measurement, 2005. 54(6): p. 2342-2358; Ladetto, Q., et al. Digital Magnetic Compass and Gyroscope for Dismounted Solider Position and Navigation. in Military Capabilities enabled by Advances in Navigation Sensors, Sensors & Electronics Technology Panel, NATO-RTO meetings. 2002. Istanbul, Turkey ("Ladetto"); Godha, S., G. Lachapelle, and M. Cannon, Integrated GPS/INS System for Pedestrian Navigation in a Signal Degraded Environment, in ION GNSS. 2006. Fort Worth, Tex.: ION.

In Chau, T., A Review of Analytical Techniques for Gait Data. Part 1: Fuzzy, Statistical and Fractal Methods. Gait and Posture, 2001. 13: p. 49-66 and Chau, T., A Review of Analytical Techniques for Gait Data. Part 2: Neural Network and Wavelet Methods. Gait and Posture, 2001. 13: p. 102-120, a review of analytical techniques is presented. The techniques have the potential for a step data analysis, including Fuzzy Logic (FL), statistical, fractal, wavelet, and Artificial Neural Network (ANN) methods.

In order to account for motion direction, pedometers may break the tracking problem down into motion classification and then scaling, not assuming, for example, that every motion is forward. They provide a mechanism to classify the motions as forward, backward, up, down, left, right, etc. See, Funk; Ladetto; and Soehren. W. and W. Hawkinson, Prototype Personal Navigation System. IEEE A&E SYSTEMS MAGAZINE, 2008(April) ("Soehren"). While prior claims have been made regarding the ability to classify motion based on comparison with stored motion data or to use neural networks to classify motion, little detail, and certainly not enabling disclosures have been provided regarding how this is done. Aside from the use of vision systems for classification, published work on motion classification is limited. Ladetto suggests using the antero-posterior acceleration divided by the lateral acceleration as an indicator of direction together with the lateral acceleration data peak angles to determine left versus right side stepping. Soehren uses an abrupt change in step frequency to detect walking versus running. Funk describes a neural network classification method where sensor data is segmented into steps and then normalized (re-sampled) to make a consistent number of inputs to the neural network classifier that is independent of step frequency. This method has been used to classify standard pedestrian motions as well as more utilitarian job related motions such as crawling and climbing ladders.

DETAILED DESCRIPTION OF ILLUSTRATIVE EMBODIMENTS

A method for estimating hip elevation and using that estimate for step detection and sealing based on the extrema of the estimated hip elevation has been developed. The relative translation direction for each step may also be computed.

When a pedestrian wearing an accelerometer device takes a sequence of steps, the displacement of the devices and therefore the pedestrian may be decomposed into a sequence of rotations and translations over each step. A translation is the change in the location of pedestrian's center of mass and a rotation is the change along z-axis of the pedestrian's orientation. A translation may be described by a vector and a rotation may be described by an angle.

In an embodiment, translations may be computed using only accelerometer signals. Rotations may be computed using gyro heading information. The algorithm of the embodiment has been demonstrated to be robust to torso mounting location. The computer program listings of Appendix A illustrate an embodiment of source code instructions for an algorithm which may be implemented in a computer system including a non-transient memory and a storage system for storing instructions for implementing the source code instructions, a central processing unit for executing those instructions, and input/output systems for receiving input and other instructions and outputting results and displaying data. The source code instructions set forth in Appendix A, which are incorporated herein by reference in their entirety, are as follows:

File Name hipStepDetector_header hipStepDetector neuralNet2_header neuralNet2 neuralNET4GWeights tracker2

The steps of the algorithm illustrated in the source code instructions are as follows (if not otherwise stated, calculated or processed data is stored in memory for subsequent use):

Sample 3-axis accelerometer data. In this embodiment, the sampling frequency tested was $f_s=40$ Hz but any frequency above twice the Nyquist frequency for the motion will work. Once the accelerometer data is collected from the device, which may include a smartphone type device, the accelerometer data is stored in the non-transitory memory of a computer having a processor.

Figure 1:
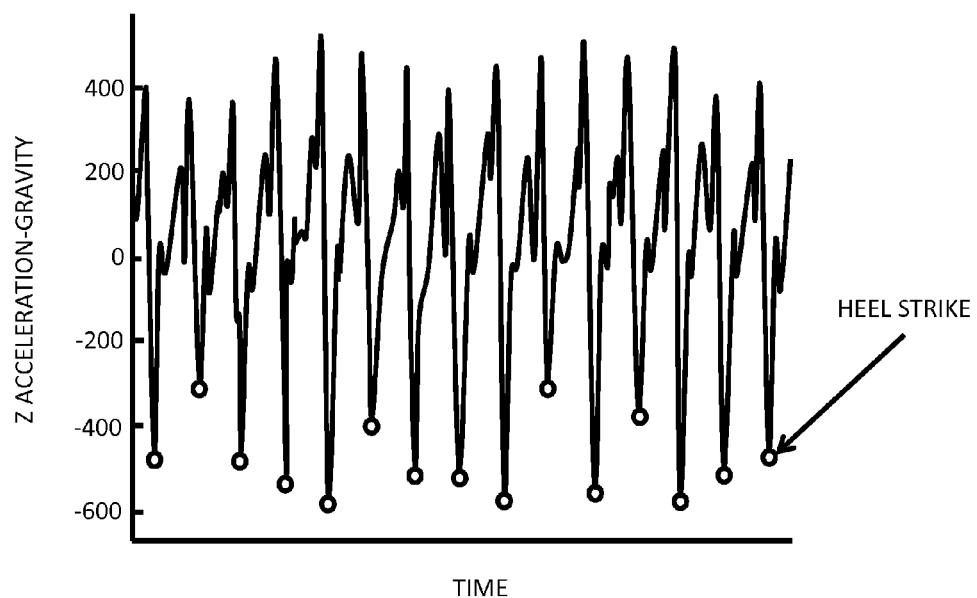
FIG. 1 is an illustration plotting z-axis accelerometer signals over time with heel strikes indicated.
Figure 2:
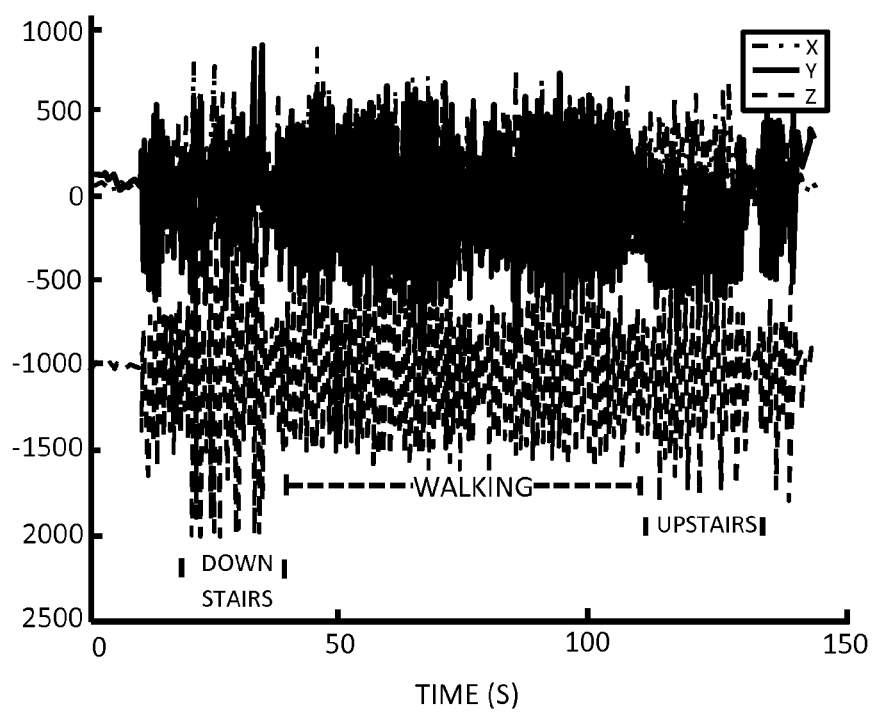
FIG. 2 is an illustration of raw accelerometer signals from x, y and z-axis during typical pedestrian motions.
Figure 3:
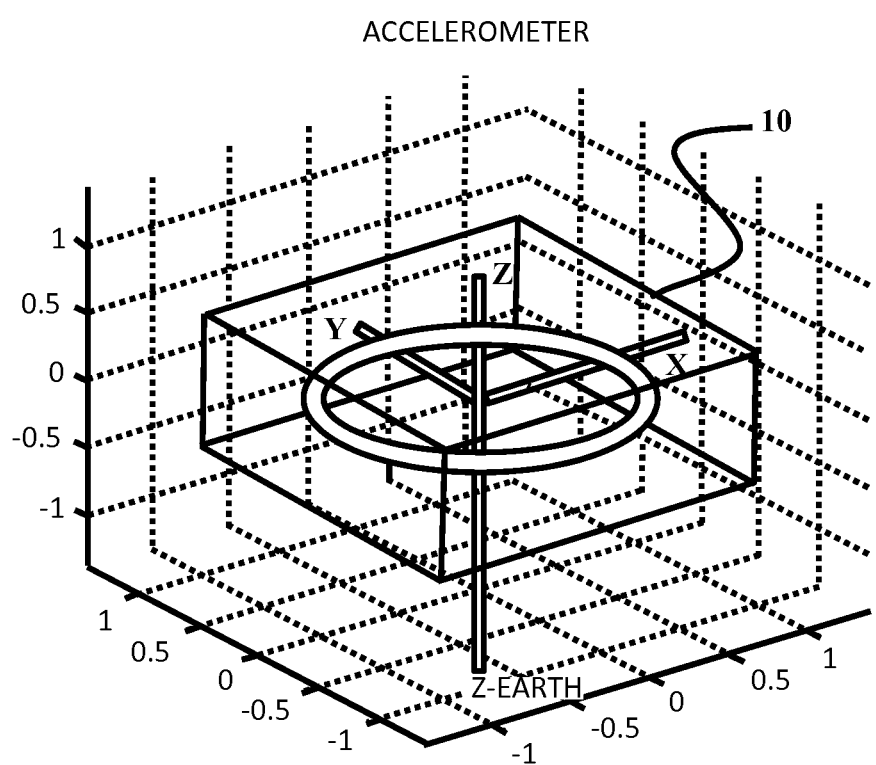
FIG. 3 is an illustration of accelerometer orientation.

As illustrated in FIG. 3, the accelerometer device, represented by the ring 10, is oriented within the navigation frame 11, such that the z-axis is up and down from the device, the x-axis points to the right and left of the unit device the y-axis points forward and backward from the device. If the accelerometer device is tilted from this navigation or ground frame (often there is a slight tilt when people are walking), a method of removing tilt must be implemented. Assuming zero (or near zero) non-gravitational acceleration, the accelerometer data can be used to obtain a noisy measurement of pitch (pitch data) and roll (roll data) relative to the ground frame based on the x-axis, y-axis and z-axis data from the device. Tilt data can then be removed using only the accelerometer's input of x-axis, y-axis and z-axis data. The accelerometer data with the tilt data removed is referred to as first improved accelerometer data, which is then stored in the non-transitory memory. More reliable tilt compensation is possible if x-axis, y-axis and z-axis data from a 3-axis gyroscope in the device is also available. In this embodiment, the orientation filter described below, which uses both accelerometer and gyro information was used to remove tilt.

Once oriented in the navigation frame, established by the first improved accelerometer data, gravitational acceleration can be removed from the z-axis acceleration as follows:

$$\bar{a}_z = a_z - g$$

where $a_z$ is improved accelerometer data for the z-axis, g is gravity, and $\bar{a}_z$ is improved accelerometer data for the z-axis minus gravitational acceleration.

Pass the sampled accelerometer data ($a_x$, $a_y$, $\bar{a}_z$) through a band pass filter to remove any additional bias and high frequency noise. In this embodiment, the band pass filter has a low frequency cutoff at 0.02 Hz and high frequency cutoff at 4 Hz; however, any filter that removes bias and high frequency noise is sufficient.

Compute the hip elevation estimate by double integrating the filtered z accelerometer data as follows:

$$h_e = -\iint \bar{a}_z$$

The integral is negated since it is desirable to have the hip elevation increase in the positive z-axis direction (i.e., up).

Zero the mean. The hip elevation should be a periodic function about some mean elevation. Because of noise, bias or other errors in the accelerometer signal the hip elevation estimate may drift away from the mean. A method for drift removal must be implemented. In this embodiment, the mean was removed from the recent hip elevation data buffer each time a new value a computed. The buffer of recent points in this embodiment is 128.

Figure 4:
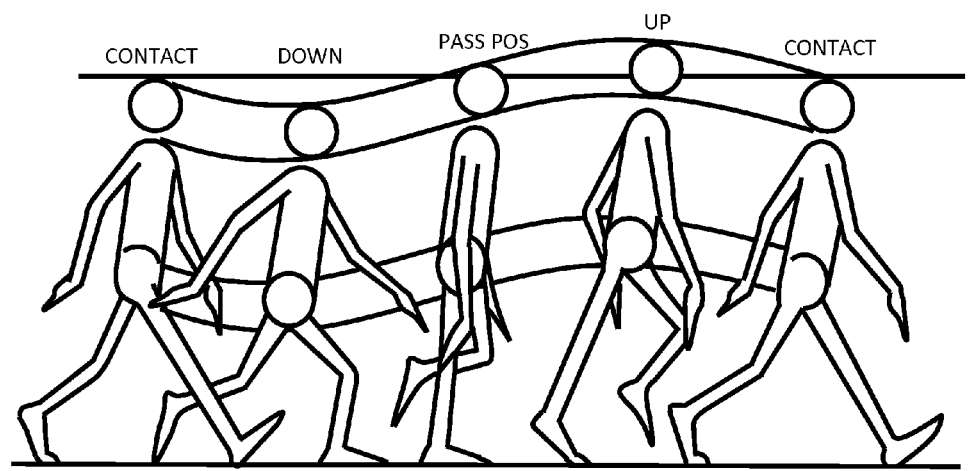
FIG. 4 is an illustration of hip motion over a stride.

Find the extrema (i.e., local minima and local maxima). Each local minimum marks a step. As illustrated in FIG. 4, the local minima occur, indicated by the figure labeled as "down", slightly after each heel strike, indicated by the figure labeled as "contact". The local maxima occur, indicated by the figure labeled as "up", slightly after a passive position, indicated by the figure labeled as "pass pos". Smoothing the signal prior to finding the extrema can reduce extraneous detections. In this embodiment, to reduce extraneous detections, a test is performed to determine that there are no neighboring minima (minima other than local minima) within a 21 sample window including 10 samples before and 10 samples after. Sample windows of other sizes with n samples before and n samples after each local minima could also be used. If any neighboring minima are detected within the sample window, the neighboring minima are not counted as local minima.

Classification: a three gait neural network classifier classifies the gait into one of these classes:

1. Level (moving in the horizontal plane—2D)
2. Up (stairs, ramp, etc.)
3. Down (stairs, ramp, etc.)

While no movement or "garbage" movement is not a neural network class, a garbage gait is determined in a separate process to denote motion that does not produce displacement (if it does not satisfy certain criteria then it is considered garbage). For example, running in place would be garbage motion. The neural net used in this embodiment is a feed-forward back propagation network that has 2 hidden layers, as further illustrated in Table 1.

TABLE 1

| Layer | Number of nodes |
|---|---|
| Input | 67 |
| Hidden layer 1 | 40 |
| Hidden layer 2 | 24 |
| Output | 3 |

The inputs to the neural net should be chosen so they are invariant to motion speed, amplitude, and quickly capture changes in the subject's motion. Also the inputs should be normalized so that no input is inadvertently weighted more than another value. To accomplish this, classification is done on a per step basis. The sensor data taken over each step is re-sampled to provide 10 values regardless of the motion speed over the step. The data for each input value is normalized to be between +1 and −1 by referencing a very large data set of human motion data and determining the range for each input value. The inputs to the neural network are as follows: Once a step is detected, the tilt compensated (navigation frame) angular velocity and acceleration values are integrated over the step to produce a sequence of angle and velocity vectors. The angle, velocity and acceleration vectors are then normalized and re-sampled to give ten values each for the x, y, and z components of the angle ($\theta_x$, $\theta_y$, $\theta_z$) and velocity ($v_x$, $v_y$, $v_z$). These are the first 60 inputs noted in Table 1. The subsequent seven inputs noted in Table 1 are the acceleration amplitude difference over the step, $\max(a_x) - \min(a_x)$, $\max(a_y) - \min(a_y)$, $\max(a_z) - \min(a_z)$, the posture vector ($p_x$, $p_y$, $p_z$) (i.e. orientation vector) at the end of the step, and the index where magnitude of the x y plane acceleration, $\sqrt{a_x^2 + a_y^2}$, achieves its minimum value. These set of input signals were selected by testing different combination of input data and selecting the data set that produced the best classification accuracy. The tested signals included acceleration, velocity, displacement, angular velocity, and angle vectors as well as their amplitudes, means, variances, and sliding windowed variances.

In the time interval between the local minima (short time after heel strike) and following maxima (mid stride), integrate filtered x and y acceleration to find the displacement in the x and y directions for each step $$d_x = \iint a_x$$

$$d_y = \iint a_y$$

Note that, for the use in finding movement direction, it is not necessary to integrate over the entire interval as long as $a_x$ and $a_y$ are integrated over the same interval.

The translation direction, D, for each step is computed as $$D = \tan^{-1}(d_y/d_x)$$

where 90 degrees is forward, 0 is side right, −90 is backward and 180 is side left. The movement direction can assume all other possibilities between these four cardinal directions.

Figure 5:
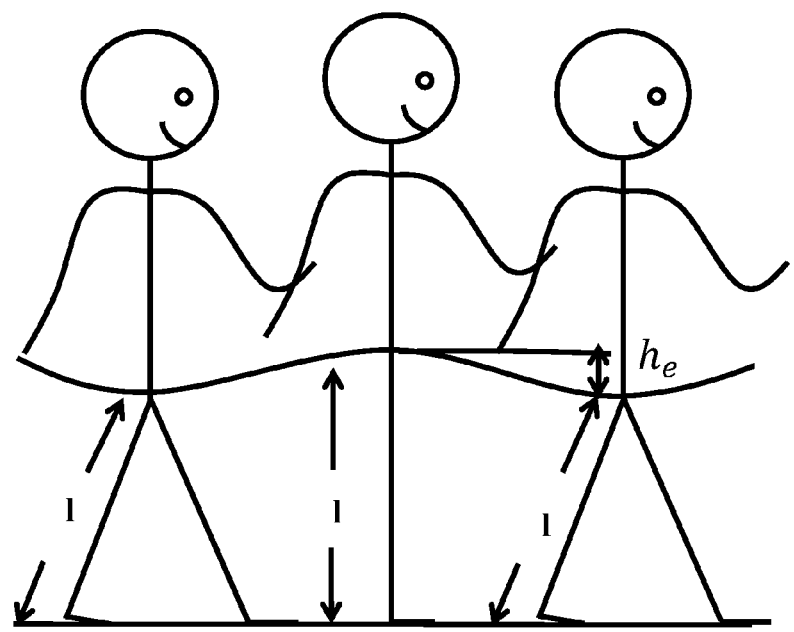
FIG. 5 is an illustration of a stride model showing hip elevation change.

The 2D movement displacement (stride length) is calculated as a function of the change in hip elevation between the minima and maxima of hip elevation $h_e$. If a simplistic stride model is assumed, as is illustrated in FIG. 5, in which the legs (length l) form the sides of an isosceles triangle when in full stride, the change in hip elevation $h_e$ is related to the stride length by:

$$\text{stride} = 2\sqrt{l^2 - (l - h_e)^2}.$$

Realistic walking models are slightly more complex, such as is illustrated by FIG. 4. Other stride length models are possible without assuming any knowledge of the subject's leg length. For example, since $d_x$ and $d_y$ are x and y movement computed across a portion of the stride, another possible stride estimate would be:

$$\text{stride} = k \| d_x, d_y \|$$

where k is a coefficient that must be estimated, in this case where the integration interval between the local minima and following maxima, the distance is about half a stride so k should be approximately equal to 2. In the embodiment, it is assumed there is no access to leg length so a linear function of the change in hip elevation between the minima and maxima of hip elevation is assumed as follows:

$$stride = kh_e$$

In the embodiment, k=0.2 millimeters/meter was used and produced good results.

If the gait is classified as up or down, then elevation change is calculated based on pressure change.

The accelerometer based translation direction computation is complementary to a gyroscope heading: it does not capture standard turns (rotation about the z axis). To produce a complete path, the gyro heading is computed, in this embodiment, by summing the changes in angular velocity and adding them to the initial heading, which is then added to the translation direction.

The path is updated by applying the displacement vector in the computed heading direction and the elevation change to the last point of the path and adding the new point to the path.

Classification of sub-gaits: moving in 2D space is broken down to 6 sub-gaits, (1) forward (2) backward (3) side right (4) side left (5) run (6) garbage, by characterizing each gait based on the moving direction and other quantities that are descriptive of these sub-gaits (e.g. variances, mean, magnitude, and difference in inertial data: including acceleration, velocity, displacement, angular velocity, and angle over the time window step was happening). These sub-gaits are not considered when updating the path location, but are reported in by the algorithm.

A reliability measure is associated with each estimate based on identifying reasonable human motion constraints on angle, hip elevation and distance traveled over each step. For example, the change in angle along x-direction should be bounded within a reasonable range. For each constraint that is not met, the reliability of the estimate is lowered. The goal in computing reliability is to provide a method to determine if the subject's motion is causing the subject to change location (for example, not just swaying back and forth). In the embodiment, if three constraints are not met, the stride length is set to zero.

There are two main sources of error in the computation of movement direction that enter into pedometer based inertial tracking systems.
1. Movement in a relative direction that is not handled by the classifier (and not captured by a gyroscope or compass); and
2. Placement of the inertial sensors in an orientation other than what is assumed.

These types of errors are difficult to correct with a compass or gyro without information on the true heading because they are caused by either translation of the sensor without change in sensor orientation or erroneous initialization assumptions.

Movement direction errors are caused by limiting the possible directions of motion relative to the sensor. For example, if a mechanism is provided only to classify the motions as forward, backward, left, or right (relative to the heading of the sensor), this classification of the motion into four possible cardinal directions leaves room for error. In this case, if the person is walking sideways but their body oriented at 45 degrees to the direction of travel, the motion direction computed would be incorrect since the motion relative to the sensor would be 45 degrees. As described below, the embodiment enables estimate of any movement direction regardless of the sensor orientation.

It is typical with pedometer tracking systems to assume a placement location and orientation of the inertial sensor. Given this information, when movement is computed it is relative to this orientation so if the placement assumption is incorrect, errors are introduced. For example, if a waist mounted inertial sensor was expected to be centered, but in fact was shifted off to the left or right by a few degrees, the movement for each step would have a heading error equal to the amount of the offset. As described below, the embodiment provides a mechanism for detection of the offset position.

The tests described below and with reference to FIGS. 6 and 7 show performance of the algorithm in correcting movement direction errors. The data shown is for a single subject, but tests have been performed using the same algorithm with different subjects with similar results. The step detection shows an ability to accurately track slow/soft movements as well as motions that do not fit into the set of classified motions.

Figure 6A:
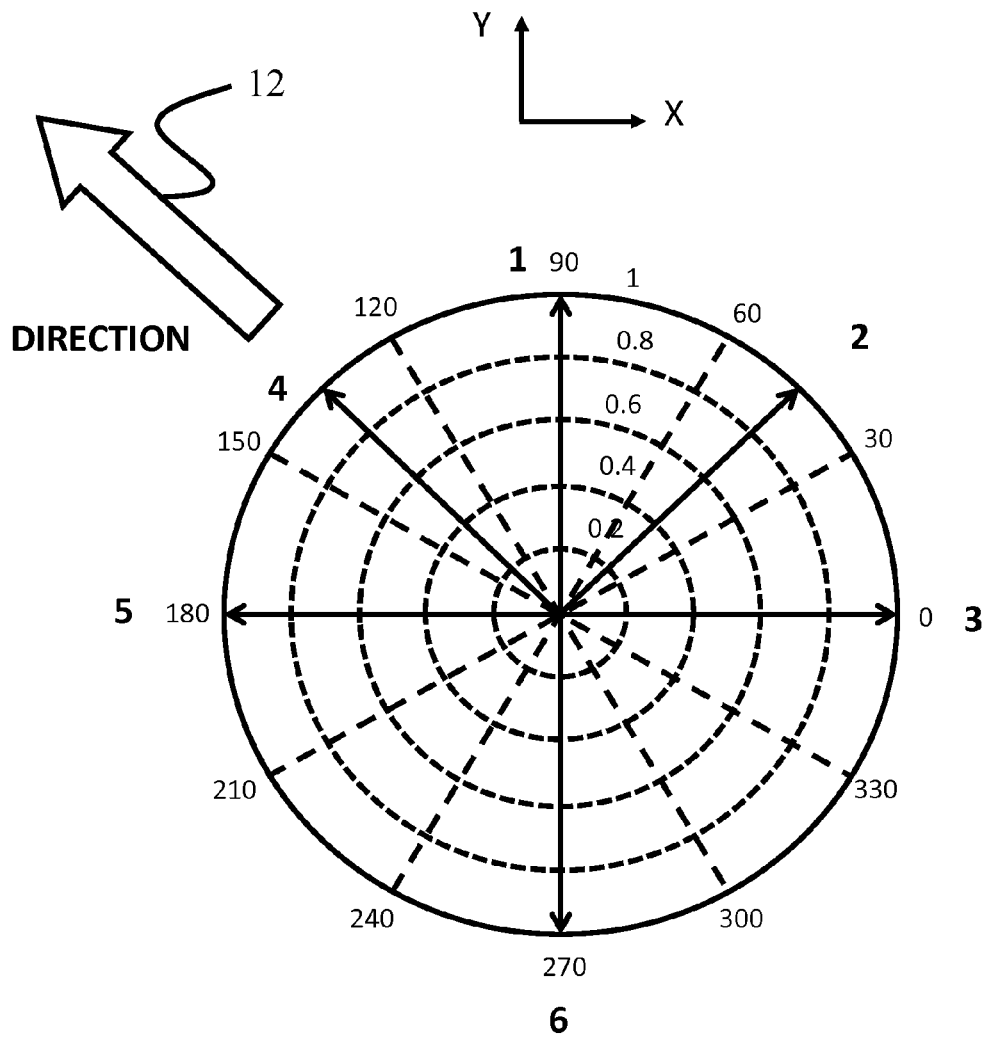
FIGS. 6A and 6B are illustrations of a relative direction of motion test setup and the corresponding results.
Figure 6B:
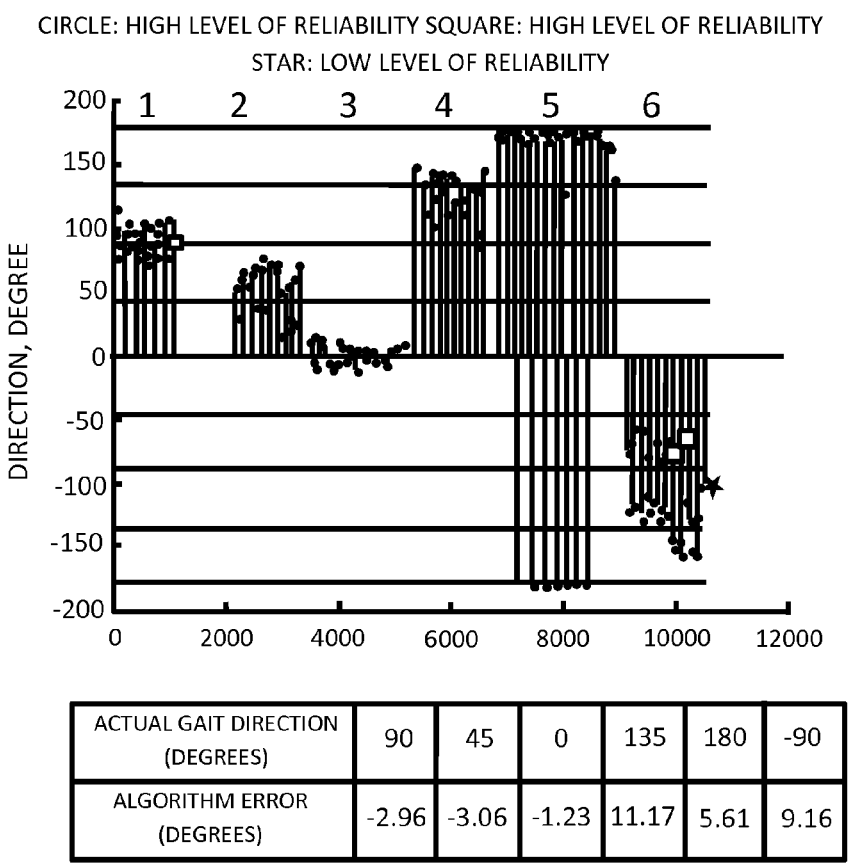

In the tests, the subject wears the inertial sensor at the waist positioned center front. The subject moves in different directions but maintains a fixed orientation (facing the same direction 12) throughout the test. The algorithm is able to compute the relative direction of movement using the algorithm described above. FIG. 6A shows a top view (overhead) of the placement of the inertial sensor and relative heading directions that are tested, and each of six consecutively numbered actual gait directions (1—90 degrees, 2—45 degrees, 3—0 degrees, 4—135 degrees, 5—180 degrees and 6—270 degrees). FIG. 6B shows the results of the algorithm's estimate of the direction for each step over time, with the horizontal lines of the graph indicating the direction degree and the end points of the vertical lines showing approximate directions (−180, −135, −90 (270), −45, 0, 45, 90, 135, 180) that are detected. Most of the end points of the vertical lines are circles or squares, indicating a high level of reliability, but one star indicates a low level of reliability.

The test procedure was as follows: With the body facing in a fixed direction 12, the subject walks for 35 meters forward (1—90 degrees), then still facing in the same direction 12, the subject moves at 45 degrees (2—45 degrees), then walks sideways to the right (3—0 degrees). Maintaining the same facing direction 12, the subject walks at an angle between forward and side left (4—135 degrees), then walks sideway left (5—180 degrees), and finally walks backward (6—270 degrees). The table in FIG. 63 reports the resulting algorithm error in terms of degrees, with the average error over the test estimated to be 5.5 degrees.

Note that because the subject is facing in a constant direction but moving in different directions, a gyroscope would indicate a relatively fixed heading throughout the test. The tracking algorithm may combine this new motion information from the accelerometer with any gyro-compass tracking algorithm to provide improved 2-D motion estimation without the need for complex motion classifiers that are affected by mounting position.

Figure 7A:
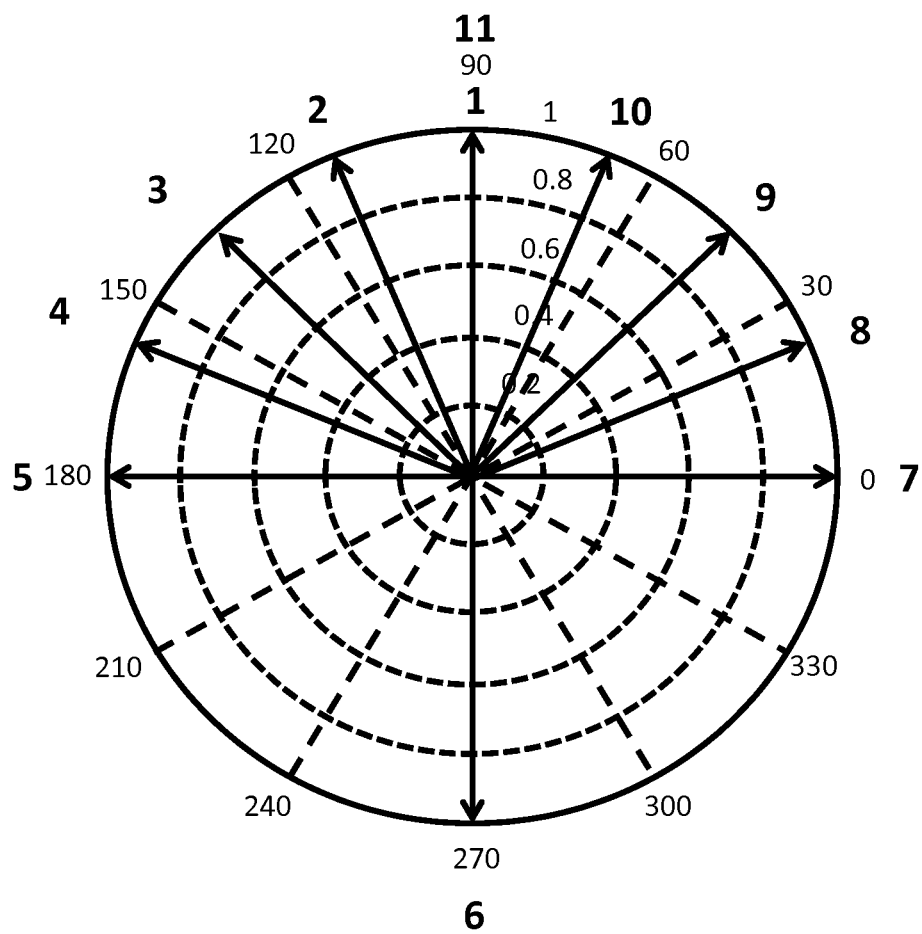
FIGS. 7A and 7B are illustrations of a sensor offset detection test setup and the corresponding results.
Figure 7B:
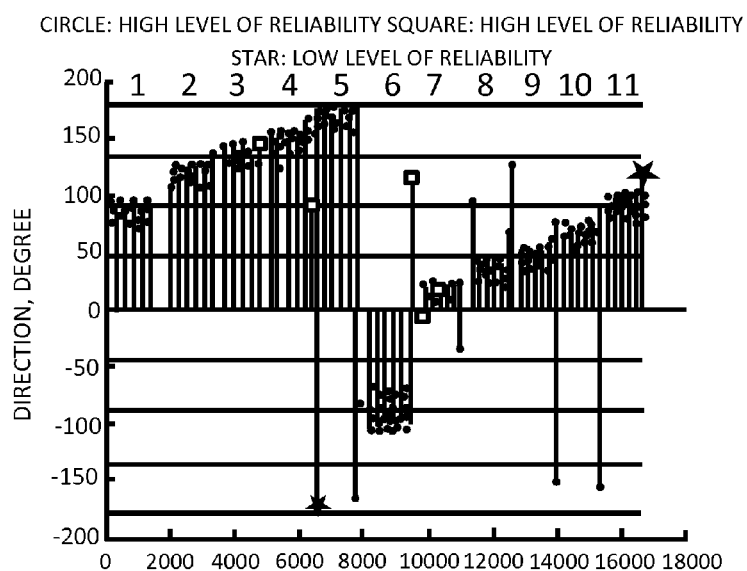

In a second test related to determining sensor orientation, the subject wears the inertial sensor at varying positions around the waist while walking forward. The algorithm is able to compute the orientation of the sensor with respect to the direction of movement. This may be done using the identical algorithm used to compute the relative direction of movement as above. In this case, the algorithm would have to detect that the subject was walking forward (perhaps with another classification algorithm) or make an assumption that the majority of motions would be forward in order to compute the offset. As illustrated in FIG. 7A, an overhead view of the placement of the inertial sensor is again shown, and each of eleven numbered forward directions are noted (1—90 degrees, 2—112.5 degrees, 3—135 degrees, 4—157.5 degrees, 5—180 degrees, 6—270 degrees, 7—0 degrees, 8—22.5 degrees, 9—45 degrees, 10—67.5 degrees and 11—90 degrees. FIG. 7B shows the results of the algorithm's estimate of the offset for each step over time. Again, the horizontal lines of the graph indicate the direction degree and the end points of the vertical lines showing approximate directions (−180, −135, −90 (270), −45, 0, 45, 90, 135, 180) that are detected. Most of the end points of the vertical lines are circles or squares, indicating a high level of reliability, but stars indicates a low level of reliability.

The test procedure was as follows: The inertial sensor starting position is center front, FIG. 7A (1—90 degrees). The subject then walks forward 35 meters, the inertial sensor is then moved slightly to the left of center (2—112.5 degrees), again the subject walks forward 35 meters. The inertial sensor is then successively moved again to locations 3, 4, 5, 6, 7, 8, 9, 10 and back to 11 at 90 degrees, the center front starting position, with the subject walking forward 35 meters from each position. In this test the locations are approximated based on the assumption that the person wearing the inertial sensor is a cylinder, which clearly they are not. As illustrated in the table of FIG. 7B, because of the placement uncertainty, the average error over the test is estimated to be 9.2 degrees, which is slightly higher than the previous test.

The step detection and gait direction estimation embodiments disclosed herein can also be extended for continuous tracking using a handheld or body-mounted sensor unit (such as a smartphone), without assuming an initial orientation and allowing for orientation transitions (i.e., answering a phone) during tracking. The only assumptions made are that 1. The majority of steps are in the forward direction, and
2. The tilt-compensated yaw orientation between the sensor unit and the person's being tracked forward direction do not change unless transitioning.

Upon initialization of the sensor unit in an unknown orientation, the orientation filter, described in more detail below with reference to FIGS. 8A-8C, will determine the sensor data in the level frame. This will fix one degree of freedom of the ground/navigation frame (the z-axis), constraining the x-axis and y-axis to lie along the level plane. In order to fix the ground/navigation frame completely, the most frequent direction of translation (assumed to be forward), will be corrected to the y-axis.

In one implementation of an algorithm for calculating the most frequent direction of translation, the possible directions of motion are subdivided into direction bins, and a running average or total of each bin is maintained along with the number of steps in each bin. The most or highest frequented bin's average is considered the forward direction (by assumption). For more reliable detection of forward direction, two separate direction bins should be maintained for even and odd steps. During stable forward gait, even steps will be to one side of the forward direction and odd steps will be to the other. These two directions can then be averaged together to find the forward direction. More sophisticated clustering techniques can also be used to determine the most frequent direction. This "step bias" is subtracted from the translation direction of all steps so that the forward direction of motion will correspond with forward translation. The level filter and most frequent direction of motion completely specify the right-handed navigation frame, allowing for consistent gait direction regardless of orientation as long as the sensor orientation is fairly static relative to the person's forward direction.

Abrupt changes in the orientation of the sensor, such as moving a smartphone to answer it, will change the forward step bias (affecting the translation direction) as well as the accumulated gyro measurement (affecting the rotation direction). These transition periods can be detected by monitoring the orientation over a period of time. If this change exceeds a threshold, then it is the beginning of a transition period. During the transition period, the step bias towards forward no longer applies and the most frequent direction filter must be reset (although steps can still be detected and an estimation of the step bias can be retroactively applied at the end of the transition period). Additionally, since the accumulated measure of rotation with respect to the body can change during this transition, the rotation accumulated until the beginning of the transition period is assumed constant throughout the transition. At the end of the transition period, the navigation frame must once again be established from an unknown orientation and step bias, but after the frame is established (at least one step is needed), the rotation and translation will again be consistent.

An additional class of motion, distinguished from the static handheld/body-mounted class and transition class described above, is periodic movement, such as in a pants pocket or swinging in the hand while walking. This case can be detected by periodicity in the gyroscope sensor data, which can be used for step detection in addition to, or in place of, accelerometer data. By using the gyroscope to extract the step period, a similar procedure as above could be used to detect the relative "swing direction" and allow transitions between all three classes of motion while producing a consistent set of rotations and translations.

Because many inertial measurement units (IMUs) include 3-axis accelerometers and 3-axis gyros, by using knowledge of the gravitational field direction, measurements from the accelerometers may be used to provide drift free redundant estimates of pitch and roll that are very accurate when the person is not moving. Gyroscope and accelerometer measurements may be combined to provide a quaternion based orientation estimate.

Ideally, the gyroscope measurements alone may be sufficient to determine orientation. However, due to sensor imperfection, noise, and bias errors, such estimates rapidly accumulate error. Fortunately, additional orientation information is available via the accelerometer sensors. Assuming the device is at rest on the earth, it will experience 1 g of acceleration in the direction of the center of the earth. This fact constrains the possible device orientations to a plane that fixes the pitch and roll with respect to the earth frame of reference.

Yaw information (earth frame) is not available due to the fact that yawing the device will not change the direction of its gravity vector. Yaw information may be corrected using compass when good compass data is available.

Mathematically orientation estimates may be represented as a quaternion (a 4-dimensional vector of real numbers). The quaternion representation is used to avoid the singularities in the Euler angle parameterization when pitch approaches ±90°. As illustrated in FIG. 8A, orientation estimates 22 may be developed based on gyro data 20, such as the angular rate from the gyros, as further illustrated in FIG. 8B, and a tilt estimate computation 24 based on the estimation of the direction of gravity using the accelerometer data 26, as further illustrated in FIG. 8C. This gyro estimate is good over the short term but suffers from bias as well as saturation errors that cannot be compensated without additional information. Assuming zero (or near zero) non gravitational acceleration, the accelerometer data can be used to obtain a noisy measurement of pitch and roll relative to the ground frame. An embodiment includes a method for combining the two estimates in a way that mitigates their inherent drawbacks.

The gyro and accelerometer estimates are formulated as quaternion estimates and the fusion of the estimates is accomplished via a spherical linear interpolation (SLERP). The fusion is done assuming the gyro computed yaw is correct. By combining the two estimates, it is possible to take advantage of the best properties of both measurements. The combined measurement eliminates the unmitigated errors in pitch and roll while smoothing the noisy accelerometer measurement.

Figure 8A:
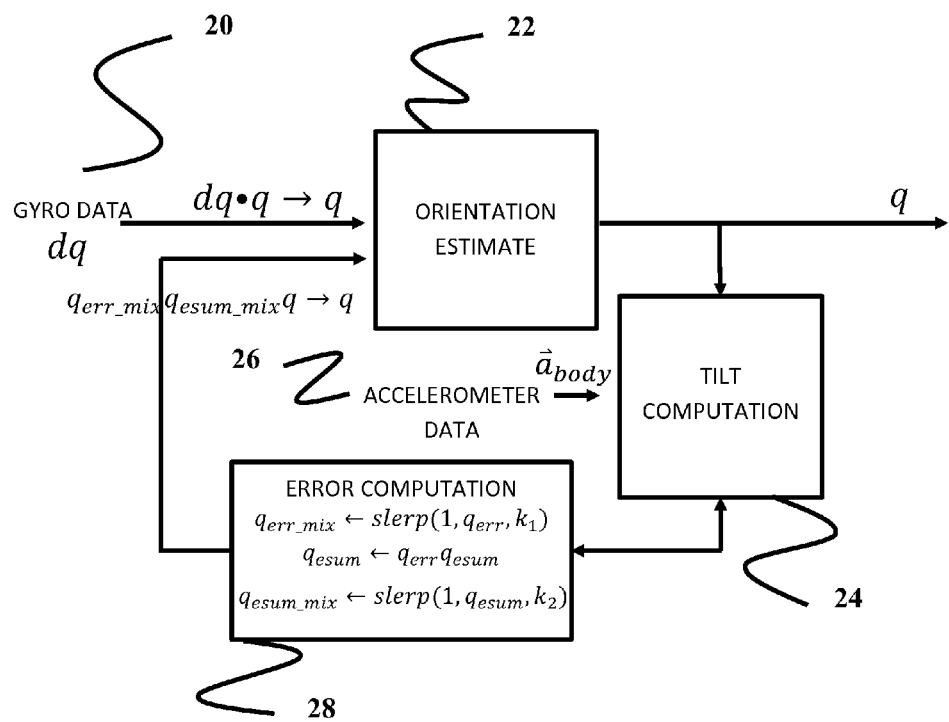
FIG. 8A is a PI implementation of orientation estimator.
Figure 8B:
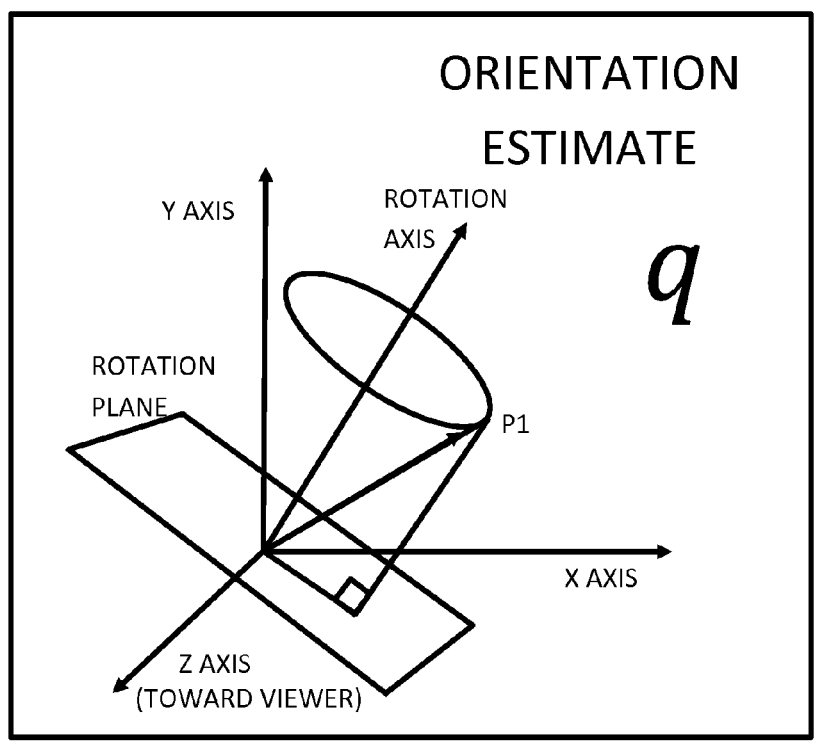
FIG. 8B illustrates the orientation estimate of FIG. 8A.
Figure 8C:
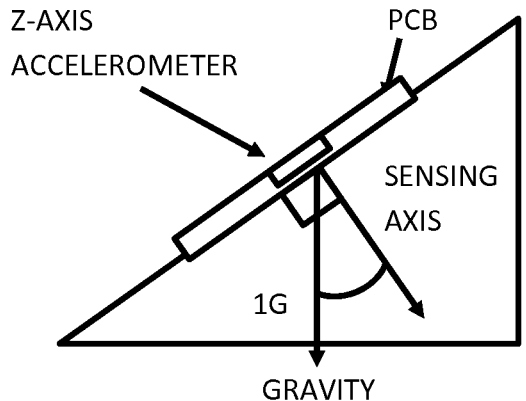
FIG. 8C illustrates the tilt computation of FIG. 8A.

This SLERP combination is formulated in terms of a proportional feedback control loop as illustrated in FIG. 8A. The benefit of the feedback formulation is that well known methods of feedback control can be easily applied. In the embodiment, the accelerometer vector is used to perform an error computation 28 that includes an "error quaternion" and an "error sum quaternion" that are fed back into the orientation estimate 22 update by the gyro measurements 20. In this sense, the implementation is similar to a conventional PI (proportional-integral) controller, except that the proportional and integral terms are quaternions instead of scalars or vectors. The effect of the control is that even if the gyroscopes saturate momentarily because the tracking system has experienced a violent motion, the IMU's attitude estimate will be rapidly corrected.

The filter's state consists of three variables: the orientation estimate q, the "error quaternion" $q_{err}$, and the "error sum quaternion" $q_{sum}$. The filter has two parameters: $k_1$, which is analogous to the proportional term "gain," and $k_2$, which corresponds to the integral term "gain."

The present embodiment is an improvement over prior implementations at least because the signals used for step detection and input to the classifier are less affected by noise and the 2-D movement direction is able to produce any angle rather than quantizing it into one of four possible directions and because of this the shape of the path is more detailed and accurate.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating" "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," and/or "another example" should be considered to mean that the particular features, structures, or characteristics may be combined in one or more examples.

While there has been illustrated and described herein and in Appendix A what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

TRXS-0023 c:\LT_KK_Tracker2\src\C\common\portable\trx\tracker\hipStepDetector.h        1

```c
/**
 * @file tracker/driftDetect.h
 * Spatial vectors
 *
 * @author Kamiar Kordari
 * @author Copyright 2011 TRX Systems. All rights reserved.
 *
 *
 */ ifndef _TRACKER_HIPSTEPDETECTOR_H
define _TRACKER_HIPSTEPDETECTOR_H ifdef __cplusplus
extern "C" {
endif typedef struct
{
    uint16_t    stepNumber;                 // Step Count
    uint32_t    sampleNumber;               // Sample Number
    uint32_t    lastStepSampleNumber;       // Last Step Sample Number
    float       stepLength;                 // Step Length -- in meters
    uint32_t    stepTime;                   // Step Time -- number of samples
    float       stepDirection;              // The direction the user is moving (with
       respect to body frames) -- in radian
    float       he;                         // Hip Elevation -- in cm
    int16_t     reliability;                // reliablity of the direction estimation
       - an integer in [0,10], the higher the more reliable
    float       locationX;                  // X Location -- in meters
    float       locationY;                  // Y Location -- in meters
    float       facingDirection;            // The direction the user is facing --
    in radian
    uint16_t    gait;                       // the standard numbers for gait ID
    uint16_t    netOutput;                  // the standard numbers for gait ID
    double      out1;
    double      out2;
    double      out3;
    double      out4;
    double      out5;
    double      out6;
} stepTracker;

TRX_EXTERN void hsd_init(void);

TRX_EXTERN stepTracker* hipStepDetector(float axNav, float ayNav, float azNav, float
    gxNav, float gyNav, float gzNav, uint32_t sampleNumber, int netOutput, int bSSample);

#ifdef __cplusplus
} // extern "C"
endif endif
```

TRXS-0023 c:\LT_KK_Tracker2\src\C\common\portable\trx\tracker\hipStepDetector.c                    1

```c
/**
 * @file tracker/driftDetect.c
 * Detects gyro drift and global heading
 *
 * @author Kamiar Kordari
 * @author Copyright 2011 TRX Systems. All rights reserved.
 */ include <math.h>
include <float.h>
#include <trx/common.h>
include <trx/util/modbuffer.h>
#include "driftDetect.h"
#include "tracker_constants.h"
#include <trx/stdlib/math.h>
#include "hipStepDetector.h"
include <trx/tracker/step_detector.h> define BUFFER_LENGTH               64
define FILTER_LENGTH               63
#define MIN_SAMPLE_BETWEEN_LOCAL_MINIMUMS   15
#define MAX_SAMPLE_OF_STEP          90
#define MAX_STEP_LENGTH             1.5
define LOCAL_MINIMA_THRESHOLD      -300 static modbuf_t xx;
static modbuf_t yy;
static modbuf_t zz;
static modbuf_t xxf;
static modbuf_t yyf;
static modbuf_t zzf;
static modbuf_t heBuff;
static modbuf_t heSmoothBuff;
static modbuf_t dxf;
static modbuf_t dyf;
static modbuf_t angxf;
static modbuf_t angyf;
static modbuf_t angzf;

static int16_t buffIndex = 0;

static int integration_flag = 0;

static stepTracker st = {0, 0, 0, 0, 0, 0, 0, 0, 0, 0, 0, 0, 0, 0, 0, 0, 0, 0};

void blacksinc(float* hh, int sampleRate, float cutoff, int N, int type);

void hsd_init(void)
{
    static int16_t xx_buffer[BUFFER_LENGTH];
    static int16_t yy_buffer[BUFFER_LENGTH];
    static int16_t zz_buffer[BUFFER_LENGTH];
    static int16_t xxf_buffer[BUFFER_LENGTH];
    static int16_t yyf_buffer[BUFFER_LENGTH];
    static int16_t zzf_buffer[BUFFER_LENGTH];
    static int16_t heBuff_buffer[BUFFER_LENGTH];
    static int16_t heSmoothBuff_buffer[BUFFER_LENGTH];
    static int16_t dxf_buffer[BUFFER_LENGTH];
    static int16_t dyf_buffer[BUFFER_LENGTH];
    static int16_t angxf_buffer[BUFFER_LENGTH];
    static int16_t angyf_buffer[BUFFER_LENGTH];
    static int16_t angzf_buffer[BUFFER_LENGTH];
    buffIndex = 0;
    modbuf_init(&xx, xx_buffer, BUFFER_LENGTH, &buffIndex);
    modbuf_init(&yy, yy_buffer, BUFFER_LENGTH, &buffIndex);
```

```
c:\LT_KK_Tracker2\src\C\common\portable\trx\tracker\hipStepDetector.c                    2
    modbuf_init(&zz, zz_buffer, BUFFER_LENGTH, &buffIndex);
    modbuf_init(&xxf, xxf_buffer, BUFFER_LENGTH, &buffIndex);
    modbuf_init(&yyf, yyf_buffer, BUFFER_LENGTH, &buffIndex);
    modbuf_init(&zzf, zzf_buffer, BUFFER_LENGTH, &buffIndex);
    modbuf_init(&heBuff, heBuff_buffer, BUFFER_LENGTH, &buffIndex);
    modbuf_init(&heSmoothBuff, heSmoothBuff_buffer, BUFFER_LENGTH, &buffIndex);
    modbuf_init(&dxf, dxf_buffer, BUFFER_LENGTH, &buffIndex);
    modbuf_init(&dyf, dyf_buffer, BUFFER_LENGTH, &buffIndex);
    modbuf_init(&angxf, angxf_buffer, BUFFER_LENGTH, &buffIndex);
    modbuf_init(&angyf, angyf_buffer, BUFFER_LENGTH, &buffIndex);
    modbuf_init(&angzf, angzf_buffer, BUFFER_LENGTH, &buffIndex);

} stepTracker* hipStepDetector(float axNav, float ayNav, float azNav, float gxNav, float
    gyNav, float gzNav, uint32_t sampleNumber, int netOutput, int bSSample)
{
    float zztemp=0, yytemp=0, xxtemp=0;
    int i = 0;
    int count = 0;
    int M = FILTER_LENGTH-1; // 40 is the sample rate
    int limit;
    // FILTER (inertial data)
    float hh[FILTER_LENGTH];
    float hl[FILTER_LENGTH];
    float h[FILTER_LENGTH];
    static float he = 0, heAvg = 0;
    float heTemp = 0;
    static float dx=0, dxFinal=0;
    static float dy=0, dyFinal=0;
    static float heading = 0;

static float xxInteg=0, xx2Integ=0;
    static float yyInteg=0, yy2Integ=0;
    static float zzInteg=0, zz2Integ=0;

float sampleRate = 40;
    float sumHH = 0;
    float sumHL = 0;
    float cutoffHH =    0.2/sampleRate;
    float cutoffHL =    4  /sampleRate;
    static float maxHe = -10;
    static float minHe = -10;
    int mid;
    static uint32_t LastSampleNumber=1;

static float angx = 0;
    static float angy = 0;
    static float angz = 0;

static float maxAngx = 0;
    static float minAngx = 0;
    static float maxAngy = 0;
    static float minAngy = 0;
    static float maxAngz = 0;
    static float minAngz = 0;

float dmx = 0;
    float dmy = 0;
    float dmz = 0;
    float dmh = 0;
```

TRXS-0023 c:\LT_KK_Tracker2\src\C\common\portable\trx\tracker\hipStepDetector.c    3

```c
    static double xxSum2 = 0;
    static double yySum2 = 0;
    static double zzSum2 = 0;
    static double xxSum = 0;
    static double yySum = 0;
    static double zzSum = 0;

static double maXxxVar=0, xxVar=0,  maXyyVar=0, yyVar=0, maXzzVar =0, zzVar=0;
    static double maXxxSum2=0, maXyySum2=0, maXzzSum2 =0;

neuralNetGait_t gait;

int16_t counter = 0;

static int SampleSinceNNStep = 0;
    static int NNgait;

double xyNav=0;

if (M % 2)
    {
        M = M+1; // ensures odd length for simplicity.
    } for (i=0; i<(M+1); i++)
    {
        if (i == (M/2))
        {
            hh[i] = 2*M_PI*cutoffHH;
            hl[i] = 2*M_PI*cutoffHL;
        }
        else
        {
            hh[i] = (sinf(2*M_PI*cutoffHH*(i-M/2))/ (i-M/2)) * (0.42 - 0.5*cosf((2*M_PI*
i)/M) + 0.08*cosf((4*M_PI*i)/M));
            hl[i] = (sinf(2*M_PI*cutoffHL*(i-M/2))/ (i-M/2)) * (0.42 - 0.5*cosf((2*M_PI*
i)/M) + 0.08*cosf((4*M_PI*i)/M));
        }
        sumHH += hh[i];
        sumHL += hl[i];
    } for (i=0; i<(M+1); i++)
    {
        hl[i] = hl[i]/sumHL;
        hh[i] = hh[i]/sumHH;
        // high pass filter hh[i] = -hh[i];
    }
    mid = ceil(M/2);
    hh[mid] = hh[mid]+1;

for (i=0; i<(M+1); i++)
    {
        h[i] = -(hh[i]+hl[i]);
    }
    h[mid] = h[mid]+1;

// CALCULATE HIP ELEVATION
    modbuf_write(zz, (int16_t)(azNav));

if(sampleNumber < BUFFER_LENGTH)
        limit = sampleNumber;
```

TRXS-0023 c:\LT_KK_Tracker2\src\C\common\portable\trx\tracker\hipStepDetector.c                                                                4

```c
    else
        limit = (M+1);

zztemp = 0;
    for (i=0; i<limit; i++)
    {
        zztemp += (float)modbuf_read(zz,-i) * h[i];
    } modbuf_write(zzf, (int16_t)(zztemp));

zzInteg += zztemp;
    zz2Integ += zzInteg;
    he = - zz2Integ/40/40;

//modbuf_write(heBuff, (int16_t)(he*1000));
    modbuf_write(heBuff, (int16_t)(he*1000));

heTemp = 0;
    if (sampleNumber > BUFFER_LENGTH)
    {
        for (i=0; i<BUFFER_LENGTH; i++)
        {
            heTemp += modbuf_read(heBuff, -i);
        }
    }
    else
    {
        heTemp = he * BUFFER_LENGTH;
    }
    heAvg = heTemp/BUFFER_LENGTH;
    modbuf_write(heSmoothBuff, (int16_t)((float)modbuf_read(heBuff,-0) - heAvg));

//  x-axis displacement
    modbuf_write(xx, (int16_t)(axNav));

xxtemp = 0;
    for (i=0; i<limit; i++)
    {
        xxtemp += (float)modbuf_read(xx,-i) * h[i];
    } modbuf_write(xxf, (int16_t)(xxtemp));

//  y-axis displacement
    modbuf_write(yy, (int16_t)(ayNav));

yytemp = 0;
    for (i=0; i<limit; i++)
    {
        yytemp += (float)modbuf_read(yy,-i) * h[i];
    } modbuf_write(yyf, (int16_t)(yytemp));

heading += gzNav/40/180*M_PI;

xxInteg += (float)modbuf_read(xxf,-10);
    xx2Integ += xxInteg;
    dx = xx2Integ/40/40;

yyInteg += (float)modbuf_read(yyf,-10);
    yy2Integ += yyInteg;
``` c:\LT_KK_Tracker2\src\C\common\portable\trx\tracker\hipStepDetector.c

```
        dy = yy2Integ/40/40;

for (i=0; i<10; i++)
        {
            xyNav = sqrtf((float)modbuf_read(xx,-i)*(float)modbuf_read(xx,-i) + (float)
    modbuf_read(yy,-i)*(float)modbuf_read(yy,-i));

xxSum2 += xyNav * xyNav;
            xxSum  += xyNav;
//          xxSum2 += (float)modbuf_read(xx,-i) * (float)modbuf_read(xx,-i);
//          xxSum  += (float)modbuf_read(xx,-i);
            yySum2 += (float)modbuf_read(yy,-i) * (float)modbuf_read(yy,-i);
            yySum  += (float)modbuf_read(yy,-i);
            zzSum2 += (float)modbuf_read(zz,-i) * (float)modbuf_read(zz,-i);
            zzSum  += (float)modbuf_read(zz,-i);
        } xxVar = xxSum2/10 - xxSum/10*xxSum/10*10/9;
        yyVar = yySum2/10 - yySum/10*yySum/10*10/9;
        zzVar = zzSum2/10 - zzSum/10*zzSum/10*10/9;

//st.out4 = xxSum2;
        //st.out5 = yySum2;
        //st.out6 = zzSum2;

/*      st.out1 = xxSum2/20 - xxSum/20*xxSum/20*20/19;
        st.out2 = yySum2/20 - yySum/20*yySum/20*20/19;
        st.out3 = zzSum2/20 - zzSum/20*zzSum/20*20/19;*/ angx += gxNav/40; // degree
        angy += gyNav/40; // degree
        angz += gzNav/40; // degree modbuf_write(dxf, (int16_t)(100*dx));
        modbuf_write(dyf, (int16_t)(100*dy));
        modbuf_write(angxf, (int16_t)(10*angx));
        modbuf_write(angyf, (int16_t)(10*angy));
        modbuf_write(angzf, (int16_t)(10*angz));

if ((modbuf_read(heSmoothBuff,-10) > maxHe) && (integration_flag))
        {
            dxFinal = modbuf_read(dxf,0)/100;
            dyFinal = modbuf_read(dyf,0)/100;
            maxHe = modbuf_read(heSmoothBuff,-10);
        } if (integration_flag)
        {
            if (modbuf_read(angxf,-10) > maxAngx)
                maxAngx = modbuf_read(angxf,-10);
            if (modbuf_read(angxf,-10)<minAngx)
                minAngx = modbuf_read(angxf,-10);
            if (modbuf_read(angyf,-10)>maxAngy)
                maxAngy = modbuf_read(angyf,-10);
            if (modbuf_read(angyf,-10)<minAngy)
                minAngy = modbuf_read(angyf,-10);
            if (modbuf_read(angzf,-10)>maxAngz)
                maxAngz = modbuf_read(angzf,-10);
```

TRXS-0023 c:\LT_KK_Tracker2\src\C\common\portable\trx\tracker\hipStepDetector.c                                6

```c
        if (modbuf_read(angzf,-10)<minAngz)
            minAngz = modbuf_read(angzf,-10);
        if (xxVar>maXxxVar)
            maXxxVar = xxVar;
        if (yyVar>maXyyVar)
            maXyyVar = yyVar;
        if (zzVar>maXzzVar)
            maXzzVar = zzVar;
        if (xxSum2>maXxxSum2)
            maXxxSum2 = xxSum2;
        if (yySum2>maXyySum2)
            maXyySum2 = yySum2;
        if (zzSum2>maXzzSum2)
            maXzzSum2 = zzSum2;

}

//if((sampleNumber-LastSampleNumber)>20)
        //{
            xxSum2 = 0;
            yySum2 = 0;
            zzSum2 = 0;
            xxSum = 0;
            yySum = 0;
            zzSum = 0;
        //}

// reset if no step has been detected in the past MAX_SAMPLE_OF_STEP samples
    if ((sampleNumber - LastSampleNumber)> MAX_SAMPLE_OF_STEP)
    {
        integration_flag = 0;
        st.stepDirection = 0;    // rad
        st.stepLength = 0;
        st.stepTime = 0;
        st.he = 0;
    }

// find the local minima that satisfies the minimum value requirement, when count is
    10 there is such minima
    count = 0;
    if ((sampleNumber>20) && ((float)modbuf_read(heSmoothBuff,-10) <
    LOCAL_MINIMA_THRESHOLD))
    {
        for (i = 1; i<11; i++)
        {
            if( (((float)modbuf_read(heSmoothBuff,-10)) <= (float)modbuf_read
    (heSmoothBuff,-10+i)) && (((float)modbuf_read(heSmoothBuff,-10)) <= (float)
    modbuf_read(heSmoothBuff,-10-i)))
                count++;
        }
    }

// if NN detects a step, record the gait type and start a clock
    if (bSSample)
    {
        SampleSinceNNStep = 0;
        NNgait = netOutput;
    }
    else
        SampleSinceNNStep++;
```

```
c:\LT_KK_Tracker2\src\C\common\portable\trx\tracker\hipStepDetector.c                    7 st.netOutput = NNgait;

st.he = modbuf_read(heSmoothBuff,-10);

// for a local minima to be valid it has to be seperated from the last local minima
by MIN_SAMPLE_BETWEEN_LOCAL_MINIMUMS samples
    if (count == 10 && ((sampleNumber - LastSampleNumber)>
MIN_SAMPLE_BETWEEN_LOCAL_MINIMUMS))
    {
        //st.he  = 0;
        // integration_flag ==1 means the user has been moving and a local minima was
recently detected
        if (integration_flag)
        {
            // range of chanhe fpr angles and hip elevation
            dmx = (maxAngx - minAngx)/10;
            dmy = (maxAngy - minAngy)/10;
            dmz = (maxAngz - minAngz)/10;
            dmh = (maxHe - minHe)/1000;

// calculate reliability: counter is
            if (dmx >1)
                counter++;
            if (dmy > 1)
                counter++;
            if (dmz > 1)
                counter++;
            if ((dmh/dmy)<4)
                counter++;
            if ((dmz<12))
                counter++;
            if ((dmx<7))
                counter++;
            if ((dmh<9))
                counter++;
            if ((dmh*dmy*dmx*dmz)>10)
                counter++;
            if ((dmx/dmy)<3)
                counter++;
            if ((sqrtf(dxFinal* dxFinal+dyFinal*dyFinal)/5/1.2) > 0.05)
                counter++;

if ((counter>7))
            {
                //st.out1 = xxSum2/(sampleNumber-LastSampleNumber) - xxSum/(sampleNumber-
LastSampleNumber)*xxSum/(sampleNumber-LastSampleNumber);
                //st.out2 = yySum2/(sampleNumber-LastSampleNumber) - yySum/(sampleNumber-
LastSampleNumber)*yySum/(sampleNumber-LastSampleNumber);
                //st.out3 = zzSum2/(sampleNumber-LastSampleNumber) - zzSum/(sampleNumber-
LastSampleNumber)*zzSum/(sampleNumber-LastSampleNumber);
                //st.out4 = xxSum2/(sampleNumber-LastSampleNumber);
                //st.out5 = yySum2/(sampleNumber-LastSampleNumber);
                //st.out6 = zzSum2/(sampleNumber-LastSampleNumber);

st.out1 = dmh; //maXxxVar;
                st.out2 = maXyyVar;
                st.out3 = maXzzVar;

st.out4 = dmx; //maXxxSum2;
                st.out5 = dmy; //maXyySum2;
                st.out6 = dmz; //maXzzSum2;

st.sampleNumber =  sampleNumber -10;
```

TRXS-0023 c:\LT_KK_Tracker2\src\C\common\portable\trx\tracker\hipStepDetector.c    8

```c
            st.lastStepSampleNumber = LastSampleNumber-10;

st.stepDirection = atan2f(dyFinal, dxFinal);     // rad
            st.stepTime = sampleNumber-LastSampleNumber;

// Two methods to calculate step length: (1) from hip elevation (2) from
  displacement in x-y plane
            st.stepLength =  (maxHe-minHe)/1000/5;
            //st.stepLength = sqrtf(dxFinal/1.2* dxFinal/1.2+dyFinal*dyFinal)/5/1.2;

// step length cannot be bigger than this threshold
            if (st.stepLength> MAX_STEP_LENGTH)
                st.stepLength = MAX_STEP_LENGTH;

// extract gait type from step direction
            gait = NN_GARBAGE;
            st.gait = NN_GARBAGE;
            if ((fabs(st.stepDirection-M_PI/2))<M_PI/4 )
            {
                gait =  NN_FORWARD;
                st.gait = 1;
            }
            if ( (fabs(st.stepDirection))<M_PI/4 )
            {
                gait =  NN_SS_RIGHT;
                st.gait = 6;
            } if (((fabs(st.stepDirection+M_PI))<M_PI/4 ) || ((fabs(st.stepDirection-
  M_PI))<M_PI/4 ))
            {
                gait =  NN_SS_LEFT;
                st.gait = 5;
            } if (((fabs(st.stepDirection+M_PI/2))<M_PI/4) || ((fabs(st.stepDirection-3
  *M_PI/2))<M_PI/4 ) )
            {
                gait =  NN_BACKWARD;
                st.gait = 2;
            } if ( (st.stepTime<30) && (dmh>7))
            {
                gait =  NN_RUN;
                st.gait = 11;
                st.stepDirection = M_PI/2;
                st.stepLength = getStepLength((float)st.stepTime * 0.025, st.gait);
            }

//          // detect stairs up
////            if ((NNgait == 3) && (maXzzVar-maXxxVar>9000) && (maXxxVar<50000) &&
//    (dmy>10))
//          if ((maXzzVar-maXxxVar>9000) && (maXxxVar<50000) && (dmy>10))
//          {
//              gait =  NN_UP;
//              st.gait = 3;
//              st.stepDirection = M_PI/2;
//              st.stepLength = getStepLength((float)st.stepTime * 0.025, NNgait);
//          }
//
//          // detect stairs down
////            if ((NNgait == 4) && (maXzzVar-maXxxVar>9000) && (maXzzVar>80000))
//          if ((maXzzVar-maXxxVar>9000) && (maXzzVar>80000))
//          {
```

TRXS-0023 c:\LT_KK_Tracker2\src\C\common\portable\trx\tracker\hipStepDetector.c                        9

```
//                     gait = NN_DOWN;
//                     st.gait = 4;
//                     st.stepDirection = M_PI/2;
//                     st.stepLength = getStepLength((float)st.stepTime * 0.025, NNgait);
//                 }

// detect run
//              if ((NNgait == 11) && (SampleSinceNNStep<40))
//              if ((SampleSinceNNStep<40) && (dmh>8))
        /*      if ( (dmh>8))
                {
                    gait = NN_RUN;
                    st.gait = 11;
                    st.stepDirection = M_PI/2;
                    st.stepLength = getStepLength((float)st.stepTime * 0.025, NNgait);
                }*/

// detect crawl
                //if ((NNgait == 7) && (SampleSinceNNStep<40))
                //{
                //   gait = NN_CRAWLFD;
                //   st.gait = 7;
                //   st.stepDirection = M_PI/2;
                //   st.stepLength = getStepLength((float)st.stepTime * 0.025, NNgait);
                //}

//st.he = (maxHe - minHe)/1000;
                st.stepNumber++;
                st.locationX += sinf(st.stepDirection + heading) * st.stepLength;
                st.locationY += cosf(st.stepDirection + heading) * st.stepLength;

if((NNgait ==255)&& (SampleSinceNNStep<40) && (counter<8))
                {
                    st.reliability = counter-5;
                    st.stepLength = st.stepLength/2;
                }
                else
                    st.reliability = counter;

st.facingDirection = heading;

}
        } xxInteg  = 0;
        xx2Integ = 0;
        yyInteg  = 0;
        yy2Integ = 0;
        dxFinal  = 0;
        dyFinal  = 0;

maxHe = modbuf_read(heSmoothBuff,-10);
        minHe = modbuf_read(heSmoothBuff,-10);

minAngx = modbuf_read(angxf,-10);
        maxAngx = modbuf_read(angxf,-10);
        minAngy = modbuf_read(angyf,-10);
        maxAngy = modbuf_read(angyf,-10);
        minAngz = modbuf_read(angzf,-10);
        maxAngz = modbuf_read(angzf,-10);
```

TRXS-0023 c:\LT_KK_Tracker2\src\C\common\portable\trx\tracker\hipStepDetector.c    10

```c
        maXxxVar = xxVar;
        maXyyVar = yyVar;
        maXzzVar = zzVar;

maXxxSum2 = xxSum2;
        maXyySum2 = yySum2;
        maXzzSum2 = zzSum2;

LastSampleNumber = sampleNumber;

// SET FLAG: INTEGRATION IN PROGRESS
        integration_flag = 1;
    }

//Ensure buff index is in range 0-BUFFER_LENGTH
    buffIndex = sampleNumber % BUFFER_LENGTH;

return &st;
}
```

TRXS-0023

```
c:\LT_KK_Tracker2\src\C\common\portable\trx\tracker\neuralNet2.h                             1
/**
 * @file tracker/neuralNet.h
 * Neural Network
 *
 * @author Kamiar Kordari
 * @author Copyright 2012 TRX Systems. All rights reserved.
 */ ifndef _TRACKER_NEURALNET2_H
define _TRACKER_NEURALNET2_H include <trx/math/vector.h>
include <trx/common.h>
#include <trx/stdlib/stdint.h>
#include "neuralNet.h"

#ifdef __cplusplus
extern "C" {
endif

/**
 * Neural Netwrk Layer
 */
/*typedef struct
{
    int16_t *matrixBase;       ///< Pointer to NN layer weights
    int16_t numNodes;          ///< Number of nodes in NN layer
    int16_t scaleFactor;       ///< Scale factor that has been applied to NN weights
    float *bias;               ///< NN bias vector } neuralNetLayer2_t;

/**
 * Neural Network Output Gait Type
 */
//typedef enum
//{
//    NN_UPSTAIRS     = 0,
//    NN_DOWNSTAIRS   = 1,
//    NN_2D           = 2,
//    NN_NONE         = 3
//    //NN_FORWARD        = 1,
//    //NN_UP             = 3,
//    //NN_DOWN           = 4,
//    //NN_GARBAGE        = 255
//
//} neuralNetGait4Class_t;

/**
 * Initializes the Neural Net Processor
 * @param aX                    pointer to accx modbuffer
 * @param aY                    pointer to accy modbuffer
 * @param aZ                    pointer to accz modbuffer
 * @param gX                    pointer to gyrox modbuffer
 * @param gY                    pointer to gyroy modbuffer
 * @param gZ                    pointer to gyroz modbuffer
 */
//TRX_EXTERN void initNeuralNet2(modbuf_t *aX, modbuf_t *aY, modbuf_t *aZ, modbuf_t *gX,
    modbuf_t *gY, modbuf_t *gZ);
extern void initNeuralNet2(modbuf_t *aX, modbuf_t *aY, modbuf_t *aZ, modbuf_t *aXY,
    modbuf_t *gX, modbuf_t *gY, modbuf_t *gZ, modbuf_t *vX, modbuf_t *vY, modbuf_t *vZ,
    modbuf_t *fX, modbuf_t *fY, modbuf_t *fZ, modbuf_t *pX, modbuf_t *pY, modbuf_t *pZ);

/**
 * Runs the NN with the layers specified for the tracker application
```

TRXS-0023

```
c:\LT_KK_Tracker2\src\C\common\portable\trx\tracker\neuralNet2.h                                    2
 *
 * @param netInput                     pointer to NN input nodes
 *
 * @return                             output gait
 */

//TRX_EXTERN int16_t testNeuralNet2(int16_t *netInput);
//TRX_EXTERN neuralNetGait4Class_t testNeuralNet2(int16_t *netInput);
TRX_EXTERN neuralNetGait_t testNeuralNet2(int16_t *netInput);

/**
 * Runs the NN with a variable number of layers
 * This function is called by testNeuralNet which specifies the layers used for tracker
 *
 * @param inputNodes                   pointer to NN input nodes
 * @param numInputs                    number of inputs
 * @param numLayers                    number of layers
 * @param ...                          variable number of neuralNetLayer_t
 *
 * @return                             output of NN
 */
//TRX_EXTERN float *runNeuralNet2(int16_t *inputNodes, int16_t numInputs, int16_t
    numLayers, ...);

/**
 * Gets the input nodes for the NN over a step
 *
 * @param startStepIndex               index in modbuffer for the start of a step
    (indexed negatively in time)
 * @param stopStepIndex                index in modbuffer for the stop of a step
    (indexed negatively in time)
 * @param postureVector                posture vector at current sample
 *
 * @return                             pointer to NN input nodes
 */

TRX_EXTERN   int16_t *getNetInputNodes2(int16_t startStepIndex, int16_t stopStepIndex);

/**
 * Getter for array of output values from last neural net computation.
 * Used for net debug and determining net confidence.
 *
 * @return                             pointer to float array of output node values
 */
//TRX_EXTERN float* nn_getOutputArray2(void);

//TRX_EXTERN  void inertialBuff_init(void);
//TRX_EXTERN  void inertialBuff_update(void);
//TRX_EXTERN  void inertialBuff_reset(void);

//TRX_EXTERN modbuf_t postureX;
//TRX_EXTERN modbuf_t postureY;
//TRX_EXTERN modbuf_t postureZ;
//TRX_EXTERN modbuf_t fxNav;
//TRX_EXTERN modbuf_t fyNav;
//TRX_EXTERN modbuf_t fzNav;
//TRX_EXTERN modbuf_t vxNav;
//TRX_EXTERN modbuf_t vyNav;
//TRX_EXTERN modbuf_t vzNav;
//TRX_EXTERN modbuf_t axNav;
//TRX_EXTERN modbuf_t ayNav;
//TRX_EXTERN modbuf_t axyNav;
//TRX_EXTERN modbuf_t azNav;
```

TRXS-0023

```
c:\LT_KK_Tracker2\src\C\common\portable\trx\tracker\neuralNet2.h                3 ifdef __cplusplus
} // extern "C"
endif endif
```

TRXS-0023

```
c:\LT_KK_Tracker2\src\C\common\portable\trx\tracker\neuralNet2.c                                    1
/**
 * @file tracker/neuralNet.c
 * Neural Network
 *
 * @author Kamiar Kordari
 * @author Copyright 2012 TRX Systems. All rights reserved.
 */
ifdef __C30
#include <pxxfxxxx.h>
endif include <math.h>
include <stdio.h>
#include <float.h>
include <stdarg.h> include <trx/common.h>
include <trx/util/modbuffer.h>
#include <trx/util/errors.h>
include <trx/math/quaternion.h> include "ann.h"
include "tracker.h"
#include "neuralNet2.h"
#include "tracker_constants.h"

#include "neuralNet4GWeights.h"

//-----------------------------------------------------------------------------
static modbuf_t *axNav;
static modbuf_t *ayNav;
static modbuf_t *axyNav;
static modbuf_t *azNav;

static modbuf_t *gxNav;
static modbuf_t *gyNav;
static modbuf_t *gzNav;

static modbuf_t *vxNav;
static modbuf_t *vyNav;
static modbuf_t *vzNav;

static modbuf_t *fxNav;
static modbuf_t *fyNav;
static modbuf_t *fzNav;

static modbuf_t *postureX;
static modbuf_t *postureY;
static modbuf_t *postureZ;

//-----------------------------------------------------------------------------
#define INPUT_NODES_SIZE                67
#define RESAMPLE_SIZE                   10
//-----------------------------------------------------------------------------

//-----------------------------------------------------------------------------
//static void _removeBias(int16_t *src, uint16_t len);
static void _upsample2(int16_t *src, int16_t *dest, uint16_t srcLength, uint16_t
    destLength);
//static void _processNetLayer(neuralNetLayer2_t *inputLayer, neuralNetLayer2_t *
    weightLayer, float *outputVector);
```

TRXS-0023

```
c:\LT_KK_Tracker2\src\C\common\portable\trx\tracker\neuralNet2.c                    2
//static int16_t _scaleFloat2Int(float *fVector, int16_t *iVector, int16_t len);
//static int16_t _getMaxExp(float *x, int16_t len);
static float _tansig(float x);
static int64_t getNodeSum2(int16_t *inputData, double *weightPtr, int16_t numInputs);
int16_t *getNetInputNodes2(int16_t startStepIndex, int16_t stopStepIndex);
void initNeuralNet2(modbuf_t *aX, modbuf_t *aY, modbuf_t *aZ, modbuf_t *aXY, modbuf_t *gX↵
    , modbuf_t *gY, modbuf_t *gZ, modbuf_t *vX, modbuf_t *vY, modbuf_t *vZ, modbuf_t *fX,↵
     modbuf_t *fY, modbuf_t *fZ, modbuf_t *pX, modbuf_t *pY, modbuf_t *pZ);              ↵

//-----------------------------------------------------------------------------
static float netOutputArray[NUM_OUTPUT_NODES];  //Holds copy of last computed output     ↵
    nodes //-----------------------------------------------------------------------------
float* nn_getOutputArray2(void)
{
    return netOutputArray;
}

//-----------------------------------------------------------------------------
void initNeuralNet2(modbuf_t *aX, modbuf_t *aY, modbuf_t *aZ, modbuf_t *aXY, modbuf_t *gX↵
    , modbuf_t *gY, modbuf_t *gZ, modbuf_t *vX, modbuf_t *vY, modbuf_t *vZ, modbuf_t *fX,↵
     modbuf_t *fY, modbuf_t *fZ, modbuf_t *pX, modbuf_t *pY, modbuf_t *pZ)               ↵

{
    axNav  = aX;
    ayNav  = aY;
    axyNav = aXY;
    azNav  = aZ;

gxNav = gX;
    gyNav = gY;
    gzNav = gZ;

vxNav = vX;
    vyNav = vY;
    vzNav = vZ;

fxNav = fX;
    fyNav = fY;
    fzNav = fZ;

postureX = pX;
    postureY = pY;
    postureZ = pZ;
} int64_t getNodeSum2(int16_t *inputData, double *weightPtr, int16_t numInputs)
{
    long long sum = 0;
    uint16_t i;
    double test1 = *weightPtr;
    int16_t test2 = *inputData;

for (i=0;i<numInputs;i++)
    {
        sum += (*inputData++) * (*weightPtr++);
    }
    return sum;
}
```

TRXS-0023

```
c:\LT_KK_Tracker2\src\C\common\portable\trx\tracker\neuralNet2.c                    3
//neuralNetGait4Class_t testNeuralNet2(int16_t *netInput)
neuralNetGait_t testNeuralNet2(int16_t *netInput)
//int16_t testNeuralNet2(int16_t *netInput)
{
    float* netout;
    int16_t i, k;
    int16_t maxIndex;
    float maxValue;
    double outputVector1[40];
    double outputVector2[24];
    double outputVector3[3];
    double nodeSum = 0;
    int16_t *weightMatrix = &hiddenWeight1_2;

for (i = 0;i < 40; i++) // for each output
    {
        nodeSum = 0;
        for (k = 0;k < 67; k++) // for each input
        {
            nodeSum += (double)netInput[k]/10 * hiddenWeight1_2[67*i+k];
        }
        //(double)getNodeSum2(netInput, &hiddenWeight1_2, 67);
        nodeSum += hiddenBias1_2[i];
        outputVector1[i] = _tansig((float)nodeSum);
    }

//netInput = outputVector1;
    nodeSum = 0;
    for (i = 0;i < 24; i++)
    {
        nodeSum = 0;
        for (k = 0;k < 40; k++)
        {
            nodeSum += outputVector1[k] * hiddenWeight2_2[40*i+k];
        }
        nodeSum += hiddenBias2_2[i];
        outputVector2[i] = _tansig((float)nodeSum);
    }

//netInput = outputVector2;
    nodeSum = 0;
    for (i = 0;i < 3; i++)
    {
        nodeSum = 0;
        for (k = 0;k < 24; k++)
        {
            nodeSum += outputVector2[k] * outputWeight2[24*i+k];
        }
        nodeSum += outputBias2[i];
        outputVector3[i] = _tansig((float)nodeSum);
    } maxValue = -100;
    for (i = 0;i < 3; i++)
    {
        if (outputVector3[i] > maxValue)
        {
            maxValue = outputVector3[i];
            maxIndex = i;
        }
    } if (maxValue>-0.5)
```

TRXS-0023 c:\LT_KK_Tracker2\src\C\common\portable\trx\tracker\neuralNet2.c    4

```
            switch (maxIndex)
            {
                case 0:
                    //return (neuralNetGait_t)(3);
                    return NN_UP;
                    break;
                case 1:
                    //return (neuralNetGait_t)(4);
                    return NN_DOWN;
                    break;
                case 2:
                    //return (neuralNetGait_t)(13);
                    return NN_2D;
                    break;
            }
        return NN_GARBAGE;

//      return (neuralNetGait4Class_t)(maxIndex+1);
//      return (maxIndex+1);

}

//float* runNeuralNet2(int16_t *inputNodes, int16_t numInputs, int16_t numLayers, ...)
//{
//    // Variable arg field holds pointers to neuralNetLayers
//
//    int16_t i;
//    static float output[MAX_NODES];
//    static int16_t scOutput[MAX_NODES] C30_ONLY(_YBSS(2));   // Note: static in order to
    ensure space attribute.
//      neuralNetLayer2_t input;                              // Create net input layer
    using input data.
//    neuralNetLayer2_t *layers[NUM_LAYERS];                  // Array of pointers to neural
    net wieght layers.
//
//    va_list ap;
//    va_start(ap,numLayers);                                 // Init variable argument list.
//
//    for (i = 0; i < numLayers; i++)                         // Copy layer pointers to array.
//        layers[i] = va_arg(ap, neuralNetLayer2_t *);
//
//    input.matrixBase = inputNodes;
//    input.numNodes = numInputs;
//    input.scaleFactor = 15;
//    input.bias = NULL;
//
//    for (i = 0; i < numLayers; i++)
//    {
//        _processNetLayer(&input,layers[i], output);         // Multiply input by weights
    and write output for layer.
//
//        if (i != (numLayers - 1))                           // If not last layer(output),
    then format output of this layer to be input to next.
//        {
//            int scaleFactor = _scaleFloat2Int(output, scOutput, layers[i]->numNodes);
    / Convert floats to scaled, fixed-point vector.
//            input.matrixBase = scOutput;
    / Build input for next iteration.
//            input.numNodes = layers[i]->numNodes;
//            input.scaleFactor = scaleFactor;
//        }
//    }
//
```

```
c:\LT_KK_Tracker2\src\C\common\portable\trx\tracker\neuralNet2.c                                    5
//    va_end(ap);
//
//    return output;
//} int16_t *getNetInputNodes2(int16_t startStepIndex, int16_t stopStepIndex)
{
    static int16_t inputNodes[INPUT_SIZE];
    int16_t tempBuff[128];
    int16_t numSamples;
    int16_t i;
    float3x1 postureVector;
    uint8_t nnFlagsIndex;
    nnFlagsIndex = 6*RESAMPLE_SIZE;
    numSamples   = stopStepIndex - startStepIndex + 1;

postureVector.x = (float)modbuf_read(*postureX ,stopStepIndex);
    postureVector.y = (float)modbuf_read(*postureY ,stopStepIndex);
    postureVector.z = (float)modbuf_read(*postureZ ,stopStepIndex);

modbuf_copy(*fxNav, tempBuff, -numSamples+1, numSamples);
    _upsample2(tempBuff, &inputNodes[0 * RESAMPLE_SIZE], numSamples, RESAMPLE_SIZE);

modbuf_copy(*fyNav, tempBuff, -numSamples+1, numSamples);
    _upsample2(tempBuff, &inputNodes[1 * RESAMPLE_SIZE], numSamples, RESAMPLE_SIZE);

modbuf_copy(*fzNav, tempBuff, -numSamples+1, numSamples);
    _upsample2(tempBuff, &inputNodes[2 * RESAMPLE_SIZE], numSamples, RESAMPLE_SIZE);

modbuf_copy(*vxNav, tempBuff, -numSamples+1, numSamples);
    _upsample2(tempBuff, &inputNodes[3 * RESAMPLE_SIZE], numSamples, RESAMPLE_SIZE);

modbuf_copy(*vyNav, tempBuff, -numSamples+1, numSamples);
    _upsample2(tempBuff, &inputNodes[4 * RESAMPLE_SIZE], numSamples, RESAMPLE_SIZE);

modbuf_copy(*vzNav, tempBuff, -numSamples+1, numSamples);
    _upsample2(tempBuff, &inputNodes[5 * RESAMPLE_SIZE], numSamples, RESAMPLE_SIZE);

inputNodes[nnFlagsIndex++] = modbuf_amp(*azNav, startStepIndex, stopStepIndex);
            // Amplitude az
    inputNodes[nnFlagsIndex++] = modbuf_amp(*axyNav, startStepIndex, stopStepIndex);
            // Amplitude axy
    inputNodes[nnFlagsIndex++] = modbuf_amp(*azNav, startStepIndex, stopStepIndex);
            // Amplitude az
    inputNodes[nnFlagsIndex++] = (int16_t)postureVector.x;
            // Posture x
    inputNodes[nnFlagsIndex++] = (int16_t)postureVector.y;
            // Posture y
    inputNodes[nnFlagsIndex++] = (int16_t)postureVector.z;
            // Posture z
    inputNodes[nnFlagsIndex++] = (int16_t)((modbuf_minIndex(*axyNav, startStepIndex,
    stopStepIndex) - stopStepIndex) / (float)numSamples *1000); // Min axy index // normalize input
    for(i=0; i<INPUT_SIZE; i++)
    {
        inputNodes[i] = (int16_t)((1 + coeff1[i] * (inputNodes[i] - coeff2[i]))*10);
    } return inputNodes;
}

//------------------------------------------------------------------------------
```

TRXS-0023 c:\LT_KK_Tracker2\src\C\common\portable\trx\tracker\neuralNet2.c                                    6

```c
//
//COMMENTED TO SAVE SPACE
//
///**
// * Subtracts sensor value at first point from all others.
// */
//static void _removeBias(int16_t *src, uint16_t len)
//{
//    int16_t i;
//    int16_t offset = src[0];
//
//    for (i = 0; i < len; i++)
//        src[i] = src[i] - offset;
//}

/**
 * Interpolates points by connecting with straight lines and then resamples at new rate.
 */
static void _upsample2(int16_t *src, int16_t *dest, uint16_t srcLength, uint16_t
    destLength)
{
    float sampleT = (float)(srcLength - 1) / (destLength - 1);

int16_t i;
    for (i = 0; i < destLength; i++)
    {
        float t = (float)i * sampleT;
        int16_t srcIndex = (int16_t)ceilf(t);
        float fract = t-floorf(t);

if (i == 0) dest[i] = src[0];
        else if (i == destLength - 1) dest[i] = src[srcLength - 1];
        else
        {
            int16_t slope = src[srcIndex] - src[srcIndex - 1];
            dest[i] = src[srcIndex - 1] + (int16_t)((float)slope * fract);
        }
    }
}

/**
 * Multiplies input values by weight layer and writes output vector for layer.
 */

//void _processNetLayer(neuralNetLayer2_t *inputLayer, neuralNetLayer2_t *weightLayer,
//    float *outputVector)
//{
//    int16_t i;
//    int16_t *weightMatrix = weightLayer->matrixBase;
//    for (i = 0;i < (weightLayer->numNodes); i++)
//    {
//        double nodeSum = (double)getNodeSum(inputLayer->matrixBase, weightMatrix,
//    inputLayer->numNodes);  // Sum of products
//        nodeSum = ldexp(nodeSum, -(inputLayer->scaleFactor + weightLayer->scaleFactor))
//    ;                    // retuns x*2^scaleFactor
//
//        //Add bias nodes here if required.
//        if ((weightLayer->bias) != NULL)
//            nodeSum += (weightLayer->bias[i]);
//
//        outputVector[i] = _tansig((float)nodeSum);      // Pass through sigmoid
```

TRXS-0023

```
c:\LT_KK_Tracker2\src\C\common\portable\trx\tracker\neuralNet2.c                              7
//        weightMatrix += (inputLayer->numNodes);          // Move pointer to next "column"
//     of weight matrix.
//      }
//}

/**
 * Determines scale factor for vector of float that will allow maximum fixed point
    resolution.
 * Writes scaled fixed point vector to iVector and returns power of 2 scale amount (shift
    amount).
 */
//int16_t _scaleFloat2Int(float *fVector, int16_t *iVector, int16_t len)

//{
//   int16_t i;
//   int16_t n = _getMaxExp(fVector, len);
//   int16_t sf = 14 - n;                     // Maximim scale factor which
    preserves sign.
//
//   for (i = 0;i < len; i++)
//       iVector[i] = (int16_t)ldexpf(fVector[i], sf);
//
//   return sf;
//}

/**
 * Determines maximum exponent(power of 2) for all elements in array.  Used for scaling
    array to fixed point.
 */
//int16_t _getMaxExp(float *x, int16_t len)

//{
//   int16_t i;
//   int n;
//
//   float max = FLT_MIN;
//
//   for (i = 0; i < len; i++)
//   {
//       if (x[i] > max)
//           max = x[i];
//   }
//   frexpf(max, &n);       // Returns fractional part in fract and exp in n.
//   return (int16_t)n;
//}

/**
 * Sigmoid for neural net node ouputs.  Output range -1 to +1, working input range about
    -4 to +4.
 */
float _tansig(float x)

{
    float result = (2.0f / (1.0f + expf(-2.0f * x))) - 1.0f;
    return result;
}
```

TRXS-0023

```
c:\LT_KK_Tracker2\src\C\common\portable\trx\tracker\neuralNet4GWeights.h                    1
/**
 * @file tracker/neuralNetWeights.h
 * Neural Network Weights
 * Based on NetData from Matlab Trainer
 * Created on 27-May-2011
 * Total Samples: 61994
 * Training Accuracy: 95.0511%
 *
 * @author John Karvounis
 * @author Copyright 2010 TRX Systems. All rights reserved.
 */ ifndef _TRACKER_NEURALNETWEIGHTS4G_H
define _TRACKER_NEURALNETWEIGHTS4G_H include <trx/stdlib/stdint.h>
include <trx/common.h> ifdef __cplusplus
extern "C" {
endif define RESAMPLE_SIZE     10
define INPUT_SIZE        6*RESAMPLE_SIZE+8
#define NUM_INPUT_NODES 67
#define NUM_OUTPUT_NODES 3
#define NUM_HIDDEN1_NODES 40
define NUM_HIDDEN2_NODES 24 define MAX_NODES 40
define NUM_LAYERS 3 define WEIGHT_SCALE 1
//#define WEIGHT_SCALE 16
#define QFACTOR 1
//#define QFACTOR 4 define Q4(X) ((X < 0.0) ? (int16_t)(WEIGHT_SCALE*(X) - 0.5) : (int16_t)(WEIGHT_SCALE*(X)
      + 0.5))

ifdef _WIN32 define __attribute__(x)

endif

// Matrix Dimensions = (3 x 24)
double outputWeight2[72] = {
   0.64763,
   5.8625,
  -0.048164,
   2.9745,
  -0.030526,
   0.25144,
  -0.17123,
  -0.088083,
   1.5671,
  -1.1423,
   2.0317,
   0.42786,
   0.53046,
```

TRXS-0023

```
c:\LT_KK_Tracker2\src\C\common\portable\trx\tracker\neuralNet4GWeights.h                    2
    -0.87514,
    -0.57133,
      1.2109,
     -1.3185,
    -0.31143,
    -0.79605,
     0.40905,
    -0.62763,
     0.28546,
     0.18614,
     0.52723,
    -0.82745,
       1.412,
     -1.2043,
    -0.97718,
     0.35123,
    -0.56837,
      1.3508,
   -0.033384,
    -0.32695,
   0.0032747,
    -0.23916,
      0.4618,
    -0.29954,
     0.97607,
     0.47231,
   -0.072637,
     -4.5601,
     0.80742,
      0.9678,
     -1.4611,
      -0.322,
     0.30035,
     0.25556,
     -0.2668,
    -0.16394,
     -3.6279,
      0.8625,
    -0.69898,
     0.27996,
     0.35825,
     0.15969,
     0.82688,
     -0.3253,
     0.38175,
    -0.93174,
    -0.52846,
     0.42284,
    -0.47425,
    0.035289,
    -0.21609,
      4.5502,
    -0.49407,
     0.30292,
     0.25176,
    -0.61756,
    -0.28307,
     0.23326,
    -0.36736
};

// Matrix Dimensions = (3 x 1)
double outputBias2[3] = {
    -1.2637,
     0.1092,
    -1.3908};
```

TRXS-0023 c:\LT_KK_Tracker2\src\C\common\portable\trx\tracker\neuralNet4GWeights.h 3

```
// Matrix Dimensions = (24 x 40)
double hiddenWeight2_2[960] = {
    0.0881363,
    0.139242,
    0.928567,
    -0.851364,
    0.219762,
    0.402008,
    1.5495,
    0.60768,
    0.763452,
    0.419021,
    0.319551,
    -0.201447,
    0.760106,
    -2.86226,
    0.210789,
    0.925989,
    -1.23309,
    0.712006,
    0.589622,
    0.199141,
    3.11227,
    -4.01779,
    0.689561,
    2.14507,
    -0.0823161,
    -0.241223,
    0.870697,
    0.348519,
    14.4432,
    2.76535,
    0.218675,
    -2.23721,
    -0.357319,
    -1.65183,
    1.9889,
    -0.209211,
    1.49886,
    -0.189621,
    -0.682063,
    -1.38415,
    0.0763575,
    -0.0349925,
    -0.318832,
    0.157398,
    -0.472432,
    -0.575526,
    0.20524,
    0.182889,
    0.302962,
    -0.266081,
    -0.0433244,
    0.273206,
    0.461477,
    -0.345939,
    0.000538128,
    0.0675409,
    -0.0487088,
    0.392533,
    0.289902,
    -0.0801463,
    0.391678,
    0.113548,
    -0.318657,
```

TRXS-0023

```
c:\LT_KK_Tracker2\src\C\common\portable\trx\tracker\neuralNet4GWeights.h                4
         0.20955,
        -0.339036,
       -0.0986847,
         0.149775,
        0.0653375,
        0.0926672,
         0.165449,
        -0.250848,
       -0.0925336,
         0.667156,
          0.21857,
        -0.159547,
        -0.327648,
        -0.308131,
        -0.394841,
         0.163192,
        -0.106019,
         0.178264,
       -0.0435004,
        -0.267454,
       -0.0515959,
        -0.407128,
         0.216668,
         0.156071,
        0.0645605,
         0.896127,
       -0.0318275,
        0.0618403,
       -0.0283257,
        -0.963194,
        -0.509735,
        -0.139394,
          0.30144,
        -0.130731,
         0.601487,
        -0.412174,
        -0.151746,
        -0.983379,
         0.631466,
          0.23468,
        -0.445981,
         0.462076,
         0.511147,
         0.184528,
        -0.564597,
         0.058091,
         -0.33054,
        -0.626835,
        -0.200752,
         0.340924,
         0.323557,
         0.272199,
        -0.647322,
         0.911483,
        -0.395698,
         0.184391,
        -0.459443,
        -0.255996,
         0.438151,
         0.249649,
        -0.491909,
        -0.183475,
         0.237441,
         0.198435,
         0.416295,
         0.291099,
```

TRXS-0023 c:\LT_KK_Tracker2\src\C\common\portable\trx\tracker\neuralNet4GWeights.h    5

```
    0.205118,
   -0.511934,
    -0.14485,
   -0.567121,
   -0.280447,
  0.00653037,
    0.163404,
    0.215064,
   -0.753196,
   -0.0497896,
    0.148187,
   -0.0616988,
    0.204123,
   -0.304652,
   -0.618665,
    0.260427,
   0.0502073,
   -0.600519,
   -0.0929236,
    0.284854,
    0.326124,
   -0.536832,
   -0.390805,
   -0.342839,
   0.0585118,
    0.164656,
   -0.247467,
    0.558642,
   0.0922916,
   -0.353232,
   -0.0824706,
    -1.51491,
   -0.109544,
    -3.40489,
     0.40952,
-3.15073e-005,
    -1.25362,
    0.304323,
    -0.33162,
   -0.986605,
   -0.102813,
    0.943386,
    0.484448,
    -1.13091,
   0.0689883,
    -2.54745,
   -0.0354012,
     1.36306,
    0.651314,
    -4.70304,
    -1.67471,
     1.91454,
   0.0538906,
    0.666503,
   -0.329105,
    0.503911,
      1.0209,
     3.77141,
     1.60083,
     10.7174,
    0.418737,
    -1.52675,
   -0.519973,
   -0.208585,
    -4.89023,
    -2.56779,
```

TRXS-0023

```
c:\LT_KK_Tracker2\src\C\common\portable\trx\tracker\neuralNet4GWeights.h          6
    -1.98336,
    -1.38765,
    -0.888477,
    -3.77129,
    0.564675,
    -0.304354,
    -0.33133,
    -0.329975,
    -0.0385911,
    -0.336938,
    -0.253404,
    -0.00282054,
    -0.0598246,
    0.331785,
    0.242172,
    -0.110854,
    0.164067,
    -0.573241,
    -0.374151,
    -0.950158,
    0.756733,
    0.0144056,
    -1.07147,
    0.302857,
    -0.190965,
    0.241784,
    0.630074,
    -0.253224,
    -0.393388,
    -0.371723,
    0.952803,
    -0.444076,
    -0.3876,
    -0.147752,
    -0.210545,
    -0.313867,
    -0.380032,
    -0.411394,
    -0.23417,
    0.0284031,
    0.166284,
    -0.062535,
    -0.277469,
    -0.238939,
    0.265014,
    0.408614,
    0.387048,
    -0.217801,
    0.382711,
    -0.0311636,
    0.370984,
    0.0648373,
    -0.00551236,
    0.174792,
    0.127529,
    0.156316,
    0.289142,
    0.164399,
    -0.0356254,
    -0.00547745,
    -0.116062,
    0.124703,
    0.625887,
    0.0507235,
    -0.187065,
    -0.515962,
```

TRXS-0023 c:\LT_KK_Tracker2\src\C\common\portable\trx\tracker\neuralNet4GWeights.h　　　7

```
    0.0384151,
    -0.267737,
    -0.00983628,
    0.102399,
    0.31581,
    0.335197,
    -0.173715,
    -0.00506316,
    0.324135,
    0.129103,
    0.170736,
    0.295934,
    -0.0363007,
    -0.0970499,
    -0.421679,
    -0.175533,
    -0.129467,
    0.12263,
    -0.297214,
    -0.411654,
    0.671349,
    0.366114,
    -1.03787,
    -0.929823,
    -1.13372,
    0.262558,
    0.0689158,
    1.32406,
    -0.637767,
    -0.346445,
    -0.370299,
    -0.862259,
    -0.260753,
    -0.313933,
    0.330291,
    -0.152182,
    -0.345912,
    0.175924,
    0.31362,
    -1.1705,
    0.959127,
    -0.26942,
    -0.169979,
    -0.251687,
    0.262756,
    -0.186636,
    -0.356337,
    -0.556116,
    0.0142519,
    -1.41427,
    -1.16959,
    -0.624842,
    0.345317,
    0.0738373,
    0.115841,
    3.27566,
    -0.659552,
    0.024296,
    -0.0734728,
    -0.0222899,
    0.516124,
    0.335068,
    0.278399,
    0.0636357,
    -1.91536,
    1.5223,
```

TRXS-0023 c:\LT_KK_Tracker2\src\C\common\portable\trx\tracker\neuralNet4GWeights.h                    8

```
   -0.0976427,
    1.11485,
    0.28438,
   -0.668165,
   -0.356442,
    2.782,
    0.394697,
   -0.587127,
    0.0695593,
    0.60625,
    0.959049,
    0.278515,
   -0.756948,
   -0.302136,
   -0.127544,
   -0.0500848,
   -0.658133,
   -0.119952,
   -0.341525,
    0.483519,
    0.346208,
   -1.8159,
    0.319319,
    0.214151,
    0.225277,
    0.0173305,
    0.272315,
   -1.39499,
    0.135175,
    0.51043,
    0.262296,
    0.196011,
    0.178151,
   -0.415431,
   -0.314767,
    0.103614,
    0.104339,
    0.316675,
   -0.437485,
    0.428596,
   -0.0953401,
   -0.0578853,
    0.375967,
    0.212251,
   -0.0678925,
   -0.737334,
    0.470077,
    0.406375,
   -0.111649,
   -0.36365,
   -0.0273985,
    0.046299,
    0.190562,
   -0.343602,
   -0.445049,
    0.000417403,
   -1.26811,
   -0.0141897,
    0.27346,
    0.553941,
    0.0351974,
   -0.556779,
   -0.128812,
   -0.49483,
    0.0270809,
   -0.129546,
```

TRXS-0023

```
c:\LT_KK_Tracker2\src\C\common\portable\trx\tracker\neuralNet4GWeights.h                9
    -0.0966194,
     0.10733,
     0.340055,
     0.435211,
    -0.071294,
    -0.00829867,
     0.348511,
     0.109644,
     0.0690078,
    -0.130555,
    -0.254971,
    -0.250651,
    -0.408638,
     0.322534,
    -0.180532,
    -0.16184,
    -0.102422,
    -0.284484,
    -0.53184,
     0.17549,
    -0.357354,
    -0.0993558,
    -0.171589,
     0.0777367,
    -0.176657,
     0.469567,
     0.309552,
    -0.0131926,
     0.0652947,
    -0.0762773,
     0.0859924,
    -0.00905683,
    -0.263628,
    -0.449462,
     0.00942849,
     0.304666,
     0.0225031,
     0.22448,
     0.00540397,
    -0.0702931,
    -0.173191,
    -0.264885,
    -0.196947,
     0.216882,
    -0.158647,
    -0.177226,
    -0.194061,
     0.221228,
     0.470489,
    -0.236515,
     0.687625,
    -0.314651,
    -1.56935,
    -0.491461,
     0.210596,
     0.426297,
    -0.0324949,
    -0.0285897,
     0.20518,
     1.351,
     0.0544534,
     0.355821,
    -0.0821361,
     1.73356,
     0.327004,
    -0.335734,
```

TRXS-0023 c:\LT_KK_Tracker2\src\C\common\portable\trx\tracker\neuralNet4GWeights.h           10

```
     0.02139,
     1.75079,
   0.0380831,
     0.12011,
   -0.566927,
    -1.13515,
   -0.660889,
   -0.485469,
   0.0560039,
     5.64746,
    0.398122,
    0.288544,
   -0.371934,
    0.371553,
   -0.198283,
    0.641438,
    0.307416,
    -1.28673,
  -0.0500062,
   -0.103199,
   -0.214289,
   -0.303796,
   0.0892732,
    0.041069,
   -0.634542,
    0.102105,
    0.986598,
    0.105531,
    0.357044,
    -1.05716,
   0.0540257,
   0.0500343,
   -0.159466,
   -0.906806,
    0.252039,
 -0.00295854,
    0.165179,
    0.438205,
  0.00384684,
     1.83423,
    0.142735,
     2.56829,
      1.0197,
    0.412695,
   -0.916988,
    0.112508,
     -0.2964,
    0.124327,
   -0.634562,
 -0.00733372,
   -0.122419,
   -0.722899,
   0.0918576,
    0.715234,
   -0.386857,
   -0.337842,
   -0.174148,
    0.743819,
    0.232763,
     0.29894,
    0.267461,
    0.595898,
     0.36961,
    -0.65226,
    0.176114,
   -0.242842,
```

TRXS-0023 c:\LT_KK_Tracker2\src\C\common\portable\trx\tracker\neuralNet4GWeights.h 11

```
    1.13294,
   -1.36358,
  -0.0514287,
    0.263347,
    0.143036,
    0.0926643,
   -0.328631,
    0.408715,
   -0.225429,
    0.114173,
    0.45941,
   -0.115268,
   -0.491444,
    0.199467,
   -1.43575,
    0.233313,
   -1.05171,
   -0.538033,
    2.19383,
   -0.249244,
    0.162166,
    0.753893,
    0.20839,
    0.307213,
    0.0772106,
   -0.0432765,
   -0.0582523,
    0.310245,
   -0.177424,
    0.221983,
    0.0205233,
   -0.679985,
   -0.0479245,
   -0.0822717,
    -0.6429,
   -0.222098,
   -0.129328,
    0.415191,
    0.37204,
    0.210921,
   -1.40957,
   -0.104835,
   -0.0934059,
   -0.466036,
   -0.109867,
   -0.272358,
   -0.050686,
    1.67705,
   -0.00268577,
    0.328695,
   -0.327191,
   -0.359712,
   -0.533439,
    0.411922,
    0.223723,
    0.524524,
    1.02756,
    0.404005,
   -0.125725,
   -0.106248,
    0.470582,
    0.571966,
   -0.0603942,
    0.0427615,
   -0.124735,
   -0.0575803,
```

TRXS-0023

```
c:\LT_KK_Tracker2\src\C\common\portable\trx\tracker\neuralNet4GWeights.h                    12
    0.448627,
    1.38514,
    0.143535,
   -0.200585,
    0.2118,
   -0.477316,
    0.166029,
   -0.0937391,
    0.453299,
    0.20779,
    0.221127,
    1.04426,
   -0.128839,
    1.17749,
    0.805677,
    0.820223,
   -0.305816,
   -1.52713,
    0.338131,
   -0.241409,
   -0.20436,
   -5.1655,
   -0.260902,
    0.0225,
    0.552295,
    0.0408473,
   -1.29954,
   -0.225582,
   -0.551404,
    2.76316,
   -4.84605,
    0.0127832,
    1.95413,
    0.220558,
   -0.274091,
   -1.58609,
    0.403983,
   -1.43659,
    2.29331,
   -1.96308,
    0.205835,
   -0.489393,
    0.369933,
   -1.15914,
   -0.723509,
   -1.08185,
    0.284305,
   -0.159255,
   -0.40445,
   -0.0933174,
   -0.269249,
   -0.0156428,
    0.112537,
   -0.213555,
   -0.182549,
   -0.45151,
    0.146595,
   -0.323105,
   -0.553732,
   -0.13475,
   -0.346508,
   -0.446269,
    0.287801,
    0.490354,
   -0.00573538,
   -0.15725,
```

TRXS-0023 c:\LT_KK_Tracker2\src\C\common\portable\trx\tracker\neuralNet4GWeights.h        13

```
    0.136515,
    0.253637,
    0.191538,
   -0.732697,
    0.264548,
    0.0116267,
   -0.171622,
    0.272564,
    0.274039,
   -0.357973,
   -0.352482,
   -0.13444,
    0.148159,
   -0.346239,
   -0.060165,
   -0.0206675,
   -0.384494,
   -0.081134,
    0.0089979,
    0.0538042,
   -0.0516392,
    0.332323,
    0.525304,
    0.127848,
    0.00262632,
   -0.13508,
   -0.14319,
   -0.386533,
   -0.412198,
    0.227162,
    0.293863,
   -1.90251,
   -0.241797,
   -0.0884561,
   -0.327263,
   -0.450498,
    0.351179,
    0.113904,
    0.127541,
    0.178568,
   -0.309721,
   -0.478358,
   -0.640583,
    0.755219,
    0.358506,
   -0.254622,
    0.0918246,
    0.211685,
    0.0121863,
   -0.826088,
    0.334008,
    0.171497,
    0.0018669,
   -0.227268,
    0.492186,
   -1.2825,
    0.659855,
   -0.25991,
    0.339071,
    2.04427,
    0.242413,
    0.109419,
    1.54775,
    0.385732,
    0.262017,
    0.120358,
```

TRXS-0023

```
c:\LT_KK_Tracker2\src\C\common\portable\trx\tracker\neuralNet4GWeights.h                    14
      0.219098,
       1.66504,
      0.321078,
      -1.47988,
     -0.0717213,
      -3.34169,
      0.172426,
       1.22165,
      0.0883271,
      0.944424,
      0.380242,
       2.34755,
      0.185389,
      0.130304,
      0.271127,
       0.19586,
     -0.261703,
     -0.949433,
    0.00827521,
      0.471305,
      -2.46015,
     -0.672319,
       0.25363,
       -2.3457,
     -0.109627,
      0.948008,
       -1.6968,
      0.109196,
     -0.193248,
      0.588093,
     -0.111607,
       1.34443,
      0.258289,
     -0.514903,
       1.34808,
     0.0741599,
     0.0284419,
     -0.252247,
     -0.261467,
      0.144775,
     -0.314921,
       0.26099,
    -0.0769551,
    -0.0428316,
      0.482766,
    0.00634848,
     -0.279014,
      0.258214,
     -0.422551,
     0.0107306,
      0.128443,
    0.00394401,
   -0.00746738,
     -0.192435,
     -0.386122,
      -0.19977,
       0.13835,
     0.0194716,
      0.273225,
      -0.11164,
      0.243352,
    0.00177302,
     0.0366536,
     -0.240968,
     0.0974871,
     -0.307581,
```

TRXS-0023 c:\LT_KK_Tracker2\src\C\common\portable\trx\tracker\neuralNet4GWeights.h                    15

```
    0.0999585,
    -0.381201,
    -0.356478,
    -0.330068,
    0.0134475,
    -0.155418,
    0.124193,
    0.504463,
    -0.0541284,
    0.410847,
    -0.347323,
    -0.590868,
    0.261409,
    -0.268328,
    -0.448895,
    -2.85378,
    -2.64413,
    1.47119,
    1.27506,
    1.75943,
    -1.13298,
    -1.53306,
    -0.367459,
    -0.107248,
    -0.375853,
    0.0383913,
    -0.282332,
    0.541811,
    0.679341,
    0.951317,
    0.625621,
    -2.71953,
    1.03983,
    -0.458433,
    -1.27282,
    -0.00557066,
    -0.427684,
    -1.46811,
    -0.150437,
    -0.228132,
    1.60425,
    -1.16759,
    0.00180542,
    -0.142277,
    -0.344028,
    -1.3952,
    -0.229052,
    1.86932,
    -1.15887,
    1.08524,
    0.261916,
    -0.67274,
    -0.400027,
    0.727595,
    -0.166487,
    -0.0563368,
    -0.1452,
    -2.79189,
    -0.242211,
    1.81758,
    0.396957,
    0.250359,
    0.0934348,
    0.0744483,
    0.248586,
    0.494968,
```

TRXS-0023

```
c:\LT_KK_Tracker2\src\C\common\portable\trx\tracker\neuralNet4GWeights.h                    16
    -0.711138,
    -0.173081,
    -0.542902,
    -0.154663,
    -0.972877,
     0.294198,
     -1.41853,
     -1.11237,
     -1.16586,
    -0.603947,
    -0.354986,
    0.0980781,
     0.551655,
      6.37544,
      1.61922,
     0.291734,
      0.20354,
    -0.574604,
    -0.468656,
    -0.300591,
    -0.286375,
     -1.62895,
     0.617891,
    -0.256003,
     0.355309,
     -1.80785,
    0.0276681,
      1.88972,
      1.53907,
     -1.05737,
      1.57029,
      1.46873,
     0.448744,
    -0.964632,
      1.94053,
      0.63286,
    0.0696983,
      6.38548,
   -0.0122758,
    -0.730935,
     0.210761,
    -0.967563,
       7.7135,
     -1.39682,
     0.960333,
     -4.70749,
     -5.31614,
    -0.447172,
     0.337413,
     0.864135,
     -1.24453,
      2.05981,
      4.80075,
      1.02919,
     -1.24083,
    -0.690155,
    -0.291819,
      3.82021,
    -0.776371,
      0.29368,
    -0.346674,
      4.74684,
    0.0876283,
    -0.660639,
     -3.68384,
    -0.334602,
```

TRXS-0023

```
c:\LT_KK_Tracker2\src\C\common\portable\trx\tracker\neuralNet4GWeights.h                17
    0.488563,
    0.485378,
   -0.0136351,
   -1.30751,
    0.372085,
    2.88757,
    1.16518,
   -1.43961,
   -0.0874982,
    0.591731,
    0.204231,
   -1.18601,
   -1.27246,
   -0.0541452,
   -0.264299,
    0.495326,
    4.97904,
   -0.285173,
   -0.285634,
    4.87137,
    1.76471,
   -0.292862,
   -2.84515,
    0.214547,
   -0.24098,
   -0.0845207,
    1.93417,
   -3.4289,
   -0.909323,
   -0.274942,
   -0.276101,
   -1.23474,
    0.0657829,
   -0.776414,
    0.0551836,
   -3.34545,
   -0.430368,
    0.364387,
    0.582116,
};

// Matrix Dimensions = (24 x 1)
double hiddenBias2_2[24]= {
 -1.4147,
 -1.3678,
 -0.99928,
  1.1547,
 -1.1073,
  0.88606,
 -0.74631,
  0.8242,
 -0.45607,
  0.25112,
 -0.022623,
 -0.03755,
 -0.037413,
  0.20668,
 -0.37301,
  0.40997,
 -0.59817,
 -0.778,
  0.84475,
 -0.83706,
 -1.1533,
 -1.4807,
```

TRXS-0023

```
c:\LT_KK_Tracker2\src\C\common\portable\trx\tracker\neuralNet4GWeights.h                18
  0.97282,
   1.6272
};

// Matrix Dimensions = (40 x 67)
double hiddenWeight1_2[2680] = {
    -4.86421,
    -0.199168,
    -0.13004,
    -0.159391,
    0.052209,
    0.0846587,
    0.915012,
    -0.135249,
    1.02411,
    0.322361,
    -2.16956,
    0.167166,
    -5.55764,
    0.193722,
  0.00611928,
    -0.0196145,
    1.42548,
    2.40008,
    -0.0100571,
    -1.17985,
    -0.140863,
    -0.249804,
    3.47948,
    0.396755,
    -19.4664,
    0.204416,
    0.216099,
    -0.0863765,
    0.140768,
    -0.183027,
    -0.266406,
  0.00558719,
    -2.9503,
    -0.856401,
    0.644528,
    -0.842825,
    0.311772,
    -0.122613,
  0.00467201,
    -0.127451,
    -3.81946,
    -1.8946,
    4.22021,
    0.57006,
    14.0597,
    1.8581,
    0.216379,
    0.302567,
    -0.164391,
    0.181832,
    -0.198657,
    0.561554,
    4.68337,
    1.40621,
    0.465398,
    0.19258,
    -0.270327,
    0.375939,
    0.273858,
    -0.764186,
```

TRXS-0023

```
    0.681109,
     0.18765,
    0.476355,
   -0.501012,
     -3.9305,
    0.132692,
  -0.0763456,
    0.316297,
    0.258244,
   0.0372264,
   -0.107533,
    0.291623,
  -0.0633583,
    0.174899,
   -0.227792,
    0.788315,
   -0.325734,
    0.137105,
    0.275942,
   0.0318073,
   -0.171835,
    0.220257,
    0.288064,
     1.21674,
    0.422917,
   -0.342659,
   -0.182853,
    0.432086,
    0.317132,
    -1.56932,
  -0.0284754,
    0.759041,
     0.18376,
   -0.109253,
   0.0902855,
    0.299362,
    0.180529,
    -0.16771,
    0.063804,
   -0.264637,
  -0.0483689,
    0.443982,
    -1.05463,
   -0.300375,
   0.0396063,
   0.0411095,
   -0.132397,
   -0.297034,
   -0.173612,
    -4.43186,
     2.21529,
     1.05659,
   -0.199792,
    0.187746,
   -0.312942,
    -0.20407,
   -0.426559,
   0.0648685,
    -3.23796,
  -0.0533408,
     0.37758,
   0.0732922,
  -0.0267303,
     0.10661,
   -0.316748,
  -0.0888763,
```

TRXS-0023 c:\LT_KK_Tracker2\src\C\common\portable\trx\tracker\neuralNet4GWeights.h                    20

```
     0.32204,
     0.252004,
    -0.189929,
    -0.0968628,
     0.108697,
     0.955972,
     0.00226958,
    -0.539623,
     2.64369,
    -0.113372,
     0.0324394,
     0.306953,
    -0.0989873,
     0.21645,
     0.550799,
    -0.195889,
     6.08664,
     0.179812,
     0.894576,
    -0.21106,
     0.130152,
     0.313543,
    -1.2417,
     0.0590319,
     0.0882983,
    -2.26604,
    -0.00858737,
    -0.126773,
     0.599556,
    -0.250565,
     2.84436,
    -0.212459,
     5.16516,
    -0.108142,
    -0.213681,
     0.181181,
     0.0637479,
    -0.0223249,
    -0.124634,
    -0.129643,
     0.177959,
     0.0712908,
    -0.44969,
    -1.36224,
     0.0995287,
     0.399429,
    -0.0509046,
     0.332548,
    -0.0417677,
     0.151398,
    -1.04533,
    -4.19903,
    -5.03417,
    -0.30083,
    -0.235042,
     0.0495732,
    -0.29669,
     0.203367,
    -0.0851121,
     0.209885,
     3.66367,
    -0.2649,
     0.222717,
     0.286921,
    -0.0985099,
    -0.186356,
```

TRXS-0023

```
c:\LT_KK_Tracker2\src\C\common\portable\trx\tracker\neuralNet4GWeights.h                    21
        0.28231,
       -0.0168543,
       -0.282929,
       -0.00176669,
        0.144596,
       -0.0995933,
        0.0385415,
        0.301075,
        0.0805739,
       -1.13634,
        0.290696,
        3.57235,
        0.222831,
        0.0886971,
       -0.0455114,
        2.24424,
        0.0974354,
        3.4863,
        0.748535,
        0.305174,
       -0.200285,
       -0.066158,
       -0.013173,
       -0.225453,
        0.15301,
        6.74331,
        3.57066,
       -0.0817934,
        0.910483,
        0.669867,
        0.252379,
        3.80062,
        3.96685,
        2.83649,
       -0.17741,
       -0.00383576,
        0.282616,
        0.0276585,
        0.773709,
       -0.213118,
       -0.347994,
       -4.58393,
       -3.97199,
       -3.50456,
       -4.12416,
       -0.249411,
        0.0751105,
        0.245007,
        0.188137,
        0.0478753,
        0.213747,
       -4.19973,
       -4.94865,
        9.13336,
       -0.135046,
       -0.264891,
        0.209735,
        0.195956,
       -0.0206514,
        0.188952,
        0.00556699,
       -1.06817,
       -0.275469,
        0.0302327,
        0.618133,
        0.189341,
```

TRXS-0023

```
c:\LT_KK_Tracker2\src\C\common\portable\trx\tracker\neuralNet4GWeights.h          22
      0.131061,
      -0.65266,
     -0.0372143,
       0.21515,
      0.198267,
      0.251897,
      -2.11253,
       -2.6539,
     -0.121288,
      0.180178,
       2.27704,
      0.149057,
      0.239347,
      0.235701,
     0.0360092,
     -0.298347,
     -0.131868,
     0.0854919,
      0.385677,
      0.436188,
       9.67599,
      0.383801,
       5.92983,
      0.241734,
       4.71292,
       4.59217,
     -0.248886,
       1.32446,
      -3.41641,
     -0.402023,
       2.25869,
     -0.146102,
     0.0821753,
      0.086091,
      -5.04867,
       2.15259,
      0.191112,
      0.439567,
     -0.148738,
     -0.436222,
     -0.212996,
      -3.64284,
      -2.23277,
      0.177451,
      -3.01422,
      -1.23008,
     0.0573648,
     -0.123192,
      0.172462,
      -0.11001,
      0.687053,
     -0.657575,
      -2.31998,
      -1.22803,
      -4.46107,
     -0.310112,
     -0.142428,
     -0.622013,
     -0.271669,
     -0.389195,
      0.205246,
      -2.49222,
       1.21934,
     -0.304539,
    -0.00452636,
      0.216108,
```

TRXS-0023 c:\LT_KK_Tracker2\src\C\common\portable\trx\tracker\neuralNet4GWeights.h                    23

```
    -0.231886,
     1.06378,
    0.0513878,
    -0.522272,
     0.243447,
    -0.0790407,
     0.287459,
     2.40466,
     0.196265,
     0.243289,
     0.239609,
    -0.0396568,
    -0.094972,
    -0.30949,
     0.170986,
    -0.229661,
     0.333124,
    -0.233228,
     0.646655,
    -0.221559,
     0.29628,
    -1.11421,
    -0.405139,
    -1.72201,
    -0.409361,
    -4.61959,
    -0.291727,
     0.221907,
     2.06954,
     1.30458,
     0.148956,
     0.106275,
    -0.169234,
     0.565313,
     0.762465,
    -1.61959,
    -0.00177877,
    -0.128584,
    -0.0396825,
     0.13017,
     0.140828,
    -0.106605,
     1.70056,
     0.208598,
    -1.06465,
     1.03082,
     2.78945,
    -0.040602,
     0.161047,
     0.128966,
    -0.0381427,
    -0.281911,
     0.0846985,
    -0.0921976,
    -0.198734,
     3.52755,
     0.0541653,
    -0.25221,
    -0.194301,
     0.142911,
    -0.114524,
    -0.0473643,
    -1.22269,
    -0.949396,
     0.288836,
    -0.220846,
``` c:\LT_KK_Tracker2\src\C\common\portable\trx\tracker\neuralNet4GWeights.h    24

```
    -0.210481,
     0.100058,
     0.362679,
     0.598694,
    0.0235548,
    0.0505953,
    0.0117114,
     0.180232,
     -1.53309,
       1.2565,
    0.0952738,
   -0.0620847,
    -0.230795,
    0.0588184,
    0.0732905,
    -0.290934,
   -0.0386538,
     0.182879,
    0.0991987,
    -0.223163,
    0.0873878,
     -1.02781,
     0.386514,
   0.00384479,
     0.247737,
    0.0778591,
   -0.0701506,
     0.153544,
       1.0397,
    -0.104818,
   -0.0300548,
    -0.202663,
     0.429247,
    -0.115608,
      1.99355,
      2.90996,
   -0.0152397,
     0.150886,
     0.329239,
     0.125899,
     0.168021,
     0.413595,
     0.203689,
     0.426719,
    -0.301895,
     -2.16708,
    -0.720175,
    -0.538498,
   -0.0761797,
     0.127399,
    -0.276116,
    0.0946441,
     0.162442,
     0.109436,
    -0.362215,
    0.0499464,
      2.34337,
    -0.152621,
     0.138595,
    -0.235984,
    -0.195336,
    0.0186205,
   -0.0677813,
    -0.200224,
     0.342984,
    -0.232533,
```

TRXS-0023 c:\LT_KK_Tracker2\src\C\common\portable\trx\tracker\neuralNet4GWeights.h 25

```
      -0.0855904,
      -0.184017,
       0.012005,
      -0.0826506,
      -0.104402,
       0.514144,
       0.192861,
       0.128242,
      -0.0948017,
       0.110324,
      -0.1937,
      -0.489099,
      -0.112089,
      -1.17826,
       0.350577,
       1.67237,
       0.0757289,
       0.248602,
      -5.70016,
      -1.89359,
      -2.58924,
      10.5784,
       0.031539,
       2.15055,
       0.395442,
       2.05068,
       4.46628,
       0.345488,
       0.250292,
      -2.17728,
       7.90242,
      -0.061912,
       3.7476,
      -5.4669,
      -3.41872,
      -5.55161,
      -1.0757,
       4.46876,
      -0.35783,
      -0.217296,
      -0.482425,
       0.0767002,
       0.231809,
      -0.19659,
      -1.08736,
       2.55695,
       8.39353,
       3.39185,
      10.4851,
       0.123117,
      -0.0402496,
      -0.00815847,
       0.373467,
      -0.0464687,
       3.13502,
       5.86108,
       2.10599,
      -9.07131,
       0.288754,
      -0.440788,
      -0.488573,
       0.140621,
      -0.316257,
       0.0475658,
      -3.42575,
      -0.412649,
```

TRXS-0023

```
c:\LT_KK_Tracker2\src\C\common\portable\trx\tracker\neuralNet4GWeights.h                         26
       -1.89569,
      -0.435265,
       0.190167,
       0.287863,
       0.265707,
        3.63459,
        2.31452,
        1.04156,
       0.306255,
        1.11242,
        1.10618,
        5.90839,
    -0.00147308,
       0.406873,
       0.247943,
      -0.720313,
      -0.617007,
      -0.193104,
      -0.362922,
       0.102526,
       0.126344,
      -0.253694,
        1.58277,
     -0.0225485,
       0.623071,
      -0.196558,
      0.0537892,
        0.20108,
      -0.200324,
      -0.356394,
       0.400447,
       0.672886,
      -0.518413,
     -0.0853502,
        0.84404,
       0.266528,
         -1.022,
       0.537188,
       -5.99118,
       0.268348,
       0.519424,
       0.435695,
       0.442492,
       0.251213,
       0.378194,
       0.497058,
      0.0462854,
       -4.98881,
      -0.619758,
       0.415123,
      -0.540807,
     -0.0707219,
      -0.147958,
     -0.0918695,
     -0.0495367,
      -0.317913,
       -0.56154,
        1.16842,
       0.990461,
      -0.820047,
      -0.491865,
    -0.00753192,
      -0.671217,
      -0.572931,
      0.0271012,
     -0.0333452,
```

TRXS-0023

```
c:\LT_KK_Tracker2\src\C\common\portable\trx\tracker\neuralNet4GWeights.h                27
    -3.75317,
    0.388547,
    0.208448,
    0.0302189,
    -0.266171,
    0.914065,
    0.653296,
    0.366599,
    0.305171,
    -0.41828,
    0.0396527,
    -1.23614,
    -0.223051,
    -0.182009,
    -0.270242,
    -0.752584,
    -4.17109,
    -0.523651,
    0.025594,
    0.171675,
    0.519916,
    0.279712,
    0.64479,
    1.16516,
    -0.643971,
    0.675684,
    -0.130492,
    0.06867,
    -0.0603003,
    0.74681,
    0.537441,
    0.15887,
    -2.24379,
    -0.000482778,
    -0.540759,
    0.763822,
    -0.374238,
    1.54487,
    0.0974317,
    -1.74245,
    0.269034,
    0.209276,
    -0.227254,
    0.320342,
    -0.22214,
    -0.285906,
    0.136261,
    0.161732,
    2.50198,
    1.01698,
    -2.40996,
    -0.308202,
    -0.101744,
    -0.419894,
    0.0265143,
    -0.0618411,
    -0.0435743,
    1.88885,
    0.493061,
    1.25064,
    -0.0264387,
    -0.361565,
    -0.108275,
    -0.118436,
    0.402094,
    0.350248,
```

TRXS-0023

```
c:\LT_KK_Tracker2\src\C\common\portable\trx\tracker\neuralNet4GWeights.h                    28
            0.614669,
            6.12864,
           -6.03101,
           -10.8371,
           -0.283611,
           -0.227739,
            2.21922,
            4.81003,
           -1.73556,
            0.218871,
           -2.78416,
           -0.0605509,
           -1.52492,
            0.591565,
            0.0618319,
            0.220647,
           -11.9072,
              6.521,
            11.6274,
            0.516232,
            0.135322,
           -1.8674,
            0.431729,
           -4.90954,
           -7.9952,
           -0.35202,
             -1.106,
            0.370723,
           -0.151776,
           -0.636803,
           -0.00695463,
            0.0314792,
           -3.64159,
           -14.4897,
           -0.174046,
            9.19417,
           -2.25277,
            0.0744434,
            11.0803,
           -3.15955,
           -18.7747,
           -0.27096,
           -0.149935,
           -0.550529,
            1.05056,
           -0.09839,
           -0.482297,
            1.64628,
           -0.0876899,
            10.9858,
            3.61315,
           -6.65136,
            0.595992,
            0.128401,
            0.101982,
            0.369427,
           -0.313926,
           -4.77041,
            -33.225,
            4.91205,
            14.4813,
            0.425719,
           -0.0140556,
           -0.251479,
            0.0131041,
            0.024449,
```

TRXS-0023 c:\LT_KK_Tracker2\src\C\common\portable\trx\tracker\neuralNet4GWeights.h    29

```
    0.123903,
     0.23259,
    -12.6357,
    -3.75777,
   0.0680286,
    0.301262,
    0.308224,
    0.767742,
     3.86715,
   0.0957465,
  -0.0264545,
  -0.0694751,
    0.192573,
    -7.15181,
    0.634268,
     0.33504,
   -0.175889,
     7.22924,
   -0.266435,
   0.0286789,
    0.324559,
   -0.245655,
    0.209918,
  -0.0057184,
  -0.0248694,
    -1.78509,
   -0.684805,
   0.0397125,
    0.393156,
   -0.124082,
   -0.199263,
   -0.113654,
   0.0715068,
   0.0410882,
    0.307788,
    0.225572,
    0.183331,
    0.275435,
   -0.020414,
   -0.152731,
   0.0142548,
     2.61434,
   0.0869285,
   -0.308927,
    -0.30791,
    0.206288,
    0.231605,
   -0.406107,
   -0.105145,
     0.39665,
   -0.834161,
   -0.177338,
    0.436552,
    0.114121,
  -0.0322447,
   -0.140095,
   -0.264967,
   -0.186292,
   -0.131976,
    -1.84901,
    -1.49604,
    0.260068,
   -0.183864,
  -0.0300321,
   -0.320142,
    0.186289,
```

TRXS-0023 c:\LT_KK_Tracker2\src\C\common\portable\trx\tracker\neuralNet4GWeights.h    30

```
 -0.0437934,
 -1.24232,
  4.75617,
 -0.3284,
  0.285321,
  0.393678,
 -0.264182,
 -0.726024,
 -0.0423671,
 -0.0304916,
 -8.35317,
 -0.101352,
  0.246334,
  0.0425568,
 -3.00349,
 -0.225516,
 -0.281204,
 -0.379792,
  2.24652,
 -0.15135,
  0.28704,
  0.272709,
  0.0351549,
 -0.0566853,
  0.078117,
  0.0543011,
 -0.251886,
 -0.0117977,
  0.06024,
 -0.0910623,
 -0.199878,
  0.073193,
 -0.201214,
  0.283006,
 -0.827672,
 -2.22325,
  0.137901,
  0.215392,
 -0.0519041,
 -0.146429,
 -0.263528,
  0.161266,
  0.653058,
  0.101115,
  0.269104,
 -0.255155,
  0.275502,
 -0.168989,
  0.217212,
 -0.297641,
 -0.499107,
  0.594079,
  0.934015,
  1.00597,
 -0.0981243,
 -0.230325,
 -0.00739099,
  0.306641,
 -0.153816,
  0.393455,
  0.108774,
 -0.714035,
 -2.90678,
  0.90098,
  0.372574,
  0.266489,
```

TRXS-0023 c:\LT_KK_Tracker2\src\C\common\portable\trx\tracker\neuralNet4GWeights.h                31

```
    0.152922,
    0.267365,
   -0.0801023,
   -0.120695,
    0.914242,
   -0.309708,
    0.522057,
    0.226792,
    0.451606,
    0.545711,
    0.23504,
    0.0602452,
   -0.112038,
   -0.14246,
   -0.0590216,
    0.324545,
    0.255798,
   -0.00802184,
    0.183849,
    1.7827,
    1.01966,
    0.177568,
    0.0269234,
    0.292018,
    0.207578,
   -0.0211084,
    0.20324,
    0.336132,
    0.416871,
    0.534209,
   -0.450471,
   -1.10545,
    0.203822,
    0.0715143,
   -0.0321251,
    0.426165,
   -0.890686,
   -0.325611,
   -0.107661,
    0.0356999,
   -0.291319,
    2.49488,
    1.00005,
   -2.92074,
    0.289653,
   -0.174206,
   -0.235939,
   -0.009827,
   -0.3059,
   -0.124574,
    0.0897181,
   -3.27427,
  -11.702,
    0.781442,
    3.09945,
   -0.182957,
   -0.310064,
   -0.256345,
   -0.2834,
    0.971635,
   -0.0830367,
    4.4575,
   -0.00313746,
   -1.50214,
   -1.4072,
   -0.610005,
```

TRXS-0023 c:\LT_KK_Tracker2\src\C\common\portable\trx\tracker\neuralNet4GWeights.h  32

```
    -0.0613909,
     0.108202,
     1.01368,
    -0.263664,
    -0.780814,
     0.929151,
     0.657599,
     0.0485312,
     0.214928,
    -0.155815,
     0.4794,
    -0.443093,
     0.278917,
    -0.0940325,
     0.395478,
    -0.00943867,
    -0.0364824,
    -0.539688,
     0.356671,
    -0.226012,
     0.0846057,
     0.215248,
     0.062247,
     0.38826,
    -0.877256,
     0.355131,
     0.396878,
     0.218022,
    -0.723682,
    -5.73188,
     1.61863,
     0.203392,
     0.489901,
     0.218827,
     0.0329373,
    -0.16046,
    -2.85712,
     0.491741,
     0.06493,
     0.268882,
    -1.36006,
    -0.223296,
     1.26077,
     1.59807,
    -2.08308,
    -0.139917,
    -0.11803,
    -0.0976712,
    -0.430375,
    -3.20756,
    -0.494326,
    -0.40612,
    -1.31011,
    -0.606179,
     1.91709,
     1.24033,
     0.122142,
     0.272679,
     0.0651643,
     0.275339,
     0.197943,
     0.187323,
     0.700313,
     1.42691,
    -0.299918,
    -0.169404,
```

TRXS-0023 c:\LT_KK_Tracker2\src\C\common\portable\trx\tracker\neuralNet4GWeights.h 33

```
    0.220339,
    0.248147,
    0.274853,
    0.144796,
   -0.380779,
   -0.859569,
    -2.78004,
   0.0237067,
  -0.0357404,
    0.238621,
   0.0829473,
    0.123594,
   -0.965054,
   -0.114873,
  0.00962087,
    0.219037,
    0.144205,
     0.89232,
   -0.595585,
   0.0613573,
   -0.353096,
     -21.914,
      2.9556,
    0.723151,
    0.392519,
    0.105507,
   0.0752315,
     4.82454,
   -0.562075,
    0.242472,
     9.51602,
    -11.7607,
    -38.9118,
    -5.07685,
     1.03367,
     1.98038,
   0.0231842,
     11.2331,
     6.31839,
   0.0892102,
    -15.7032,
    -19.8081,
    0.122262,
    -3.71405,
    -5.99534,
    -12.7969,
    0.679317,
    0.514584,
    0.690819,
   0.0114271,
     -10.285,
    -6.93758,
      10.951,
     -12.217,
    -10.3566,
     12.3934,
     -28.331,
  -0.0503346,
   0.0128802,
   -0.266826,
   -0.183345,
     1.58122,
      1.2429,
     11.2267,
    -46.7082,
      11.356,
``` c:\LT_KK_Tracker2\src\C\common\portable\trx\tracker\neuralNet4GWeights.h    34

```
     3.51562,
     1.37729,
     0.611288,
     2.65403,
    -0.52976,
    -5.08151,
     7.58766,
    -0.805806,
    -1.78603,
    -0.403989,
     4.22481,
     3.73359,
     0.153726,
    -3.41301,
     0.145692,
     0.122054,
     7.39666,
    -0.0138749,
    -1.82504,
    -1.19965,
    -0.445337,
    -1.99478,
    14.2077,
    -0.548992,
    -0.563315,
    -0.0866393,
    -0.286798,
    -1.27139,
     5.86149,
    -0.00169234,
     6.48671,
    -5.68765,
    -1.32048,
    -0.282146,
     0.623088,
     0.0816724,
    -1.78959,
     0.190513,
    -3.94329,
     3.90732,
    -0.121532,
    -1.47275,
     0.602192,
     0.0715912,
     4.46813,
    -3.15633,
    -3.96751,
     0.0568888,
    -0.14428,
     0.237904,
     0.194648,
     0.244963,
    -0.272479,
   -11.3285,
    -4.14023,
    -8.01911,
     3.79409,
    50.8077,
     0.165009,
     0.150199,
     0.201064,
    -0.218009,
    -0.642417,
    -0.59366,
    -0.00913987,
     0.29739,
```

TRXS-0023 c:\LT_KK_Tracker2\src\C\common\portable\trx\tracker\neuralNet4GWeights.h    35

```
    -6.14746,
    0.567999,
   -0.485771,
    0.135189,
   -0.401145,
   -0.025648,
   -0.0507492,
    -4.91594,
    -5.01693,
    -1.89316,
    -3.54409,
    0.224321,
     -1.5187,
   -0.715579,
    0.352825,
    -1.77763,
   -0.205925,
    -5.66654,
   -0.194915,
   -0.623885,
     2.96873,
    0.153305,
      0.4333,
    -1.51062,
    0.0852999,
    0.0532235,
   -0.233235,
   -0.231279,
   -0.228694,
    0.320647,
   -0.0829616,
   -0.786021,
     0.19408,
    -1.33633,
   -0.230192,
    0.234967,
    0.284908,
    0.312532,
     -0.2341,
    -1.80179,
   -0.834934,
    -0.25681,
   -0.183443,
   -0.304345,
   -0.0344938,
    0.607857,
    0.283074,
      0.8655,
    0.245128,
   -0.100733,
    0.119385,
   -0.219101,
   -0.136873,
     1.22283,
    0.180177,
     1.12651,
     -1.2467,
   -0.445052,
   -0.144837,
    -0.14357,
    0.0783024,
   -0.0245847,
   -0.149028,
   -0.261447,
    0.118761,
    -1.92064,
```

TRXS-0023

```
c:\LT_KK_Tracker2\src\C\common\portable\trx\tracker\neuralNet4GWeights.h                        36
    -0.247746,
    -0.826256,
     0.0859013,
    -0.229026,
     0.206058,
     0.0181785,
    -0.127259,
    -0.166372,
    -0.291914,
    -1.29487,
     0.401218,
     0.0672522,
     0.209403,
     0.297951,
    -0.266283,
    -0.199665,
     0.121118,
    -0.238004,
    -0.0567832,
     0.125271,
    -1.16765,
    -0.594229,
     0.0787378,
    -0.342876,
    -0.0628794,
     0.276531,
    -0.199304,
    -0.00288825,
     1.06218,
     0.143897,
    -0.273794,
     0.0461554,
     3.11039,
    -0.152194,
     0.181211,
     0.174346,
    -0.0250998,
    -0.128645,
     0.405608,
     0.260066,
    -0.00860588,
    -0.666177,
    -0.121658,
     0.276332,
     1.07588,
    -0.213327,
    -2.04454,
     0.309214,
     2.74418,
     0.258595,
     0.0844359,
     0.315435,
     0.422552,
     0.679284,
    -0.0750688,
    -0.96683,
    -0.313163,
    -2.31641,
     2.90687,
     0.171034,
     0.381934,
     0.0153963,
     0.253124,
     0.128216,
     0.378352,
     0.319846,
```

TRXS-0023

```
c:\LT_KK_Tracker2\src\C\common\portable\trx\tracker\neuralNet4GWeights.h                    37
        -1.77096,
        -2.98213,
         3.66748,
        -0.153824,
        -0.0904787,
         0.0704201,
        -0.00642319,
        -0.0492791,
        -0.0379548,
        -3.27164,
        -1.42206,
        -0.606108,
         0.0127661,
        -0.387751,
         0.278007,
        -0.0746224,
         3.10644,
        -0.196125,
        -0.34727,
        -0.379575,
         0.167632,
        -0.51203,
        -5.88614,
         0.0496059,
        -0.195122,
        -1.98802,
         0.192343,
         0.224422,
        -0.180808,
         0.0870565,
        -0.292639,
         0.226754,
         0.117867,
         0.108789,
         0.306227,
         0.18589,
     0.00269004,
        -0.108897,
         0.0431437,
        -0.27116,
        -0.239334,
        -0.0996976,
        -0.1667,
        -0.175546,
         0.0315624,
         0.266008,
        -0.086635,
        -0.398402,
         0.161427,
         5.172,
         0.180747,
        -0.169063,
        -0.114267,
         0.258554,
        -0.0111718,
        -0.152418,
        -0.182028,
        -0.347657,
         0.0577259,
    -0.00421917,
        -0.0537167,
        -0.184765,
        -0.0949864,
         0.133569,
        -0.17571,
        -0.264704,
```

TRXS-0023

```
c:\LT_KK_Tracker2\src\C\common\portable\trx\tracker\neuralNet4GWeights.h                                    38
        0.304471,
        0.43442,
        1.29435,
        0.964743,
       -0.0996264,
        0.266681,
       -0.0296721,
       -0.143262,
        0.282464,
        0.102295,
       -0.141969,
        0.845589,
        0.443725,
        0.720246,
       -0.0326935,
       -0.101503,
       -0.103069,
       -0.132766,
       -0.066425,
        0.015891,
       -0.0141546,
       -0.422922,
       -0.244493,
       -2.75844,
        0.0467676,
        0.288275,
       -0.901716,
        0.0820068,
       -0.291524,
       -0.099171,
        0.0064026,
       -0.128438,
        0.264217,
       -0.00283134,
        0.567288,
       -0.273579,
       -0.00304518,
       -0.060062,
        0.113483,
        0.130807,
       -0.0971331,
       -0.3007,
        0.292703,
       -0.0269292,
        0.126047,
        0.231361,
       -0.166309,
        0.300163,
       -0.0949008,
       -0.355769,
        0.159417,
       -0.31048,
        0.0161602,
        0.205592,
       -0.180414,
       -0.20138,
       -0.0381227,
        0.150003,
       -0.145527,
        0.0087588,
       -0.026177,
       -0.107981,
        0.107303,
        0.182558,
        0.234613,
        0.16966,
```

TRXS-0023

```
c:\LT_KK_Tracker2\src\C\common\portable\trx\tracker\neuralNet4GWeights.h                39
        0.257041,
        0.251888,
        0.800286,
       -0.711723,
         3.25775,
       0.0256847,
       -0.269226,
       -0.345863,
       0.0199845,
        0.122848,
        0.274513,
       0.0475037,
       0.0774639,
       -0.141983,
       -0.186491,
       -0.228947,
      -0.0958921,
        -0.17396,
       -0.175559,
        0.239251,
       0.0384264,
       -0.220836,
        0.570729,
       -0.448822,
       -0.543323,
      -0.0602437,
       -0.041946,
        0.819645,
       -0.276945,
        0.057141,
       -0.147239,
       -0.308429,
       -0.755449,
       -0.742872,
       -0.136171,
        0.256013,
       -0.777125,
       0.0966841,
         0.31314,
       -0.128917,
        0.269086,
       -0.142944,
        0.339685,
       0.0616219,
         1.42099,
        0.214364,
       -0.165081,
         0.17928,
       0.0973752,
      -0.0952355,
        0.193105,
       -0.993141,
     -0.00404458,
        0.197612,
        0.124339,
       -0.179972,
        0.566642,
       -0.129103,
        0.101643,
        0.154036,
       -0.317768,
        0.570767,
        0.205626,
       0.0517684,
        0.120528,
        0.150208,
```

TRXS-0023 c:\LT_KK_Tracker2\src\C\common\portable\trx\tracker\neuralNet4GWeights.h            40

```
0.105609,
0.100578,
-0.231147,
0.907275,
1.57521,
1.38119,
-0.026274,
0.21376,
-0.0319108,
0.126453,
0.0814368,
1.12643,
0.936132,
4.21325,
0.138983,
-0.480108,
0.32495,
0.387595,
0.421768,
2.42238,
-0.140555,
-0.367092,
-0.0474202,
-0.350903,
-0.571407,
0.67917,
-0.06196,
0.118252,
0.983278,
0.513215,
-0.0872391,
-0.07564,
-0.0798743,
0.158307,
3.00245,
0.243598,
0.0363553,
-0.144182,
0.203227,
2.24004,
1.00232,
0.279136,
-3.26846,
-0.171148,
-1.80357,
6.30914,
0.28379,
-0.477115,
0.714648,
0.00797213,
-3.63979,
-1.08264,
-8.46483,
-2.09556,
0.0536251,
-0.171456,
0.0600622,
-0.155507,
0.261092,
0.319215,
-0.249537,
-8.2387,
-8.60125,
-6.54295,
-0.218416,
0.154292,
```

TRXS-0023

```
c:\LT_KK_Tracker2\src\C\common\portable\trx\tracker\neuralNet4GWeights.h                    41
        -0.0859115,
         -0.153142,
        -0.0859265,
            0.5413,
          0.116948,
          -4.94564,
           10.9662,
           1.59324,
           0.29961,
          0.306763,
         0.0806462,
          0.288026,
          0.105213,
          0.374563,
          -2.88997,
          -2.24774,
         0.0826022,
         -0.258674,
          0.239687,
         -0.417804,
         -0.614023,
          0.155014,
          0.327968,
         -0.120713,
        -0.0424293,
           4.55321,
           1.01529,
         -0.257755,
         -0.274283,
           1.61509,
       -0.00789639,
         -0.334022,
         0.0606889,
       -0.00100623,
          0.322996,
           0.03115,
        -0.0311647,
          0.283126,
         -0.084472,
         0.0859667,
        -0.0677744,
         -0.243423,
         -0.365176,
         -0.300556,
         0.0379815,
          0.441882,
         -0.489923,
           0.10808,
        -0.0593519,
         -0.358817,
          0.113091,
            1.6307,
         0.0219826,
          0.772227,
        -0.0251206,
          -0.16126,
         0.0649159,
          0.238718,
          0.186493,
        -0.0278108,
         -0.168057,
           1.02288,
          0.742958,
           1.31285,
          0.176852,
          0.141778,
```

TRXS-0023 c:\LT_KK_Tracker2\src\C\common\portable\trx\tracker\neuralNet4GWeights.h 42

```
     0.150736,
    -0.0525144,
    -0.110292,
     0.181148,
    -0.0895434,
         2.2413,
        -2.95125,
         1.07737,
        -0.425587,
         0.397693,
        -0.149059,
         0.133675,
         0.0592111,
         0.326208,
         0.102328,
         4.76649,
        -0.161926,
        -0.349244,
         0.124286,
        -0.293601,
        -0.422868,
         0.0870515,
         0.258276,
         0.243715,
        -1.0417,
        -0.182814,
        -0.33054,
        -2.66796,
        -0.149338,
        -0.0509062,
        -0.669666,
        -0.201078,
        -0.225646,
        -0.282642,
        -0.0792997,
        -0.799636,
        -0.293543,
         0.10136,
        -2.19868,
         0.212356,
        -3.42133,
        -0.684699,
        -0.490505,
         0.0735539,
        -0.0446377,
         0.29781,
        -5.4946,
         1.27868,
        -1.76899,
         0.163731,
         0.174775,
         0.351178,
        -0.238244,
        -0.138808,
        -5.16095,
         0.208006,
         0.280012,
         0.104562,
         0.775803,
        -0.706492,
        -0.0438675,
        -3.34304,
         0.168626,
         1.62398,
         5.11532,
         6.21789,
```

TRXS-0023 c:\LT_KK_Tracker2\src\C\common\portable\trx\tracker\neuralNet4GWeights.h    43

```
    -0.174204,
     0.204675,
     -0.13813,
    -0.282694,
    0.00312921,
     0.027905,
     0.153448,
       2.7215,
      4.70734,
     0.567226,
    -0.157794,
    -0.123853,
     0.258256,
     0.169023,
    -0.166651,
    -0.309634,
    -0.867581,
    -0.271931,
   -0.0298077,
     0.206934,
   -0.0907337,
    -0.330825,
   -0.0394751,
    -0.434676,
     -0.17501,
     0.665991,
     0.254435,
     0.464967,
      -0.4298,
    0.0101432,
   -0.0439952,
      0.97058,
    -0.309136,
     0.165412,
      0.22756,
    -0.189288,
    -0.357053,
    -0.334195,
    -0.276005,
    -0.265388,
    -0.193241,
      -0.1961,
   -0.0248555,
    -0.292899,
   -0.0250155,
    0.0996998,
    -0.324752,
   -0.0781792,
   -0.0294916,
   -0.0161901,
    0.0265994,
    -0.103738,
   -0.0981868,
     0.278716,
       0.1075,
     0.151024,
    0.0593011,
    -0.132991,
    -0.229563,
   -0.0501352,
    -0.234755,
      0.16727,
   -0.0804614,
    -0.448748,
    -0.345506,
     0.132124,
```

TRXS-0023

```
c:\LT_KK_Tracker2\src\C\common\portable\trx\tracker\neuralNet4GWeights.h                44
        -0.271457,
        -0.033113,
        -0.108696,
         0.206023,
       -0.0375281,
        -0.063162,
         0.129552,
         0.467584,
        -0.600055,
          3.44719,
       -0.0625681,
        0.0667731,
         0.246219,
       -0.0585328,
       -0.0375748,
       -0.0582098,
         0.221418,
        -0.440925,
        -0.185349,
        -0.241765,
         0.152428,
        0.0210787,
        -0.229674,
       -0.0391568,
         -0.26314,
        -0.206627,
         0.200645,
        -0.102301,
       -0.0190122,
       -0.0262933,
    -3.73884e-005,
         0.187592,
         -2.01018,
         0.276606,
        -0.208029,
        -0.119383,
         -0.14222,
         0.309804,
       -0.0378685,
        -0.192708,
        -0.399667,
         0.299166,
        0.0864814,
       0.00144837,
        0.0349297,
       -0.0974498,
        0.0318288,
         0.268538,
        -0.308237,
        -0.100184,
       -0.0726929,
        -0.437463,
         0.172906,
        -0.281499,
        -0.610615,
       -0.0957446,
        -0.767671,
        -0.355264,
         0.125214,
       -0.0191052,
        -0.165857,
        -0.170689,
         0.117901,
        -0.133272,
         0.249343,
         0.338636,
``` c:\LT_KK_Tracker2\src\C\common\portable\trx\tracker\neuralNet4GWeights.h 45

```
    0.319017,
    0.0429575,
   -0.186872,
   -0.011777,
   -0.0988818,
    0.282231,
    0.150531,
   -0.366676,
    0.37921,
    1.47048,
   -3.11463,
   -0.664154,
   -0.222404,
    0.0156233,
    0.216436,
   -0.190258,
   -0.286982,
   -0.332608,
    0.199732,
    0.306832,
   -0.0893152,
    0.244748,
   -0.152034,
    0.260452,
    0.394588,
    0.0662208,
    0.541471,
   -0.0854145,
    0.144778,
    0.335175,
    0.0719156,
    0.336,
    0.189617,
    0.814027,
   -0.229868,
   -0.493033,
    0.0188299,
    0.181436,
   -0.00745632,
   -0.287499,
   -0.0804234,
    2.29141,
   -0.225104,
    0.690229,
   -0.135924,
   -0.394365,
    0.0526827,
   -0.077625,
    0.0122973,
    1.39424,
    3.27791,
   -0.142376,
   -0.128332,
   -0.402184,
   -0.694731,
   -0.3984,
   -0.79942,
    1.91464,
   -0.293842,
   -0.0720512,
   -0.400622,
   -0.0639026,
   -0.0460999,
   -1.19507,
    0.238266,
   -0.0604684,
```

TRXS-0023 c:\LT_KK_Tracker2\src\C\common\portable\trx\tracker\neuralNet4GWeights.h  46

```
    0.283317,
     1.29068,
     2.90908,
   -0.341745,
   -0.303809,
    0.0900924,
   -0.375547,
   -0.522325,
   -0.214235,
     1.54635,
     1.67473,
   -0.589522,
    0.182697,
    0.0307004,
   -0.234097,
    0.257218,
   -0.373556,
    0.325236,
     1.65425,
     3.92388,
     2.02513,
    0.487409,
 0.00244062,
   -0.471255,
    -4.81917,
     -1.7091,
   -0.102236,
    0.0878427,
     -2.0559,
    0.192983,
     1.09343,
 0.00268587,
   -0.370558,
    0.0402373,
   -0.720009,
    -0.11814,
    0.0131682,
    0.0014229,
    0.0387615,
   -0.177999,
    -0.15592,
    -0.13273,
   -0.582538,
    0.0676892,
   -0.115358,
      0.2093,
   -0.487927,
    0.0568496,
   -0.404611,
   -0.201257,
    -0.70364,
     -1.2456,
   -0.290448,
    0.158368,
   -0.185682,
    0.0603088,
   -0.271786,
    -0.16142,
   -0.523297,
  -0.0581749,
   -0.178326,
   -0.307998,
   -0.173101,
  -0.0990735,
   -0.275473,
    0.0628695,
```

TRXS-0023 c:\LT_KK_Tracker2\src\C\common\portable\trx\tracker\neuralNet4GWeights.h       47

```
    0.252758,
    0.315968,
    -0.34512,
    -0.205487,
    0.0985726,
   0.00441338,
    -0.223477,
    0.148363,
    -0.199705,
    -0.171343,
    -0.471766,
    -0.300344,
    0.827806,
    -0.0150099,
    0.183287,
    -0.0859371,
    0.0602713,
    -0.220467,
    0.521019,
    -0.0413627,
    -2.15873,
    0.279328,
    0.127336,
    0.287784,
    0.0275441,
    0.0521143,
    0.293824,
    -0.30793,
    -0.154924,
    -0.0731317,
    0.352039,
    0.934151,
    -0.00731278,
    0.160362,
    0.037608,
     9.07431,
    0.616836,
    -0.0381656,
    -0.0307992,
    0.631293,
    0.10868,
    -2.18121,
    -0.0753561,
    0.614784,
    -1.19361,
     -4.401,
     2.88733,
    0.139358,
    0.0471899,
    -20.3437,
    -9.69493,
    -2.65001,
    -1.07017,
    0.674349,
    0.067012,
     1.82195,
    -1.96211,
    7.94694,
    1.90724,
    -1.11618,
    -1.5162,
    -0.325753,
    -0.270543,
    0.165235,
    1.40133,
    0.513906,
```

TRXS-0023 c:\LT_KK_Tracker2\src\C\common\portable\trx\tracker\neuralNet4GWeights.h 48

```
    0.989783,
    1.22866,
    6.70839,
    0.598729,
   -7.48141,
    0.152293,
   -0.375247,
    0.0191228,
    0.101223,
    0.0615871,
    0.364627,
   -3.16526,
    4.20135,
   -0.595687,
    0.339474,
   -0.149917,
   -0.0561738,
   -0.09217,
    0.166799,
   -0.404915,
    0.614594,
    2.89811,
    0.312168,
    1.5355,
    0.23877,
    0.201918,
   -0.0527469,
    1.92277,
   -0.413041,
   -1.95472,
   -0.281208,
   -1.58636,
   -1.76335,
    1.06984,
   -0.0587097,
   -0.0322387,
   -2.52644,
    0.200011,
    0.347161,
    0.267294,
    0.0655112,
    0.098919,
    0.111655,
   -0.200209,
   -0.263474,
    0.218071,
    0.178688,
    0.249441,
   -0.120306,
    0.257877,
   -0.0102552,
    0.0580406,
    0.0753918,
    2.82961,
    0.303074,
    0.0574172,
    0.0371411,
    0.0395494,
   -0.00246798,
    0.143373,
    5.37448,
    0.214702,
    0.0637994,
   -3.55827e-005,
    0.0425006,
   -0.0475581,
```

TRXS-0023 c:\LT_KK_Tracker2\src\C\common\portable\trx\tracker\neuralNet4GWeights.h

```
    0.116166,
    0.120437,
   -0.544263,
   -0.262958,
   -1.34813,
   -1.32129,
   -0.201338,
    0.18789,
    0.267566,
    0.282205,
    0.16024,
   -0.0826543,
    6.71165,
   10.361,
   11.1109,
    0.166925,
   -0.333773,
   -0.241754,
    0.0269823,
   -0.0508335,
    0.0343822,
   -3.00558,
   -1.80393,
    1.32792,
    3.02103,
    0.157414,
   -0.160885,
   -0.0228272,
   -0.196933,
   -0.155426,
    0.121548,
   -0.497826,
    0.129443,
   -0.166579,
   -0.579246,
    0.298953,
    0.158061,
   -9.27374,
   -1.8043,
   -0.591929,
   -0.22258,
    0.286197,
   -0.152364,
    0.506359,
    0.095323,
   -1.47088,
   -2.25289,
   -0.0678104,
    0.165624,
   -1.24112,
   -0.272501,
   -0.52105,
    0.342836,
   -0.138649,
   -3.49216,
    0.269626,
   -0.30666,
   -0.0395831,
   -0.0207215,
   -6.03647,
    0.319485,
   -4.8941,
   -0.0212258,
    0.138007,
    0.163329,
    0.00922065,
```

TRXS-0023 c:\LT_KK_Tracker2\src\C\common\portable\trx\tracker\neuralNet4GWeights.h    50

```
     0.59177,
    -0.293722,
    -0.625585,
    -0.527745,
    -1.27734,
     0.689756,
    -2.05312,
     0.179041,
    -0.109437,
     0.163359,
     0.0635132,
    -0.110051,
     0.0846409,
     3.06631,
     4.94876,
     5.47828,
     0.271705,
    -0.107796,
    -0.196944,
    -0.127948,
    -0.01423,
     0.717324,
     2.49673,
    -3.78126,
    -0.14842,
    -0.272546,
    -3.53525,
    -3.49731,
     1.04304,
    -0.268774,
    -0.498128,
     0.246535,
    -0.480111,
     0.120076,
    -1.39326,
     0.523527,
     0.906129,
    -0.0088762,
    -0.312905,
     0.0424285,
     0.278923,
    -0.0745816,
     0.151606,
     0.0364537,
    -0.259936,
     0.364071,
    -1.12326,
     0.173755,
     0.28933,
     0.137146,
     0.226551,
    -0.209663,
    -0.009341,
    -0.0305193,
     0.00982853,
     0.238461,
     0.260196,
    -0.185311,
    -0.0529224,
     0.157724,
     0.130188,
    -0.274551,
    -0.189801,
    -0.00722667,
    -0.242343,
    -0.0708457,
```

TRXS-0023 c:\LT_KK_Tracker2\src\C\common\portable\trx\tracker\neuralNet4GWeights.h         51

```
    -0.0458423,
    -0.336701,
    -0.271114,
    -0.261039,
     0.189053,
     0.0726945,
    -0.140181,
    -0.288268,
     0.0416908,
     0.170253,
    -0.182878,
     0.259331,
     0.11075,
    -0.227158,
    -0.212697,
     1.93306,
     0.337653,
     0.0249824,
     0.035906,
     0.154811,
    -0.123331,
     0.0372039,
     0.213253,
     0.103952,
     0.168051,
     0.0160525,
     0.174264,
    -0.115509,
     0.376013,
    -0.137383,
     0.189543,
    -0.150257,
     0.160633,
    -0.138237,
    -0.0529912,
     0.0629652,
     0.221503,
    -0.0982635,
     0.43839,
    -7.95945,
     0.153228,
    -2.07818,
    -0.596991,
    -0.472055,
    -5.51913,
     0.389026,
    -3.31291,
    -2.84495,
    -12.5191,
    -0.515008,
     0.454695,
     3.21172,
     1.89234,
    -1.35653,
    -0.391932,
    -2.27376,
    -13.0886,
     0.190544,
    -3.22936,
     2.96305,
    -4.11166,
     2.40195,
    -0.706355,
    11.1698,
     0.186458,
    -0.0885119,
```

TRXS-0023

```
c:\LT_KK_Tracker2\src\C\common\portable\trx\tracker\neuralNet4GWeights.h                52
          0.537624,
         -0.156329,
         -0.570775,
          4.60742,
         -1.01147,
        -15.1317,
         -2.25252,
          6.39589,
          0.242224,
          0.271242,
          0.0256374,
         -0.0642439,
         -0.22359,
         -0.187569,
         -5.65247,
        -10.6604,
          1.66916,
          4.81539,
         -0.0988953,
          0.058236,
          0.488747,
          1.18321,
         -0.193927,
         -1.16264,
          1.19741,
         -1.75745,
         -2.34852,
        -14.5866,
         -1.12884,
          0.597916,
          2.37168,
          9.29556,
         -3.81386,
         -7.12469,
         -1.72399,
         -7.06712,
          8.94845,
          1.64764,
          0.329343,
          0.0362854,
          0.931497,
         -0.189346,
         -4.8726,
          0.199672,
          0.299119,
         -0.0758045,
          0.0599062,
         -0.245733,
         -0.524136,
         -0.814878,
          0.114954,
          0.294946,
          3.96947,
          0.212347,
         -1.85269,
         -0.0127049,
         -3.02966,
         -4.93773,
         -0.073628,
          0.177686,
          0.182608,
          1.65237,
         -0.484539,
          0.00990547,
         -3.45901,
         -0.0600402,
```

TRXS-0023 c:\LT_KK_Tracker2\src\C\common\portable\trx\tracker\neuralNet4GWeights.h       53

```
    -0.471852,
    -0.590437,
    -0.244682,
    -0.259969,
    -0.201619,
    -0.177574,
    0.0783926,
       5.43907,
       3.96415,
      0.525683,
     0.0424667,
     0.0422801,
      0.231266,
   -0.00736552,
     -0.224929,
     -0.489243,
      0.433612,
      -1.44752,
      -8.67057,
     -0.413825,
     0.0313371,
     0.0435802,
     -0.100895,
     -0.450147,
     -0.304749,
       3.34254,
     -0.797438,
    -0.0790068,
      0.242356,
      0.421032,
      0.707455,
  -0.000543572,
       0.48365,
      0.182552,
      0.174993,
     -0.106498,
     -0.226154,
      0.185769,
      0.741891,
    -0.0637551,
    -0.0752423,
        3.0549,
      0.212597,
       0.56431,
      0.257697,
     -0.217748,
     -0.211726,
       2.61606,
      0.156036,
      -2.07281,
     0.0169969,
      -4.32238,
       1.22095,
     -0.122584,
      0.215002,
      -2.23496,
      0.220908,
       1.39928,
      -2.53921,
      0.157321,
    -0.0923548,
      -2.76902,
      0.227846,
       1.12637,
     -0.198507,
      -3.72732,
```

TRXS-0023 c:\LT_KK_Tracker2\src\C\common\portable\trx\tracker\neuralNet4GWeights.h 54

```
    -0.238227,
    -0.117505,
     0.0742636,
    -0.255911,
     0.70442,
     0.13401,
     0.808355,
     1.76611,
     7.17763,
     8.32846,
    -3.48506,
    -0.0276823,
     0.00293331,
    -0.249792,
     0.114634,
     0.286006,
     0.235355,
    -2.20953,
    -3.04176,
     2.2354,
     0.000336878,
     0.0943057,
     0.143304,
     0.386682,
     0.512952,
     0.348708,
     2.55864,
     0.785442,
    -0.0732591,
    -2.34547,
     0.480812,
    -0.133504,
    -0.517089,
    -1.58173,
    -0.216977,
    -0.266084,
    -0.00450805,
     0.0332555,
     0.0652938,
     0.347524,
     0.173433,
    -1.04192,
    -1.35267,
    -0.236109,
    -0.640398,
     0.0104631,
    -0.0803126,
    -0.0159389,
     0.0359315,
     0.134927,
    -0.648472,
    -0.484255,
     0.192409,
    -0.0145745,
    -0.174075,
    -0.213734,
     0.0250015,
    -0.342559,
     2.29012,
     1.79356,
    -0.182438,
     0.36516,
     0.0328106,
     0.340591,
    -1.94581,
    -0.0134899,
```

TRXS-0023

| c:\LT_KK_Tracker2\src\C\common\portable\trx\tracker\neuralNet4GWeights.h | 55 |

```
    1.51856,
    0.203612,
    0.247159,
    0.235339,
    0.359697,
    0.0811914,
   -0.190377,
    0.193298,
    0.232844,
   -0.483919,
   -0.342741,
    0.352977,
   -0.207506,
    0.130847,
   -0.187123,
    0.000390882,
    0.134133,
   -0.0573913,
   -0.0889518,
    2.73626,
    4.48975,
    0.359549,
    0.16874,
    0.213715,
    0.268592,
   -0.129674,
   -0.0491192,
    0.173439,
    0.506633,
   -0.160561,
    0.0901168,
    0.161294,
   -0.224295,
   -0.320398,
   -0.0670848,
    0.376591,
   -0.00643734,
    0.238424,
   -0.472602,
    0.0342388,
   -1.04917,
   -0.39475,
    0.150913,
   -0.432106,
   -0.193614,
   -8.26695,
   -1.41634,
   -0.458322,
   -0.350439,
   -0.248038,
   -0.141819,
    7.69885,
    1.75159,
   -4.88082,
   -0.00102778,
    0.123678,
    0.0390928,
   -0.0281697,
   -0.244284,
    3.65049,
   -5.38918,
   17.2312,
   -0.402948,
   -1.58974,
    0.160132,
    7.77965,
```

TRXS-0023

```
c:\LT_KK_Tracker2\src\C\common\portable\trx\tracker\neuralNet4GWeights.h                56
        5.05952,
       -4.78417,
        0.0875754,
       -0.236528,
        0.379409,
       -2.76131,
        0.414064,
       -2.45376,
        0.107761,
        4.88242,
        4.32069,
       -8.46922,
        7.97098,
        0.0828345,
       -0.0754516,
       -0.113978,
       -0.386836,
        0.439137,
       -0.0935802,
        8.02924,
        7.40306,
        8.1932,
        0.0937563,
        0.198765,
        0.446714,
        0.274732,
       -0.139451,
        0.230204,
       10.2827,
       -0.218198,
       -0.876335,
       -2.10384,
       -5.17507,
       -0.595947,
       -3.02315,
       -0.628109,
       -0.215007,
       -0.0536634,
        0.498502,
        0.10905,
       12.8314,
        2.19949,
       -0.507648,
       -1.40754,
        2.75976,
        0.307204,
        0.00295068,
       -0.102775,
       -0.295571,
       -0.080295,
       -0.526453,
        0.315656,
        0.568831,
        0.0792911,
        0.200934,
       -0.0879215,
        0.0821616,
        0.267213,
        0.155078,
        0.16357,
        0.155414,
       -1.38009,
        0.185078,
        0.34617,
        0.178366,
        0.209353,
```

TRXS-0023 c:\LT_KK_Tracker2\src\C\common\portable\trx\tracker\neuralNet4GWeights.h        57

```
    0.00551138,
     0.363621,
     -2.85657,
      0.2667,
     0.252257,
    -0.0939511,
    -0.122532,
     0.260934,
    -0.0176367,
    -0.113156,
    -0.048043,
     0.259998,
    -0.0551762,
    -0.0997054,
     0.0599656,
    -0.169669,
    -0.144481,
     0.195959,
     0.277556,
     0.292143,
     0.792058,
     -2.52094,
     -1.3326,
     0.200496,
     0.403913,
     0.148858,
     0.318297,
     0.0457374,
     0.126453,
    0.00932165,
     0.82068,
    -0.132659,
     0.510948,
    -0.219259,
     0.0991792,
     0.267682,
    -0.152822,
     -0.27853,
    -0.300375,
     0.362332,
    -0.298044,
    -0.0465134,
    -0.722259,
    -0.136356,
    -0.0765652,
    -0.547688,
    -0.314417,
     0.0788551,
    -0.107019,
    -0.155072,
     0.0530689,
     0.519541,
     0.245085,
      1.62648,
     0.0876781,
     0.240352,
    -0.335712,
     0.155597,
     0.235642,
    -0.332767,
    -0.0721827,
    -0.437651,
     -3.53917,
    -0.117442,
    -0.281014,
     0.211093,
```

TRXS-0023 c:\LT_KK_Tracker2\src\C\common\portable\trx\tracker\neuralNet4GWeights.h                    58

```
    -0.0287482,
     0.357651,
     0.0528494,
     2.32536,
     0.0698168,
    -0.0683766,
    -0.068529,
    -0.216439,
     0.259895,
     0.150308,
    -0.232533,
    -0.117771,
     0.366701,
    -0.121122,
     0.179446,
    -0.0566011,
     0.0606703,
    -0.0178719,
     0.228763,
    -0.176544,
     0.196597,
     0.357856,
     0.800136,
    -0.619072,
     0.244582,
    -0.205806,
     0.18795,
     0.283791,
     0.295468,
    -0.150042,
     0.13166,
    -0.357527,
    -0.105836,
     0.218955,
    -0.287946,
    -0.240734,
    -0.229576,
     0.149431,
    -0.0350523,
     0.0736068,
     0.170655,
     0.0884898,
     0.250134,
    -0.304635,
     0.0382807,
     0.0475241
};

// Matrix Dimensions = (40 x 1)
double hiddenBias1_2[40] C30_ONLY(__attribute__((space(auto_psv), aligned(2))))= {\
    -1.4505,
    -1.4241,
    -1.2371,
     1.2679,
    -1.2322,
     1.1613,
     0.86159,
     1.1602,
     0.5657,
    -0.93727,
    -0.42841,
    -0.61845,
     0.59654,
    -0.53275,
    -0.29917,
     0.2507,
```

TRXS-0023 c:\LT_KK_Tracker2\src\C\common\portable\trx\tracker\neuralNet4GWeights.h            59

```
    0.30126,
    0.19853,
    0.17695,
   -0.030186,
    0.030472,
   -0.20155,
    0.1699,
    0.15259,
    0.32976,
   -0.48898,
   -0.43318,
   -0.69499,
   -0.6461,
   -0.8429,
   -0.74716,
   -0.83913,
   -0.86303,
    1.0585,
   -0.96658,
   -1.2016,
    1.1815,
   -1.5397,
    1.285,
    1.4297
};

//double coeff1[INPUT_SIZE]= {
double coeff1[INPUT_SIZE]= {
    0.0026,
    0.0012,
    0.0008,
    0.0006,
    0.0005,
    0.0004,
    0.0004,
    0.0004,
    0.0004,
    0.0004,
    0.0030,
    0.0010,
    0.0008,
    0.0005,
    0.0005,
    0.0004,
    0.0004,
    0.0004,
    0.0003,
    0.0004,
    0.0025,
    0.0007,
    0.0004,
    0.0003,
    0.0002,
    0.0002,
    0.0002,
    0.0002,
    0.0002,
    0.0002,
    0.0005,
    0.0002,
    0.0001,
    0.0001,
    0.0001,
    0.0001,
    0.0000,
```

TRXS-0023 c:\LT_KK_Tracker2\src\C\common\portable\trx\tracker\neuralNet4GWeights.h    60

```
    0.0000,
    0.0000,
    0.0000,
    0.0003,
    0.0002,
    0.0001,
    0.0001,
    0.0001,
    0.0001,
    0.0001,
    0.0001,
    0.0001,
    0.0001,
    0.0003,
    0.0001,
    0.0001,
    0.0001,
    0.0001,
    0.0001,
    0.0001,
    0.0001,
    0.0001,
    0.0001,
    0.0003,
    0.0003,
    0.0003,
    0.0012,
    0.0013,
    0.0014,
    0.0020,
    2};
//double coeff2[INPUT_SIZE]= {
double coeff2[INPUT_SIZE]= {
     384,
     632,
    1025,
    1089,
    1543,
    2010,
    2153,
    1972,
    2352,
    2789,
     290,
     731,
    1019,
    1348,
    1548,
    1825,
    2272,
    2385,
    2582,
    2143,
     442,
    1813,
    2596,
    3551,
    4861,
    6517,
    7074,
    6923,
    6864,
    7039,
    2438,
    6055,
```

TRXS-0023

```
c:\LT_KK_Tracker2\src\C\common\portable\trx\tracker\neuralNet4GWeights.h                                61
        8973,
        9325,
        9457,
        9493,
       12347,
       30243,
       24889,
       30087,
        4402,
        7230,
        9515,
        9741,
       10047,
       14345,
       16908,
       17530,
       18001,
       19519,
        4304,
        8540,
        9485,
        7936,
        7093,
        6528,
        6404,
        7091,
        8148,
        6984,
        7534,
        5882,
        7534,
         873,
         580,
        1000,
           0,
           1
    };

#ifdef __cplusplus
} // extern "C"
endif endif //_TRACKER_NEURALNETWEIGHTS_H
```

TRXS-0023 c:\LT_KK_Tracker2\src\C\common\portable\trx\tracker\tracker2.c

```c
/**
 * @file tracker/tracker2.c
 * Tracker Processor 2
 *
 * @author Kamiar Kordari
 * @author Ben Funk
 * @author Ruchika Verma
 * @author Copyright 2012 TRX Systems. All rights reserved.
 *
 */ ifdef __C30
    #include <pxxfxxxx.h>
    #include <uart.h>
    #include <ports.h>    //for ext int only
    #include <timer.h>
    #include <trx/sensors/sounds.h>
#else
    #include <trx/filter/iirf.h>
    #include <trx/filter/iirf_fixed.h>
endif include <stdio.h>
include <stdlib.h>
#include <math.h>
include <string.h> include <trx/common.h>
include <trx/util/modbuffer.h>
#include <trx/inu/inu.h>
#include <trx/device/inu4.h>
#include <trx/device/inu5.h>
#include <trx/stdlib/math.h>
#include <trx/stdlib/stdint.h>
#include <trx/math/math.h>
#include <trx/math/quaternion.h>
#include <trx/math/vector.h>
#include <trx/filter/LevelFrame.h>
#include <trx/filter/magSensorFusion.h>
include <trx/util/messages.h> include "angles.h"
include "filters.h"
#include "location.h"
#include "inu_math.h"
#include "user_gait.h"
//#include "neuralNet.h"
#include "neuralNet2.h"
#include "step_detector.h"
#include "stepDetector2.h"
#include "turn_detector.h"
#include "trackerData.h"
#include "tracker2.h"
#include "tracker_constants.h"
#include "freeFallDetect.h"
#include "errorBounds.h"
#include "elevatorDetector.h"
#include "stairwellDetector.h"
#include "hallwayDetector.h"
#include "hipStepDetector.h"

//-------------------------------------------------------------------------
// FUNCTION PROTOTYPES ****************************************************
//-------------------------------------------------------------------------
```

TRXS-0023 c:\LT_KK_Tracker2\src\C\common\portable\trx\tracker\tracker2.c                                                    2

```c
//static void debug_gyroCal(inu_calibratedData *cal);
static int validateStep(void);
//------------------------------------------------------------------
// DEFINES ********************************************************
//------------------------------------------------------------------ define IIR_NATIVE_USE_FIXED
define numints(x)                      (sizeof(x) / sizeof(int16_t))
#define SAMPLE_BUF_ALIGN                (SAMPLE_BUFSIZ * sizeof(int16_t))
#define STEP_BUFSIZ                     (16)
#define FILTER_STEP_OFFSET              (-33)
#define M_ACTIVE_THRESH                 (40)
#define A_ACTIVE_THRESH                 (40)

//------------------------------------------------------------------
// LOCAL VARIABLES ************************************************
//------------------------------------------------------------------ static trackerData_t td;
    / Main storage for tracker data

//------------------------------------------------------------------
static SampleHistory_t smplHist;
static SampleHistoryMem_t smplBufs;

static PathHistory_t pathHist;
static PathHistoryMem_t pathBufs;

static OrientationHistory_t bodyToEarthHist;
static OrientationHistoryMem_t bodyToEarthBufs;

static int16_t acclZNavBuffer[SAMPLE_BUFSIZ]    C30_ONLY(_YBSS(SAMPLE_BUF_ALIGN));
static int16_t acclMagBuffer[SAMPLE_BUFSIZ]     C30_ONLY(_YBSS(SAMPLE_BUF_ALIGN));

static int16_t filtYBuffer[SAMPLE_BUFSIZ]       C30_ONLY(_XBSS(SAMPLE_BUF_ALIGN));
static int16_t yawAngleHistBuffer[SAMPLE_BUFSIZ];

static modbuf_t acclZNav, acclMag;
static modbuf_t filtY, yawAngleHist;

static uint16_t sampleIndex = 0;
        // Indexer [0, 127 (SAMPLE_BUFSIZ - 1)]
static uint16_t pathHistIndex = 0;

//------------------------------------------------------------------ static int16_t stepSampleBuffer[STEP_BUFSIZ];                                      //
    Stores difference in sample numbers between steps
static int16_t stepAngleBuffer[STEP_BUFSIZ];                                       //
    Stores angle at step
static int16_t stepElevationBuffer[STEP_BUFSIZ];                                   //
    Stores elevation at step static modbuf_t stepSample, stepAngle, stepElevation;

static uint16_t stepIndex;                                                         //
    Indexer [0, 15 (STEP_BUFSIZ - 1)]

static float startElevation = 0.0;                                                 //
    Beginning elevation above sea level according to pressur sensor.
static FallDetector fd;

static errorBounds_t errorBounds = {0,0,0,0,0,0,0,0,0,0,0,0,0,0};
static inertialState_t inertialState={0,0,NN_IGNORE,NN_IGNORE,NN_IGNORE,0,0,0,0,0,0,0};

static int lastUpdateSample;
```

TRXS-0023 c:\LT_KK_Tracker2\src\C\common\portable\trx\tracker\tracker2.c                                                3

```c
static RunningStats_t accyStats;

// New Step Detector variables
const stepTracker *sData;
static int prvStepNumber = 0;

//------------------------------------------------------------------------------
// Initialize Tracker Processor *********************************************
//------------------------------------------------------------------------------
trackerData_t* initTrackerProcessor2(void)
{
    // Clear the tracker data struct
    memset(&td, 0, sizeof(td));

LevelFrame_init(&td.lvState);                          // Initialize orientation
    filter state td.avgFusionAngleError = AVG_FUSION_ANGLE_ERROR_INIT;  // Reset Average Fusion Angle
     Error (start at max)
    td.avgPressure = 101325.0f;                            // Reset Average Pressure tracker_initSampleHistoryMem(&smplHist, &smplBufs, &sampleIndex);
    tracker_initPathHistoryMem(&pathHist, &pathBufs, &pathHistIndex);   // Initialized
    mod buffers for path history
    tracker_initQuatHistoryMem(&bodyToEarthHist, &bodyToEarthBufs, &sampleIndex);

modbuf_init(&acclZNav,     acclZNavBuffer, numints(acclZNavBuffer), &sampleIndex)
    ;
    modbuf_init(&acclMag,      acclMagBuffer,  numints(acclMagBuffer),  &sampleIndex)
    ;
    modbuf_init(&filtY,        filtYBuffer,    numints(filtYBuffer),    &
    sampleIndex);
    modbuf_init(&yawAngleHist, yawAngleHistBuffer, numints(yawAngleHistBuffer), &
    sampleIndex);

// Initialize mod buffers for step detector indexed by step index
    modbuf_init(&stepSample,    stepSampleBuffer,    numints(stepSampleBuffer),    &stepIndex);
    modbuf_init(&stepAngle,     stepAngleBuffer,     numints(stepAngleBuffer),     &stepIndex);
    modbuf_init(&stepElevation, stepElevationBuffer, numints(stepElevationBuffer), &
    stepIndex);

resetTotalAngle();

td.aMag = &acclMag;
    td.zNav = &acclZNav;

detectStepInit(&acclZNav);
    td.debugBuf = getStepFiltResult();

td.attitudeHistory = bodyToEarthHist;   //Pointers to modbuffers holding device
    orientation quaternion.

initNeuralNet2(&smplHist.ax, &smplHist.ay, &smplHist.az, &smplHist.axy, &smplHist.gx,
         &smplHist.gy, &smplHist.gz, &smplHist.vx, &smplHist.vy, &smplHist.vz, &smplHist.fx,
        &smplHist.fy, &smplHist.fz, &smplHist.px, &smplHist.py, &smplHist.pz);

initFallDetector(&fd, FF_ACCL_THRESH, FF_TIME_THRESH);
    td.errorBounds = &errorBounds;
    td.scaleConfidenceSum = 0;
    td.gaitConfidenceSum = 0;

td.pathHist =           &pathHist;

pathHistIndex = 0;
    td.totalPathLength = 0.0;
```

TRXS-0023 c:\LT_KK_Tracker2\src\C\common\portable\trx\tracker\tracker2.c                                           4

```c
    dd_init(); //initialize drift/rotation detector
    hsd_init(); // intialize hip step detector
    return &td;
}

//----------------------------------------------------------------------
// Process Calibrated Data ********************************************
//---------------------------------------------------------------------- void processCalibratedData2(inu_calibratedData *cal, float pressure, float pressureTemp,
    float localMagIntensity, float localMagInclination, uint32_t time)
{
    //----------------------------------------------------------------------
    // VARIABLE DECLARATION ************************************************
    //----------------------------------------------------------------------
    quaternion qBodyToEarth;                    // Body to earth frame transformation
    (shortcut to lvState.qf)
    quaternion qBodyToNav;                      // Body to navigation frame
    transformation
    float3x1 aNav, gNav, mNav;                  // Navigation frame coordinates
    float3x1 mRefEarth, mRefBody, mRefNav;      // Compass sensor fusion vector.

float3x1 zref = {{0.0, 0.0, 1000.0}};       // replace with #def
    int16_t yElevation;

int16_t vlctyTemp;
    int16_t anglTemp;

float totalAcceleration = 0.0;
    float azimuth = 0.0;
    //int16_t azimuth_hold = 0;

float fusionAngleError;

int16_t lastGait;
//  static int betweenTripSamples = 0;
    static xyLocation_t elevLocation = {0, 0};
    static int elevator = 0;
    float distance = 0;
    static uint32_t pathPointProcessed = 0;

int16_t startStepIndex;
    int16_t stopStepIndex;

int16_t vxRef, vyRef, vzRef, fxRef, fyRef, fzRef;
    int16_t vx, vy, vz, fx, fy, fz;

int16_t i;
    int16_t *neuralNetInputData;
//  neuralNetGait4Class_t netOutput;
    neuralNetGait_t tempNetOutput;

//----------------------------------------------------------------------
    // BEGIN PROCESSING ****************************************************
    //---------------------------------------------------------------------- td.trip = NULL;
    td.segment = NULL;
    td.bElevatorTrip = false;
    td.bElevatorShaft = false;
    td.bStairFlight = false;
    td.bStairStairwell = false;
    td.bHallSegment = false;
    td.bHallHallway = false;
```

TRXS-0023 c:\LT_KK_Tracker2\src\C\common\portable\trx\tracker\tracker2.c    5

```c
    td.bStepSample = false;
    td.bPrintSample = false;
    td.bMissedStep = false;

td.sampleNumber++;                                              // Increment sample
    //betweenTripSamples++;
    number [0, 2^32)
    sampleIndex = td.sampleNumber % SAMPLE_BUFSIZ;                  // Must be in range [0,
    127]. Indexes circular buffers.

LevelFrame_insert(&td.lvState, cal);                            // Update orientation
    filter.
    qBodyToEarth = LevelFrame_getBodyToEarth(&td.lvState);          // Returns lvState.qf
    qBodyToNav = LevelFrame_getBodyToNav(&td.lvState);              // get navigation frame
    quaternion azimuth = getAzimuth(qBodyToEarth);                             // Determine azimuth.
    This is direction user is facing. (Angle of +Y-axis projected on level plane)

totalAcceleration = float3x1_norm(cal->accl);                   // Compute acceleration
    magnitude td.gyroAngle = getTotalAngle(azimuth);                          // Accumulates azimuth
    and total angle not bounded from 0-360
    modbuf_write(yawAngleHist, (int16_t)(td.gyroAngle+0.5));        // Store historical step
    angle data. Referenced by step detector to store step angle.

aNav = quat_transform(qBodyToNav, cal->accl);                   // Get navigation frame
    coordinates for accelerometers, gyro, and magnetic sensors
    aNav.z -= 1000.0;                                               // Remove gravity(1000mg)
    from z component.
    gNav = quat_transform(qBodyToNav, cal->gyro);
    mNav = quat_transform(qBodyToNav, cal->mag);

td.magField = mNav;                                             // Save the magnetic
    field data //-----------------------------------------------------------------------------
    // DETECT FREE FALL AND HIGH IMPACT ******************************************
    //-----------------------------------------------------------------------------
    if (detectFreeFall((uint32_t)totalAcceleration, &fd))
        td.fallDetect = 1;
    if (totalAcceleration > HIGH_IMPACT_ACCL_THRESH)
        td.impactDetect = 1;

//-----------------------------------------------------------------------------
    // DETECT POSTURE ************************************************************
    //----------------------------------------------------------------------------- td.postureVector = quat_transform(quat_conj(qBodyToEarth), zref);

yElevation = (int16_t)(atan2f(td.postureVector.z, td.postureVector.y) * RAD2DEG);   /
    / Gravity in ZY plane angle from +Y axis.

td.bUserBack = false;                                           //
    Reset all flags
    td.bUserCrawl = false;
    td.bUserUpright = false;

if (abs(yElevation) < POSTURE_YELEV_BACK_THRESH)
        td.bUserBack = true;

else if (abs(yElevation) > POSTURE_YELEV_CRAWL_THRESH)
        td.bUserCrawl = true;
```

TRXS-0023

```
c:\LT_KK_Tracker2\src\C\common\portable\trx\tracker\tracker2.c                                    6
    else if (yElevation > POSTURE_YELEV_BACK_THRESH && yElevation <
POSTURE_YELEV_CRAWL_THRESH)
        td.bUserUpright = true;

if (yElevation > POSTURE_INVERTED_MIN && yElevation < POSTURE_INVERTED_MAX)
        td.invertedCount++;
    else
        td.invertedCount = 0;

//---------------------------------------------------------------------
    // AVERAGE PRESSURE ****************************************************
    //---------------------------------------------------------------------
    if(pressure > 130000.0)         //Error if pressure is out of this range
        pressure = 130000.0;        //This will indicate error.
    if(td.sampleNumber < 40)        //Allow 1 second to stabilize
        td.avgPressure = pressure;
    else
        td.avgPressure = ewmaFilter(pressure, td.avgPressure, 0.05f);
    td.pressureTemp = pressureTemp;

//---------------------------------------------------------------------
    // ESTIMATE CHANGE IN ELEVATION BASED ON PRESSURE **********************
    //--------------------------------------------------------------------- if (td.sampleNumber == 200)    //Establish basline for first 200 samples (5s @ 40Hz)
    {
        startElevation = -(float)(-3.2808 * 44330.8 * (1 - (float)powf(td.avgPressure /
101325.0, 0.19)));
    }
    if (td.sampleNumber>200)                //
    {
        //from sentrix software
        float currentElevation = -(float)(-3.2808 * 44330.8 * (1 - (float)powf(td.
avgPressure / 101325.0, 0.19)));
        td.locationZ = (currentElevation-startElevation) * 0.3048f;  //Convert feet to
meters.
    }

//---------------------------------------------------------------------
    // COPY CALIBRATED DATA TO HISTORICAL BUFFERS **************************
    //--------------------------------------------------------------------- modbuf_write(smplHist.ax, (int16_t)(aNav.x));
    modbuf_write(smplHist.ay, (int16_t)(aNav.y));
    modbuf_write(smplHist.az, (int16_t)(aNav.z));

modbuf_write(smplHist.axy, (int16_t) sqrtf(aNav.x * aNav.x + aNav.y * aNav.y));

vlctyTemp =    modbuf_read(smplHist.vx,0) + (int16_t)(aNav.x);
    modbuf_write(smplHist.vx, (int16_t) vlctyTemp);
    vlctyTemp =    modbuf_read(smplHist.vy,0) + (int16_t)(aNav.y);
    modbuf_write(smplHist.vy, (int16_t) vlctyTemp);
    vlctyTemp =    modbuf_read(smplHist.vz,0) + (int16_t)(aNav.z);
    modbuf_write(smplHist.vz, (int16_t) vlctyTemp);

modbuf_write(smplHist.gx, (int16_t)(gNav.x));
    modbuf_write(smplHist.gy, (int16_t)(gNav.y));
    modbuf_write(smplHist.gz, (int16_t)(gNav.z));

anglTemp = modbuf_read(smplHist.fx,0) + (int16_t)(gNav.x);
    modbuf_write(smplHist.fx, (int16_t) anglTemp);
    anglTemp = modbuf_read(smplHist.fy,0) + (int16_t)(gNav.y);
    modbuf_write(smplHist.fy, (int16_t) anglTemp);
    anglTemp = modbuf_read(smplHist.fz,0) + (int16_t)(gNav.z);
    modbuf_write(smplHist.fz, (int16_t) anglTemp);
```

TRXS-0023

```
c:\LT_KK_Tracker2\src\C\common\portable\trx\tracker\tracker2.c                                    7
    modbuf_write(smplHist.mx, (int16_t)(cal->mag.x * 1000.0));      // Typical values for
     cal->mag between -1.0 and 1.0.
    modbuf_write(smplHist.my, (int16_t)(cal->mag.y * 1000.0));      // Multiplying by
     1000 to gain precision in fixed point buffer.
    modbuf_write(smplHist.mz, (int16_t)(cal->mag.z * 1000.0));

modbuf_write(smplHist.pressure, (uint16_t)(td.avgPressure / 2));

modbuf_write(smplHist.px, (int16_t)td.postureVector.x);
    modbuf_write(smplHist.py, (int16_t)td.postureVector.y);
    modbuf_write(smplHist.pz, (int16_t)td.postureVector.z);

modbuf_write(acclZNav, (int16_t)(aNav.z));

modbuf_write(bodyToEarthHist.w, (int16_t)ldexpf(qBodyToEarth.w, QUAT_BUFFER_EXP));  /
    /Historical orientation quaternions stored as scaled fixed point integers.
    modbuf_write(bodyToEarthHist.x, (int16_t)ldexpf(qBodyToEarth.x, QUAT_BUFFER_EXP));
    modbuf_write(bodyToEarthHist.y, (int16_t)ldexpf(qBodyToEarth.y, QUAT_BUFFER_EXP));
    modbuf_write(bodyToEarthHist.z, (int16_t)ldexpf(qBodyToEarth.z, QUAT_BUFFER_EXP));

// Compute total acceleration (minus gravity)
    modbuf_write(acclMag, (int16_t)float3x1_norm(aNav));

//-----------------------------------------------------------------------------
    // CHECK FOR GYRO STILL ********************************************************
    //-----------------------------------------------------------------------------
    //@TODO - Use this result to determine when gyro angle may be held so that user may
    stand in same location for long periods w/o drift.
    //azimuth_hold = (modbuf_active(accX, -(SAMPLE_BUFSIZ - 1), 0, A_ACTIVE_THRESH) ||
    modbuf_active(accY, -(SAMPLE_BUFSIZ - 1), 0, A_ACTIVE_THRESH) ||
    //           modbuf_active(accZ, -(SAMPLE_BUFSIZ - 1), 0, A_ACTIVE_THRESH) ||
    modbuf_active(magX, -(SAMPLE_BUFSIZ - 1), 0, M_ACTIVE_THRESH) ||
    //           modbuf_active(magY, -(SAMPLE_BUFSIZ - 1), 0, M_ACTIVE_THRESH) ||
    modbuf_active(magZ, -(SAMPLE_BUFSIZ - 1), 0, M_ACTIVE_THRESH)) ? 0 : 1;

//-----------------------------------------------------------------------------
    // STEP DETECTOR ****************************************************************
    //-----------------------------------------------------------------------------

// Make sure we have at least -FILTER_STEP_OFFSET samples in the buffer
    td.neuralNetInputData = NULL;
    sData = hipStepDetector(aNav.x, aNav.y, aNav.z, gNav.x, gNav.y, gNav.z, td.
    sampleNumber, 0, 0);
    if((sData->stepNumber - prvStepNumber) == 1)
    {
        startStepIndex = (uint16_t)( sData->lastStepSampleNumber - td.sampleNumber +1);
        stopStepIndex  = (uint16_t)( sData->sampleNumber - td.sampleNumber +1);

vxRef = modbuf_read(smplHist.vx, startStepIndex);
        vyRef = modbuf_read(smplHist.vy, startStepIndex);
        vzRef = modbuf_read(smplHist.vz, startStepIndex);

fxRef = modbuf_read(smplHist.fx, startStepIndex);
        fyRef = modbuf_read(smplHist.fy, startStepIndex);
        fzRef = modbuf_read(smplHist.fz, startStepIndex);

for (i = startStepIndex; i< stopStepIndex+1; i++)
        {
            vx = modbuf_read(smplHist.vx, i);
            modbuf_write(smplHist.vx, (int16_t) (vx - vxRef));
            vy = modbuf_read(smplHist.vx, i);
            modbuf_write(smplHist.vy, (int16_t) (vy - vyRef));
            vz = modbuf_read(smplHist.vz, i);
            modbuf_write(smplHist.vz, (int16_t) (vz - vzRef));

fx = modbuf_read(smplHist.fx, i);
```

TRXS-0023

```
c:\LT_KK_Tracker2\src\C\common\portable\trx\tracker\tracker2.c                                    8
            modbuf_write(smplHist.fx, (int16_t) (fx - fxRef));
            fy = modbuf_read(smplHist.fx, i);
            modbuf_write(smplHist.fy, (int16_t) (fy - fyRef));
            fz = modbuf_read(smplHist.fz, i);
            modbuf_write(smplHist.fz, (int16_t) (fz - fzRef));
        } neuralNetInputData = getNetInputNodes2(startStepIndex, stopStepIndex);
        tempNetOutput = testNeuralNet2(neuralNetInputData);

td.netOutput = tempNetOutput;
        tempNetOutput = (neuralNetGait_t) sData->gait;
        if ((td.netOutput == NN_2D) )
        {
            if ((tempNetOutput   == NN_FORWARD) || (tempNetOutput   == NN_BACKWARD)||
        (tempNetOutput   == NN_SS_RIGHT) ||(tempNetOutput   == NN_SS_LEFT) ||(tempNetOutput   ==
        NN_RUN))
                td.netOutput = tempNetOutput;
        }
        if (tempNetOutput == NN_GARBAGE)
                td.netOutput =   NN_GARBAGE;

td.bStepSample = true;
        td.location.x = sData->locationX;
        td.location.y = sData->locationY;
        td.stepNumber = sData->stepNumber;
        td.stepLength = sData->stepLength;
        if(sData->stepNumber == 1)
            td.firstStepFlag = 1;
        td.stepDirection = (float)modbuf_read(yawAngleHist, -(td.sampleNumber - sData->
        sampleNumber)) + sData->stepDirection / M_PI * 180 -90;
        td.lastStepSampleNumber = sData->lastStepSampleNumber;
        td.currentStepSampleNumber = sData->sampleNumber;
        modbuf_write(stepSample, (sData->sampleNumber - sData->lastStepSampleNumber));

modbuf_write(stepElevation, td.locationZ);
        modbuf_write(stepAngle, sData->facingDirection);
        switch (td.netOutput)
        {
            case NN_UP:
                if (((td.gaitCounters>>4) & 0x0003) < 3)
                    td.gaitCounters += 0x0010;

updateLocation(&td.location, td.stepDirection, td.stepLength);
                break;

case NN_DOWN:
                if (((td.gaitCounters>>6) & 0x0003) < 3)
                    td.gaitCounters += 0x0040;
                updateLocation(&td.location, td.stepDirection, td.stepLength);
                break;

case NN_2D:
            case NN_FORWARD:
            case NN_BACKWARD:
            case NN_SS_RIGHT:
            case NN_SS_LEFT:
            case NN_RUN:
                if (((td.gaitCounters>>0) & 0x0003) < 3)
                    td.gaitCounters += 0x0001;
                updateLocation(&td.location, td.stepDirection, td.stepLength);
                break;
        }
```

```
c:\LT_KK_Tracker2\src\C\common\portable\trx\tracker\tracker2.c                                    9
    td.lastNetOutput = td.netOutput;

td.segmentLength += (uint16_t)td.stepLength;    // Only increment segmentLength
if garbage was not detected
    td.totalPathLength += td.stepLength;

//Add to path buffer every step modbuf_write(pathHist.xLoc,(int16_t)(td.location.x *10));    //Save location in
decimeters
    modbuf_write(pathHist.yLoc,(int16_t)(td.location.y *10));
    modbuf_write(pathHist.zLoc,(int16_t)(td.locationZ * 10));
    modbuf_write(pathHist.pressure,(uint16_t)(td.avgPressure / 2));
    modbuf_write(pathHist.gyro, (int16_t)td.gyroAngle);
    modbuf_write(pathHist.compass, (int16_t)td.compassAngle);
    modbuf_write(pathHist.timeH, (uint16_t)(time>>16));
    modbuf_write(pathHist.timeL, (uint16_t)(time & 0xFFFF));
    modbuf_write(pathHist.gait, (uint16_t)td.netOutput);
    modbuf_write(pathHist.ptIndex, pathPointProcessed);
    modbuf_write(pathHist.flags, 0);

//Set pressure stability flags
    if(1)
    {
        int16_t zMin=0, zMax=0;
        uint8_t i;
        uint8_t lookbackLength = 5;
        zMin = modbuf_read(pathHist.zLoc, 0);
        zMax = zMin;

if(pathPointProcessed < 5)
            lookbackLength = pathPointProcessed;

for(i=0;i<lookbackLength;i++)
        {
            int16_t z = modbuf_read(pathHist.zLoc, -i);
            if(z<zMin)
                zMin = z;
            if(z>zMax)
                zMax = z;
        }
        if((zMax - zMin) < 10)
            modbuf_write(pathHist.flags, 0x0010);
    } if (pathPointProcessed > 10)           // pass 12 samples
    {
        td.segment = detectHallSegment(pathHist.xLoc, pathHist.yLoc, pathHist.gyro,
pathHist.compass, time);
        if(td.segment != NULL)
        {
            if(td.segment->segmentID > 0)
            {
                td.bHallSegment = true;
                updateHallHallway(td.segment);
            }
            if(td.segment->hallway == 1)
            {
                td.hallway = outputHallHallway();
                td.bHallHallway = true;
            }
        }
    }

// KAMIAR: COMMENTED OUT THIS PART, TO BE FIXED
```

TRXS-0023

```
c:\LT_KK_Tracker2\src\C\common\portable\trx\tracker\tracker2.c                                    10
        //if (pathPointProcessed > 5)          // pass 7 samples
        //{
        //   td.flight = detectStairFlight(pathHist.xLoc, pathHist.yLoc, pathHist.zLoc,
    pathHist.gyro, pathHist.compass, pathHist.gait, (pathPointProcessed+1), pathHist.
    timeH, pathHist.timeL);

//   if(td.flight != NULL)
        //   {
        //       td.bStairFlight = true;
        //       updateStairStairwell(td.flight);
        //
        //       if(td.flight->stairwell == 1)
        //       {
        //           td.stairwell= outputStairStairwell();
        //           td.bStairStairwell = true;
        //       }
        //   }
        //}
        pathHistIndex++;
        pathHistIndex %= PATH_BUFSIZ;
        pathPointProcessed++;

}
    prvStepNumber = sData->stepNumber;

if (td.bStepSample)
    {
        td.bStairs = false;                                     // Reset the
    stairs flag
        td.bUserStopped = false;                                // Indicate user
    is no longer stopped if (td.stepNumber > 2)
            td.strideAngle = getStrideAngle(stepAngle);         // Get Stride
    Angle td.gyroLOPAngle = getLOPAngle(stepAngle);               // Get LOP Angle if (detectTurn(td.strideAngle, td.stepNumber))          // Detect Turn
        {
            td.bPrintSample = true;
            td.bUserTurning = true;
            td.bHallway = false;
        } if (td.bUserTurning)
        {
            if (detectTurnEnd(td.strideAngle, td.gyroLOPAngle, td.stepNumber))   // Detect
    Turn End
            {
                td.bPrintSample = true;
                td.bUserTurning = false;

td.segmentNumber++;
                td.segmentLength = 0;                           // Reset Segment
    Length
            }
        } if (!td.bUserTurning)
        {
            if (detectHall(td.gyroLOPAngle, td.stepNumber))     // Detect Hallway
            {
                td.bHallway = true;
            }
        }
```

TRXS-0023 c:\LT_KK_Tracker2\src\C\common\portable\trx\tracker\tracker2.c                                11

```
    }
    td.bUserStopped = detectStop(td.sampleNumber, td.currentStepSampleNumber);  // Detect
     Stopped
    td.bUserStill = detectStill((int16_t)totalAcceleration);                    // Detect
     Still
    if(td.bUserStill)
    {
        td.stillDuration = 1+(uint16_t)((time - td.stillStartTime)>>15);
    }
    else
    {
        if(td.stillDuration != 0)    //Start of movement
            td.motionInterval++;
        td.stillDuration = 0;
        td.stillStartTime = time;
    }

//------------------------------------------------------------------------------
    // FEATURE MESSAGES ************************************************************
    //------------------------------------------------------------------------------ td.trip = detectElevatorTrip((int16_t)aNav.z, time, (int16_t)td.locationZ);
    if (td.trip != NULL)
    {
        td.bElevatorTrip = true;
        elevLocation = td.location;
        elevator = 1;
        updateElevatorShaft(td.trip);
    } distance = (float)sqrt((((float)td.location.x - (float)elevLocation.x ) * ((float)td.
     location.x - (float)elevLocation.x )) + (((float)td.location.y - (float)elevLocation.
     y ) * ((float)td.location.y - (float)elevLocation.y )));

if ((distance > 2) && (elevator == 1))   // distance greater than 2 meters
    {
        td.shaft = outputElevatorShaft();
        td.bElevatorShaft = true;
        elevator = 0;
    }

//------------------------------------------------------------------------------
    // CALCULATE COMPASS ANGLE *****************************************************
    //------------------------------------------------------------------------------ if (float3x1_norm(cal->mag) > 0.0) //Ensure compass data is valid for math functions
    {
        td.compassAngle = (atan2f(mNav.y, mNav.x) * (float)RAD2DEG) - 90.0f;

if (td.compassAngle < 0.0)
            td.compassAngle += 360.0;

fusionAngleError = updateMagEstimate(cal->mag, qBodyToEarth, !td.bUserStopped,
     localMagIntensity, localMagInclination, &mRefEarth);
        mRefBody = quat_transform(quat_conj(qBodyToEarth), mRefEarth);
        mRefBody = float3x1_normalize(mRefBody);
        mRefNav = quat_transform(qBodyToNav, mRefBody);
        mRefNav = float3x1_normalize(mRefNav);

// Filter fusion angle error to avoid indicating accurate when invalid mag field
     moves past ref vector by chance.
        if (!td.bUserStopped)
            td.avgFusionAngleError = ewmaFilter(fusionAngleError, td.avgFusionAngleError,
     0.05f);
```

TRXS-0023

```
c:\LT_KK_Tracker2\src\C\common\portable\trx\tracker\tracker2.c                          12
        td.fusionReliability = td.avgFusionAngleError;

td.fusionAngle = (atan2f(mRefNav.y, mRefNav.x) * (float)RAD2DEG) - 90.0f;

if (td.fusionAngle < 0.0)
            td.fusionAngle += 360.0;

td.compassReliability = getStaticReliability(mNav, localMagIntensity,
localMagInclination);
    }
    else       //Compass sensor malfunctioned so set all magnetic reliabilities to zero.
    {
        td.fusionReliability = 0;
        td.compassReliability = 0;
        td.avgFusionAngleError = 0;
    }

//---------------------------------------------------------------------
    // ESTIMATE GYRO ERROR ************************************************
    //--------------------------------------------------------------------- td.inertialPathError = driftDetect(td.gyroAngle, td.compassAngle, td.sampleNumber);
    // TODO: propogate error from all axes td.gyroScaleError += (cal->gyro.z) * (float)GYRO_SCALE_ERROR_PER_SAMPLE;
    td.gyroOffsetError += GYRO_OFFSET_ERROR_PER_SAMPLE;
    td.gyroWalkError = (float)GYRO_RANDOM_WALK * (float)sqrt(((float)td.sampleNumber /
(float)GYRO_SAMPLES_PER_HOUR));
    td.gyroError = td.gyroOffsetError + td.gyroWalkError + (float)fabs(td.gyroScaleError)
;

//Calculate inertial path error parameters.
    errorBounds.headingDriftPlus = td.stepDirection + (float)GYRO_DRIFT_RATE * (float)td.
sampleNumber * cal->samplePeriod;
    errorBounds.headingDriftMinus = td.stepDirection - (float)GYRO_DRIFT_RATE * (float)td
.sampleNumber * cal->samplePeriod;

if(td.neuralNetInputData != NULL)
    {
        float* netOutput = nn_getOutputArray();
        float speed = getSpeed(td.aMag);
        float timeSinceLastStep = (td.sampleNumber - lastUpdateSample)* cal->samplePeriod
;
        lastUpdateSample = td.sampleNumber;

td.speed = speed;
        td.stepTime = timeSinceLastStep;
        updateErrorBounds(netOutput, speed, timeSinceLastStep, td.netOutput, td.
stepLength, td.stepDirection, (errorBounds_t*)&errorBounds, (inertialState_t*)&
inertialState);
        td.scaleConfidenceSum += (1 - errorBounds.scaleConfidence);
        td.gaitConfidenceSum += (1 - errorBounds.gaitConfidence);
    }

// Detect no motion. Not attached to person.
    if (updateRunningStats(&accyStats, cal->accl.y) == MOTION_DETECT_TEST_INTERVAL)
        accyStats.n = 0;                                      //Reset every 10 seconds (400
 samples).

if (accyStats.var > MOTION_DETECT_VAR_THRESH)
    {
        td.lastMotionSample = td.sampleNumber;
    }
    td.motionLevel = accyStats.var;
}
```

TRXS-0023 c:\LT_KK_Tracker2\src\C\common\portable\trx\tracker\tracker2.c                                                13

What is claimed:

1. A computer-implemented method for detecting the steps of a person and estimating the person's three-dimensional (3D) movement to track a location of the person, comprising the steps of:
   a. collecting accelerometer data from a torso worn or person carried device that includes an accelerometer, the accelerometer data representing an x axis, a y-axis and a z-axis movement of the person over a period of time and storing the accelerometer data in a non-transitory memory of a computer having a processor;
   b. removing by the processor tilt data from the accelerometer data for the x-axis, the y-axis and the z-axis to produce first improved accelerometer data and storing the first improved accelerometer data in the memory;
   c. removing by the processor gravitation acceleration from the first improved accelerometer data for the z-axis to produce second improved accelerometer data and storing the second improved accelerometer data in the memory;
   d. filtering by the processor the second improved accelerometer data and the first improved accelerometer data for the x-axis and the y-axis to remove additional bias and high frequency noise and to produce a filtered accelerometer data for the x-axis, the y-axis, and the z-axis;
   e. calculating by the processor a hip elevation estimate using a double integration of the filtered accelerometer data for the z-axis and storing the hip elevation estimate in the memory;
   f. correcting by the processor the hip elevation estimate if the hip elevation estimate drifts away from a mean over time;
   g. finding by the processor a local minima and a local maxima to detect each step by the person and storing the local minima and the local maxima in the memory;
   h. classifying by the processor the person's gait as a level gait, an up gait, or a down gait based on at least the local minima and the local maxima of the device;
   i. finding by the processor an x-displacement along the x-axis and a y-displacement along the y-axis for each step by the person based on the filtered accelerometer data for the x-axis and the y-axis and storing the x-displacement and the y-displacement in the memory;
   j. calculating by the processor a two-dimensional (2D) movement displacement for each stride by the person based at least on the x-displacement and the y-displacement;
   k. when the person's gait is classified as the up gait or the down gait, calculating by the processor the elevation change of the person and storing the elevation change in the memory; and
   l. on a step by step basis, calculating the 3D movement of the person based at least on the 2D movement displacement and the elevation change to track a location of the person.

2. The computer-implemented method as recited in claim 1, wherein the device is a smartphone that includes an accelerometer.

3. The computer-implemented method as recited in claim 1, wherein the accelerometer data is sampled at a frequency greater than twice a Nyquist frequency for the device.

4. The computer-implemented method as recited in claim 1, wherein the accelerometer data includes x-axis, y-axis and z-axis data for the device, and wherein the step of utilizing the processor to remove tilt includes the steps of:
   establishing a ground frame oriented around the device with the z-axis up and down from the device, the x-axis is right and left of the device and the y-axis is forward and back of the device;
   determining pitch data and roll data based on x-axis, y-axis and z-axis data relative to the ground frame; and
   determining the tilt data based on the pitch data and roll data of the device.

5. The computer-implemented method as recited in claim 1, wherein the device further includes a gyroscope adding to the x-axis, y-axis and z-axis data for the device.

6. The computer-implemented method as recited in claim 1, wherein the step of utilizing the processor to remove gravitation acceleration is based on $\bar{a}_z = a_z - g$, where $a_z$ is improved accelerometer data for the z-axis, g is gravity, and $\bar{a}_z$ is improved accelerometer data for the z-axis minus gravitational acceleration.

7. The computer-implemented method as recited in claim 1, wherein the step of utilizing the processor to correct the hip elevation includes correcting the hip elevation each time a new value is calculated for the hip elevation.

8. The computer-implemented method as recited in claim 1, wherein the local minima occurs after each heal strike and wherein the local maxima occurs after each passive position.

9. The computer-implemented method as recited in claim 1, wherein the step of utilizing the processor to find the local minima and the local maxima includes the step of utilizing the processor to reduce extraneous detections by determining if there are any neighboring minima within a sample window of n samples before a local minima and n samples after each local minima, and not counting any neighboring minima within the sample window as a local minima.

10. The computer-implemented method as recited in claim 1, wherein the processor utilizes a neural network to classify the person's gait.

11. The computer-implemented method as recited in claim 10, wherein the processor classifies the person's gait on a per step basis.

12. The computer-implemented method as recited in claim 11, wherein the step of utilizing the processor to classify the person's gait includes the steps of:
   inputting to the neural network n values of each of the x-axis, y-axis and z-axis components of angle vectors for each step;
   inputting to the neural network n values of each of the x-axis, y-axis and z-axis components of velocity vectors for each step;
   inputting to the neural network a minimum and a maximum acceleration amplitude difference over each step;
   inputting to the neural network an orientation vector at the end of each step; and
   inputting to the neural network an index where a magnitude of the x-axis and y-axis plane acceleration achieves a minimum value for each step.

13. The computer-implemented method as recited in claim 1, wherein the step of utilizing the processor to find the x-displacement and the y-displacement is performed in a time interval between the local minima and the local maxima for each step.

14. The computer-implemented method as recited in claim 1, further comprising the step of utilizing the processor to determine a translation direction for each step, wherein a most frequent direction of translation is assumed to be forward, and wherein the ground frame is corrected to the y-axis.

15. The computer-implemented method as recited in claim 1, further comprising the step of utilizing the processor to determine a translation direction for each step, wherein a most frequent direction of translation is determined by assigning each possible direction of motion based on each step to a bin for the direction of motion and the bin with the highest frequency is considered the most frequent direction of translation.

16. The computer-implemented method as recited in claim 1, further comprising the step of utilizing the processor to determine a translation direction for each step, and further comprising the step of detecting a transition corresponding to an abrupt change in orientation of the device and discontinuing the step of utilizing the processor to determine a translation direction for each step until the transition has completed.

17. The computer-implemented method as recited in claim 1, wherein the step of utilizing the processor to remove tilt data further includes determining an accelerometer estimate of pitch and yaw and an gyroscope estimate of pitch and yaw and combining the accelerometer estimate and the gyroscope estimate with a spherical linear interpolation.

18. The computer-implemented method as recited in claim 1, wherein the step of calculating the 3D movement is further based on determining the person's 3D translation and rotation, and further comprising the step of determining a location and a heading for the person based on the 3D translation and rotation.

* * * * *